(12) United States Patent
Mizuno et al.

(10) Patent No.: US 11,179,803 B2
(45) Date of Patent: Nov. 23, 2021

(54) LASER PROCESSING APPARATUS, CONTROL APPARATUS, LASER PROCESSING METHOD, AND METHOD OF PRODUCING IMAGE FORMING APPARATUS

(71) Applicant: CANON KABUSHIKI KAISHA, Tokyo (JP)

(72) Inventors: Tomohiro Mizuno, Kawasaki (JP); Hirokazu Izuoka, Kawasaki (JP); Teppei Agawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 430 days.

(21) Appl. No.: 16/100,641

(22) Filed: Aug. 10, 2018

(65) Prior Publication Data

US 2019/0061054 A1 Feb. 28, 2019

(30) Foreign Application Priority Data

Aug. 25, 2017 (JP) .............................. JP2017-162864
Aug. 25, 2017 (JP) .............................. JP2017-162865
Jul. 18, 2018 (JP) .............................. JP2018-134972

(51) Int. Cl.
*B23K 26/08* (2014.01)
*G05B 19/402* (2006.01)
(Continued)

(52) U.S. Cl.
CPC ........ *B23K 26/0884* (2013.01); *B23K 26/032* (2013.01); *B23K 26/0344* (2015.10);
(Continued)

(58) Field of Classification Search
CPC .. G05B 19/401; G05B 19/402; G05B 19/404; G05B 19/41; G05B 19/4103;
(Continued)

(56) References Cited

U.S. PATENT DOCUMENTS

| | | | | |
|---|---|---|---|---|
| 2010/0174407 | A1* | 7/2010 | Fukawa | ................. B23K 26/04 |
| | | | | 700/245 |
| 2012/0255938 | A1* | 10/2012 | Oe | ...................... B23K 26/082 |
| | | | | 219/124.22 |

FOREIGN PATENT DOCUMENTS

| | | |
|---|---|---|
| CN | 2638905 Y | 9/2004 |
| CN | 101342637 A | 1/2009 |
| | (Continued) | |

OTHER PUBLICATIONS

Chinese Office Action dated Sep. 4, 2020 in Chinese application No. 201810972075.4 (with English langauge translation).

*Primary Examiner* — Justin C Dodson
(74) *Attorney, Agent, or Firm* — Venable LLP

(57) ABSTRACT

A laser processing apparatus includes a light source, a laser head configured to emit a laser beam, a robot configured to move the laser head, and a control apparatus configured to control start and stop of generation of the laser beam and control operation of the robot. The control apparatus controls the light source to generate the laser beam when a first time has elapsed after causing the robot to start an operation of accelerating the laser head such that a movement speed of the laser head with respect to a processing target object reaches a constant target speed.

30 Claims, 41 Drawing Sheets

(51) Int. Cl.
*B23K 26/03* (2006.01)
*B23K 26/70* (2014.01)
*B23K 26/24* (2014.01)
*B23K 26/044* (2014.01)
*B23K 37/00* (2006.01)
*B23K 26/364* (2014.01)
*B23K 26/20* (2014.01)
*B23K 26/38* (2014.01)

(52) U.S. Cl.
CPC ........ *B23K 26/044* (2015.10); *B23K 26/0892* (2013.01); *B23K 26/20* (2013.01); *B23K 26/24* (2013.01); *B23K 26/364* (2015.10); *B23K 26/38* (2013.01); *B23K 26/705* (2015.10); *B23K 37/006* (2013.01); *G05B 19/402* (2013.01)

(58) Field of Classification Search
CPC .............. G05B 19/4105; G05B 19/414; G05B 2219/23117; B23K 26/032; B23K 26/0344; B23K 26/042; B23K 26/044; B23K 26/0884; B23K 26/0892; B23K 26/20; B23K 26/24; B23K 26/264; B23K 26/38; B23K 26/705; B23K 37/006
See application file for complete search history.

(56) References Cited

FOREIGN PATENT DOCUMENTS

| | | |
|---|---|---|
| CN | 102498580 A | 6/2012 |
| CN | 103847244 A | 6/2014 |
| JP | 6-181354 | 6/1994 |
| JP | 2007-237202 | 9/2007 |
| KR | 20130006045 A | 1/2013 |
| WO | 2009/054035 A1 | 4/2009 |

* cited by examiner

LASER PROCESSING APPARATUS, CONTROL APPARATUS, LASER PROCESSING METHOD, AND METHOD OF PRODUCING IMAGE FORMING APPARATUS

BACKGROUND OF THE INVENTION

Field of the Invention

The present invention relates to a laser processing apparatus that processes a processing target object by a laser beam, a control apparatus, a laser processing method, and a method of producing an image processing apparatus.

Description of the Related Art

A laser processing apparatus including a light source configured to generate a laser beam, a laser head configured to radiate the laser beam generated in the light source toward a processing target object, and a robot configured to move the laser head is known as a laser processing apparatus that processes the processing target object by the laser beam. As an example of a laser processing apparatus of this kind, a laser welding apparatus that performs welding with a laser beam is known. As laser welding using the laser welding apparatus, laser spot welding in which welding is performed on a spot by fixing the irradiation position of the laser beam and laser seam welding in which a welding bead is formed by scanning the processing target object by the laser beam are known. Japanese Patent Application Laid-open No. 2007-237202 discloses a laser welding apparatus that includes a laser head attached to a robot hand and performs laser seam welding by moving the robot hand.

In the method disclosed in Japanese Patent Application Laid-open No. 2007-237202, a robot controller obtains current position information of a moving robot hand from an encoder, and estimates, on the basis of the current position information, a welding start position in a timeline at which the robot hand reaches a starting end of the laser irradiation position.

However, the robot controller disclosed in Japanese Patent Application Laid-open No. 2007-237202 must perform complicated calculation requiring time, such as prediction calculation, in real time while the robot is operating. Therefore, in some case, the calculation does not keep up with the operation of a robot moving quickly, thus timing of control becomes off between the robot and a light source, and the precision of position of irradiation of the laser beam on the processing target object decreases. Therefore, the robot needs to be operated at a low speed, which leads to a low production efficiency of a processed product.

SUMMARY OF THE INVENTION

According to a first aspect of the present invention is a laser processing apparatus including a light source configured to generate a laser beam, a laser head configured to emit the laser beam generated in the light source, a robot configured to move the laser head, and a control apparatus configured to control start and stop of generation of the laser beam in the light source and control operation of the robot. The control apparatus controls the light source to generate the laser beam when a first time has elapsed after causing the robot to start an operation of accelerating the laser head such that a movement speed of the laser head with respect to a processing target object reaches a constant target speed.

According to a second aspect of the present invention is a control apparatus configured to control start and stop of generation of a laser beam in a light source and control operation of a robot supporting a laser head that emits the laser beam generated in the light source. The control apparatus controls the light source to generate the laser beam when a first time has elapsed after causing the robot to start an operation of accelerating the laser head such that a movement speed of the laser head with respect to a processing target object reaches a target speed.

According to a third aspect of the present invention is a laser processing method of processing a processing target object by emitting a laser beam generated in a light source from a laser head while moving the laser head by a robot supporting the laser head, the laser processing method including, a step of causing the robot to start an operation of accelerating the laser head such that a movement speed of the laser head with respect to the processing target object reaches a target speed, and a step of controlling the light source to generate the laser beam when a first time has elapsed after causing the robot to start the operation of accelerating the laser head.

Further features of the present invention will become apparent from the following description of exemplary embodiments with reference to the attached drawings.

DESCRIPTION OF THE EMBODIMENTS

Exemplary embodiments of the present invention will be described in detail below with reference to drawings.

First Exemplary Embodiment

Figure 1:
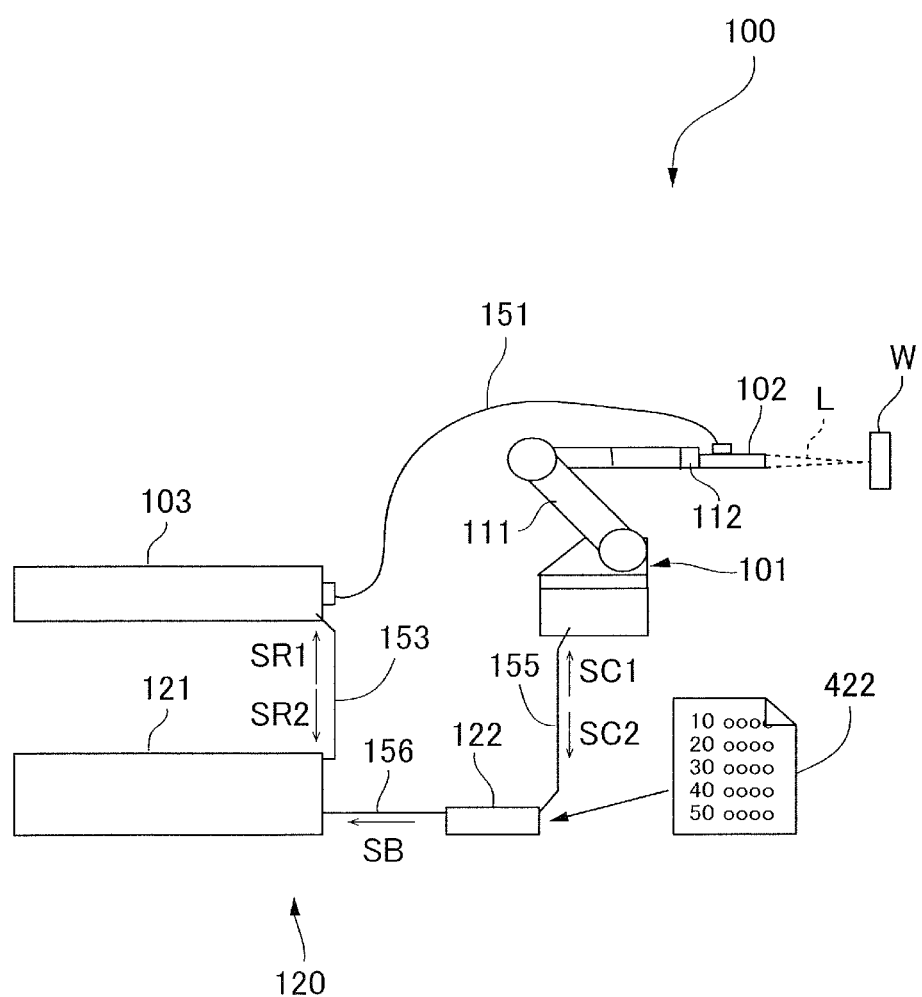
FIG. 1 is an explanatory diagram illustrating a schematic configuration of a laser welding apparatus serving as an example of a laser processing apparatus according to a first exemplary embodiment.

FIG. 1 is an explanatory diagram illustrating a schematic configuration of a laser welding apparatus 100 serving as an example of a laser processing apparatus according to a first exemplary embodiment. The laser welding apparatus 100 includes a robot 101, a laser head 102, a laser oscillator 103 serving as an example of a light source, and a control apparatus 120. The control apparatus 120 performs overall control of the laser welding apparatus 100. Specifically, the control apparatus 120 controls operation of the robot 101 and start and stop of generation of a laser beam in the laser oscillator 103. The control apparatus 120 includes a controller 121 and a robot controller 122. The controller 121 serves as an example of a first controller, and the robot controller 122 serves as an example of a second controller. The robot 101 is a manipulator.

The laser oscillator 103 and the laser head 102 are interconnected via an optical fiber cable 151 serving as an optical path for the laser beam. The laser oscillator 103 and the controller 121 are interconnected via a cable 153 such that a digital signal can be communicated therebetween. The robot arm 111 and the robot controller 122 are interconnected via a cable 155 including a power line and a signal line. The controller 121 and the robot controller 122 are interconnected via a cable 156 such that a digital signal can be communicated therebetween.

The laser oscillator 103 is a continuous wave laser or a pulsed laser, and generates a laser beam by laser oscillation. The laser beam generated in the laser oscillator 103 is transmitted to the laser head 102 via the optical fiber cable 151. The laser head 102 emits the laser beam L generated in the laser oscillator 103. The laser beam L emitted from the laser head 102 is focused on a position in a predetermined distance from the laser head 102. The controller 121 controls start and stop of generation of the laser beam in the laser oscillator 103. That is, the controller 121 commands the laser oscillator 103 to start or stop generation of laser beam via the cable 153.

The robot 101 is, for example, a vertically articulated robot, and includes a robot arm 111 and a robot hand 112. The robot hand 112 serves as an example of an end effector attached to the robot arm 111. The robot 101 supports the laser head 102. In the first exemplary embodiment, the robot 101 supports the laser head 102 by holding the laser head 102 by the robot hand 112. To be noted, for example, the laser head 102 may be supported by the robot 101 by attaching the laser head 102 to the distal end of the robot arm 111 or to the robot hand 112.

Since the laser head 102 is supported by the robot 101, the laser head 102 can be moved to a desired position and orientation by moving the robot 101. By moving the robot 101 to move the laser head 102 to the desired position and orientation, the focal point of the laser beam L can be moved to a desired position in the space. By focusing the laser beam L on a position at which a welding bead is to be formed on a processing target object W, the processing target object W can be subjected to welding by the laser beam L. To be noted, a processed product can be obtained by processing the processing target object W.

In the first exemplary embodiment, the control apparatus 120 controls the laser oscillator 103 and the robot 101 to perform laser seam welding. In the laser seam welding, there are a mode in which a continuous wave is used as the laser beam L and a mode in which a pulse wave is used as the laser beam L, and either of these modes may be selected. In the laser seam welding, the surface of the processing target object W needs to be scanned by the laser beam L. In the first exemplary embodiment, the laser beam L is emitted while moving the laser head 102 supported by the robot 101 to scan the surface of the processing target object W by the laser beam L without using a galvano mirror, and thus laser welding is performed. Since the galvano mirror is omitted, the cost can be reduced. If there are a plurality of welding target portions serving as processing target portions on the processing target object W, the welding target portions are sequentially subjected to laser welding.

Figure 2:
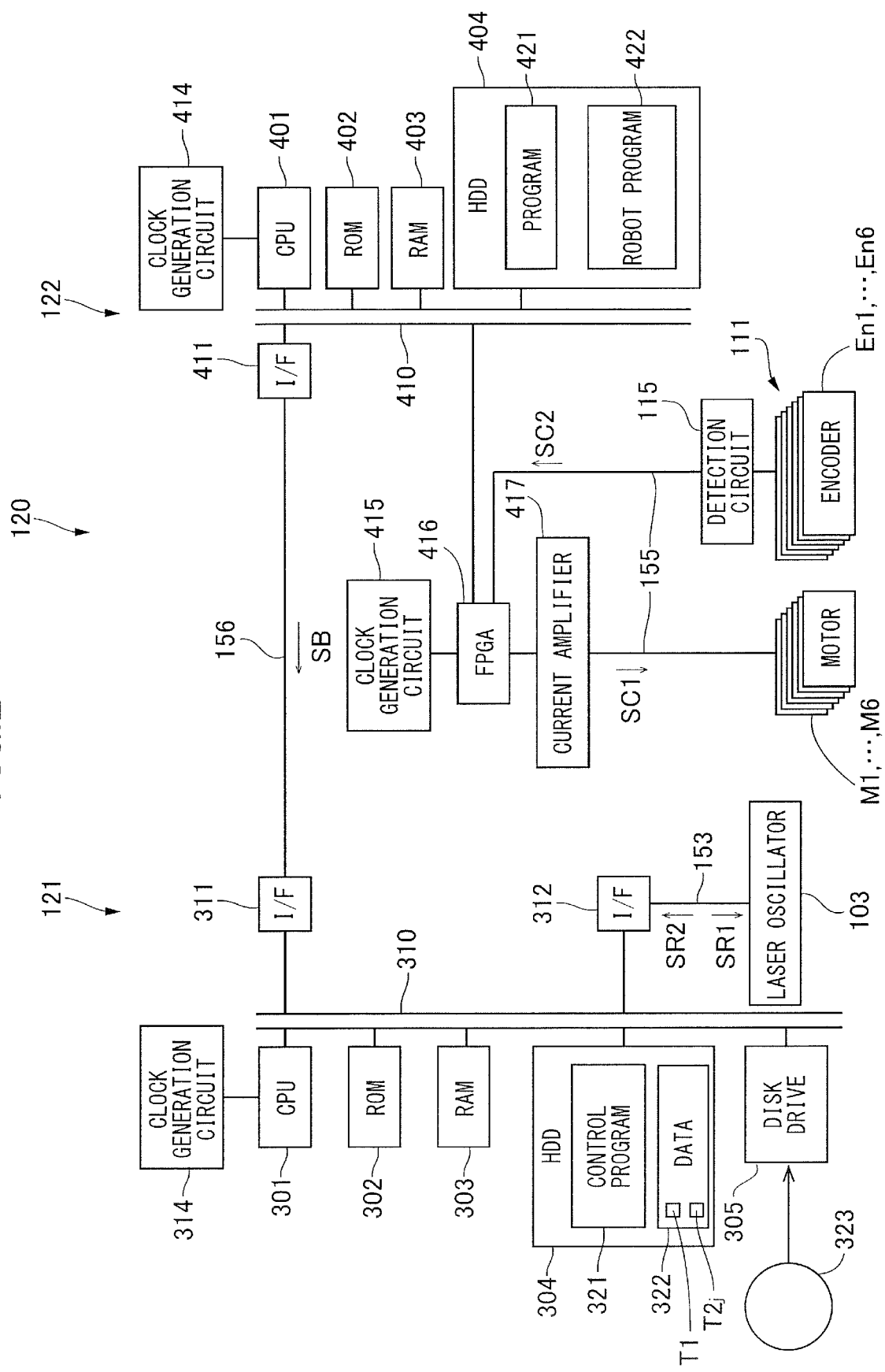
FIG. 2 is a block diagram illustrating an example of a control system of the laser welding apparatus according to the first exemplary embodiment.

FIG. 2 is a block diagram illustrating an example of a control system of the laser welding apparatus 100 in the first exemplary embodiment. The controller 121 is constituted by, for example, a general-purpose computer, and includes a central processing unit: CPU 301 serving as an example of a processor. The controller 121 includes a read only memory: ROM 302 and a random access memory: RAM 303. The ROM 302 stores a basic program for operating the CPU 301 and the like, and the RAM 303 serves as a work area of the CPU 301. The controller 121 includes a hard disk drive: HDD 304 and a disk drive 305. The HDD 304 serves as an example of a storage device. The disk drive 305 is capable of reading a program or the like recorded in a recording disk 323 serving as an example of a recording medium.

The controller 121 includes interfaces: I/Fs 311 and 312. The CPU 301, the ROM 302, the RAM 303, the HDD 304, the disk drive 305, and the I/Fs 311 and 312 are communicably interconnected via a bus 310. The I/F 312 is connected to the laser oscillator 103 via the cable 153.

The CPU 301 is connected to a clock generation circuit 314. The CPU 301 operates in synchronization with a clock signal generated in the clock generation circuit 314. That is, the operating frequency of the CPU 301 is determined depending on the clock signal of the clock generation circuit 314.

The HDD 304 stores, in other words, records a control program 321 for the CPU 301 to perform timekeeping processing and signal communication processing. The CPU 301 performs various processing such as the timekeeping processing and the signal communication processing in accordance with the control program 321. The HDD 304 stores, in other words, records various data 322 including data of time such as a first time T1 and a second time $T2_j$ that will be described later. Here, j is a positive integer and a serial number indicating the order of welding given in correspondence with the welding target portion serving as the processing target portion. To be noted, the data 322 may be incorporated in the control program 321.

The CPU 301 functions as a software timer by executing the control program 321. Specifically, the CPU 301 functions as a timer that performs timekeeping of the first time T1 and a timer that performs timekeeping of the second time $T2_j$. The CPU 301 controls the laser oscillator 103 by executing the control program 321 and transmitting a laser oscillation command SR1 serving as a signal to the laser oscillator 103. The control program 321 regularly performs reading from I/Fs, arithmetic processing, and output to I/Fs. The period of this regular processing will be referred to as a control period of the controller 121.

To be noted, the recording medium in which the control program 321 is recorded may be any recording medium as long as the recording medium can be read by a computer. For example, as the recording medium for supplying the control program 321, the ROM 302 illustrated in FIG. 2, the recording disk 323, or an unillustrated external storage device may be used. Specific examples of the recording medium include flexible disks, hard disks, optical disks such as digital versatile disk-ROM: DVD-ROM, compact disk-ROM: CD-ROM, and Blu-ray disks, magnetic disks, magnetic tapes, and semiconductor memories.

The robot controller 122 is a dedicated computer for controlling the robot 101. To be noted, in FIG. 2, a control system of the robot arm 111 of the robot 101 is illustrated, and illustration of a control system of the robot hand 112 is omitted. The robot controller 122 includes a CPU 401, a ROM 402, and a RAM 403. The CPU 401 serves as an example of a processor, the ROM 402 store a basic program or the like for operating the CPU 401, and the RAM 403 serves as a work area of the CPU 401. The robot controller 122 includes an HDD 404 serving as an example of a storage device.

The robot controller 122 includes a field-programmable gate array: FPGA 416 and a current amplifier 417. The FPGA 416 serves as an example of a servo calculation portion. The robot controller 122 includes an I/F 411. The CPU 401, the ROM 402, the RAM 403, the HDD 404, the FPGA 416, and the I/F 411 are communicably interconnected via a bus 410. The I/F 311 of the controller 121 and the I/F 411 of the robot controller 122 are interconnected via a cable 156.

The CPU 401 is connected to a clock generation circuit 414, and the FPGA 416 is connected to a clock generation circuit 415. The CPU 401 operates in synchronization with a clock signal generated in the clock generation circuit 414, and the FPGA 416 operates in synchronization with a clock signal generated in the clock generation circuit 415. That is, the operating frequency of the CPU 401 is determined depending on the clock signal of the clock generation circuit 414, and the operating frequency of the FPGA 416 is determined depending on the clock signal of the clock generation circuit 415.

The HDD 404 stores, in other words, records a program 421 and a robot program 422.

The robot arm 111 includes a plurality of motors that drive joints thereof and a plurality of encoders serving as examples of a position sensor that detects the rotation angles or rotation positions of the motors. For example, six motors M1 to M6 and six encoders Ent to En6 are provided. The robot arm 111 includes a detection circuit 115 connected to the encoders Ent to En6 and constituted by an electronic circuit.

In the configuration described above, the controller 121, specifically the CPU 301 transmits the laser oscillation command SR1 serving as a signal from the I/F 312 to the laser oscillator 103. The laser oscillator 103 that has received the laser oscillation command SR1 operates to generate a laser beam in accordance with the laser oscillation command SR1. Specifically, as the laser oscillation command SR1, the controller 121 switches the voltage of an electric signal from a low level to a high level when commanding the laser oscillator 103 to generate a laser beam, and transmits the command from the I/F 312. The switching of the voltage of the electric signal to the high level is also referred to as turning the laser oscillation command SR1 on. The controller 121 switches the voltage of the electric signal to the low level when commanding the laser oscillator 103 to stop generation of the laser beam. The switching of the voltage of the electric signal to the low level is also referred to as turning the laser oscillation command SR1 off. Therefore, the laser oscillator 103 generates the laser beam when the laser oscillation command SR1 is on, and stops generation of the laser beam when the laser oscillation command SR1 is off.

The laser oscillator 103 transmits a signal SR2 indicating that a laser beam is being generated to the controller 121. Specifically, the laser oscillator 103 transmits, as the signal SR2, an electric signal whose voltage is the high level to the controller 121 when the laser beam is being generated. Setting the voltage of the electric signal to the high level is also referred to as turning the signal SR2 on. The laser oscillator 103 sets the voltage of the electric signal to the low level when the laser beam is stopped. Setting the voltage of the electric signal to the low level is also referred to as turning the signal SR2 off.

The robot controller 122 controls operation of the robot arm 111 and the robot hand 112 in accordance with the robot program 422. The robot controller 122 manages a sequence in accordance with the robot program 422. That is, the time of starting operation of the robot arm 111 is managed by the robot controller 122. Operating the robot arm 111 will be expressed as operating the robot 101 hereinbelow.

The robot controller 122 transmits, to the controller 121, a signal SB that is a digital signal indicating that the robot 101 is operating on the basis of trajectory data of a predetermined section including a welding target portion. Specifically, the robot controller 122 switches the voltage of the electric signal indicating the signal SB from the low level to the high level and transmits the signal SB to the controller 121 when causing the robot 101 to start an operation of accelerating the laser head 102. The robot controller 122 switches the voltage of the electric signal indicating the signal SB from the high level to the low level at a predetermined timing. Switching the voltage of the electric signal indicating the signal SB to the high level will be also referred to as turning the signal SB on hereinbelow. In addition, switching the voltage of the electric signal indicating the signal SB to the low level will be also referred to as turning the signal SB off.

Orientation control of the robot arm 111, that is, position/orientation control of the laser head 102, specifically position control of the focal point of the laser beam L is performed with a motor current SC1 supplied to the motors M1 to M6 of the robot arm 111 of the robot controller 122. The robot program 422 is a program described in a robot language. A user can instruct operation of the robot 101 by describing the robot language in text data. The CPU 401 of the robot controller 122 executes the program 421 to interpret the robot program 422, generate trajectory data constituted by a plurality of commands, and output the generated trajectory data to the FPGA 416. The FPGA 416 performs servo calculation in accordance with the trajectory data. That is, the FPGA 416 generates a motor current command by the servo calculation, and transmits the generated motor current command to the current amplifier 417. The current amplifier 417 generates the motor current SC1 corresponding to the motor current command, and supplies the motor current SC1 to the motors M1 to M6 at respective joints of the robot arm 111. The motors M1 to M6 of the robot arm 111 are driven by the supplied motor current SC1. The detection circuit 115 obtains detection signals from the encoders En1 to the En6 when the motors M1 to M6 rotate. The detection circuit 115 converts the detection signals into a serial digital signal SC2, and transmits the digital signal SC2 to the FPGA 416 of the robot controller 122.

The digital signal SC2 indicating rotation angles, or rotation positions of the motors M1 to M6 is used for the servo calculation in the FPGA 416. The program 421 regularly performs reading from I/Fs, arithmetic processing, and output to I/Fs. The period of this regular processing will be referred to as a control period of the robot controller 122. The detection signals of the encoders En1 to En6 are pulse signals of ABZ phase. The detection circuit 115 converts the pulse signals of the encoders En1 to En6 into the digital signal SC2 indicating a pulse number, which can be converted into a positional coordinate, and feeds the digital signal SC2 back to the FPGA 416. To be noted, the servo mechanism, that is, the FPGA 416 and the current amplifier 417 may be disposed in the robot arm 111, and a position command, that is, the trajectory data may be transmitted to the servo mechanism in the robot arm 111 from the CPU 401 via a cable. The FPGA 416 may be omitted by imparting the function of the FPGA 416 to the CPU 401. Although the pulse signals of the encoders En1 to En6 are converted into a digital signal and transmitted to the robot controller 122 has been described, the pulse signals of the encoders En1 to En6 may be directly transmitted to the robot controller 122. Resolvers may be used as position sensors instead of the encoders En1 to En6.

Here, a control point of movement of the robot 101 may be a point that moves together with the tip of the hand of the robot 101, and, in the first exemplary embodiment, a focal point of the laser beam is set as the control point of movement of the robot 101. The control point is expressed by six parameters composed of three parameters X, Y, and Z indicating a position in the three-dimensional space and three parameters A, B, and C indicating an orientation in the three-dimensional space. Therefore, the control point can be regarded as one point in a six-dimensional task space. In the robot program 422, a taught point that is a movement target of the control point is described, in other words, designated by a user. The robot controller 122 interprets the robot program 422 and generates the trajectory data connecting taught points, that is, the trajectory data in which the taught points are interpolated. Examples of an interpolation method of interpolating the taught points include linear interpolation, circular interpolation, and joint interpolation, and these interpolation methods are described, in other words, designated in the robot program 422 as an interpolation command by the user.

The CPU 401 of the robot controller 122 converts the trajectory data obtained by the interpolation into a command of angles of respective joints of the robot 101, and the FPGA 416 performs servo calculation. As a result of the servo calculation, the FPGA 416 determines a current command to be transmitted to the current amplifier 417. The servo calculation is performed in each cycle of the control period of the CPU 401 of the robot controller 122. The command of angles of respective joints is updated in each cycle of the control period, and the speed of the robot 101 is determined by controlling the amount of increase or decrease thereof. That is, the robot 101 moves quickly in the case where the amount of increase or decrease of commanded angles of the joints is large, and moves slowly in the case where the amount of the increase or decrease is small.

A path in which the control point, which is the focal point of the laser beam, actually moves by the operation of the robot 101 can be deviated from a path commanded by the robot program 422 due to response delay of position control.

Figure 3:
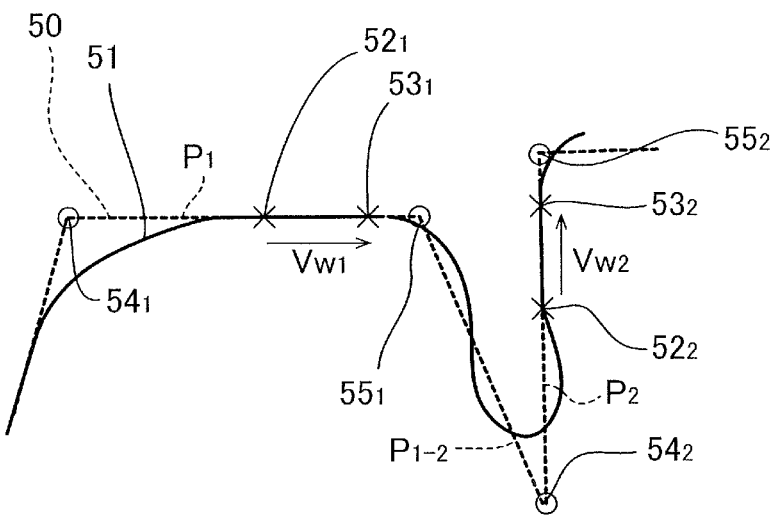
FIG. 3 is an explanatory diagram illustrating an example of a path of control point in the first exemplary embodiment.

FIG. 3 is an explanatory diagram illustrating an example of a path of the control point in the first exemplary embodiment. Here, since the path of the control point, which is the focal point of the laser beam is defined by the operation of the robot 101, the path of the control point is equivalent to the path of the laser head 102 supported by the robot 101.

A case of executing a linear interpolation command serving as an example of the interpolation command described in the robot program 422 will be described below. The linear interpolation command is a command of performing interpolation such that the control point moves along a straight line connecting a first positional coordinate and a second positional coordinate, and the path of the control point becomes a line segment in the three-dimensional space. To be noted, there are two possible options, one of which is also interpolating the orientation of the robot 101 by using the first positional coordinate and the second positional coordinate and the other of which is maintaining the orientation at the first positional coordinate to the second positional coordinate, and, in the first exemplary embodiment, the orientation is also interpolated. In both of these options, the control point of the robot 101, that is, the focal point of the laser beam moves on a line segment connecting the first positional coordinate and the second positional coordinate. To be noted, in most case, the robot program 422 uses a current commanded position of the robot 101 as the first positional coordinate and only the second positional coordinate, which is a movement destination, is designated. For the positional coordinate, a taught point, in other words, a taught position set by a user may be used, or a positional coordinate obtained by additional calculation of the taught point indicating a position different from the taught point may be used. When the CPU 401 of the robot controller 122 executes the linear interpolation command, the CPU 401 generates trajectory data connecting the current commanded position and a target position that is the movement destination, and supplies the trajectory data to the FPGA 416 in each cycle of the control period. The linear interpolation command is completed when supply of all trajectory data by the CPU 401 of the robot controller 122 is completed, and the CPU 401 executes the next command described in the robot program 422.

In FIG. 3, a broken line indicates a commanded path 50 serving as a commanded position of the control point, and a solid line indicates an actual path 51 serving as an actual position of the control point. In the example of FIG. 3, there are two portions to be subjected to laser seam welding. The first portion is a section between a position $52_1$ of the control point at which irradiation of the laser beam is started and a position $53_1$ of the control point at which the irradiation of the laser beam is finished. The second portion is a section between a position $52_2$ of the control point at which irradiation of the laser beam is started and a position $53_2$ of the control point at which the irradiation of the laser beam is finished. To be noted, the portion to be subjected to laser seam welding is not limited to two portions, and may be one portion or three or more portions. The positions $52_1$ and $52_2$ of the control point and the positions $53_1$ and $53_2$ of the control point are taught points serving as taught positions set by the user.

The robot controller 122 derives, in accordance with a predetermined algorithm, positions $54_1$ and $55_1$ positioned on an extension line passing through the taught positions $52_1$ and $53_1$. This algorithm is described in the robot program 422. The position $55_1$ is provided to the robot program 422 as a parameter to execute the linear interpolation command. To be noted, in order to cause the robot program 422 to execute the linear interpolation command to the position $55_1$, it is required that a movement command to the position $54_1$ has been executed and the commanded position of the robot 101 has reached the position $54_1$.

The position $54_1$ is a commanded position at which movement of the control point is started. The position $55_1$ is a commanded position at which movement of the control point is finished. Further, the robot controller 122 generates trajectory data $P_1$ of a predetermined section by linear interpolation. The predetermined section includes the section between the taught positions $52_1$ and $53_1$, and includes the position $54_1$ as a start point and the position $55_1$ as an end point. Similarly, the robot controller 122 generates trajectory data $P_2$ of a predetermined section in accordance with a linear interpolation command. The predetermined section includes a position $54_2$ at which movement of the control is started as a start point and a position $55_2$ at which movement of the control point is finished as an end point. To be noted, although the predetermined algorithm is described in the robot program 422 in the present exemplary embodiment, the algorithm may be implemented inside the robot controller 122 and arithmetic processing can be performed in accordance with a command.

As described above, the positions $52_1$, $53_1$, $52_2$, and $53_2$ that are included in the trajectory data $P_1$ and $P_2$ to be commanded to the robot 101 are taught points designated by the user. In contrast, the positions $54_1$, $55_1$, $54_2$, and $55_2$ that are included in the trajectory data $P_1$ and $P_2$ are commands obtained by the robot controller 122 by automatic calculation in accordance with the robot program 422, and are not taught points.

For also the section between the positions $55_1$ and $54_2$, the robot controller 122 performs interpolation in accordance with the interpolation command described in the robot program 422 to generate trajectory data $P_{1-2}$. To be noted, since the laser head 102 is just moved in the section between the positions $55_1$ and $54_2$, the interpolation can be performed by an arbitrary interpolation method. Therefore, an arbitrary interpolation command can be described in the robot program 422. For example, in the case where a linear interpolation command is described in the robot program 422, linear interpolation can be performed. For example, in the case where a joint interpolation command is described in the robot program 422, joint interpolation can be performed. The joint interpolation command is a command for dividing operation amount of each joint of the robot 101 by time and performing interpolation, and the path of the control point is not linear in this case. However, in this case, the operation of the robot 101 is faster than in the case where the robot 101 is operated in accordance with the linear interpolation command.

In the case of performing laser seam welding, acceleration sections for the movement speed of the control point to reach target speeds $VW_1$ and $VW_2$ are required. In the first exemplary embodiment, the section between the positions $54_1$ and $52_1$ and the section between the positions $54_2$ and $52_2$ are acceleration sections. The target speeds $VW_1$ and $VW_2$ are described, in other words, designated in the robot program 422.

To be noted, although the control point needs to be moved with a high precision in the sections for welding, that is, the section between the positions $52_1$ and $53_1$ and the section between the positions $52_2$ and $53_2$, the positional precision may be low in other sections in which laser seam welding is not performed, for example, the acceleration sections. Therefore, as illustrated in FIG. 3, the actual path 51 may be deviated from the commanded path 50 in the sections other than the sections for welding. In other words, the robot controller 122 obtains the positions $54_1$ and $54_2$ serving as start points and the positions $55_1$ and $55_2$ serving as end points such that the control point moves with a high precision in the section between the positions $52_1$ and $53_1$ and the section between the positions $52_2$ and $53_2$.

Here, when the robot controller 122 commands the positions $54_1$ and $54_2$ to the robot 101, the robot 101 is still or moving, and these are both acceptable.

Figure 4:
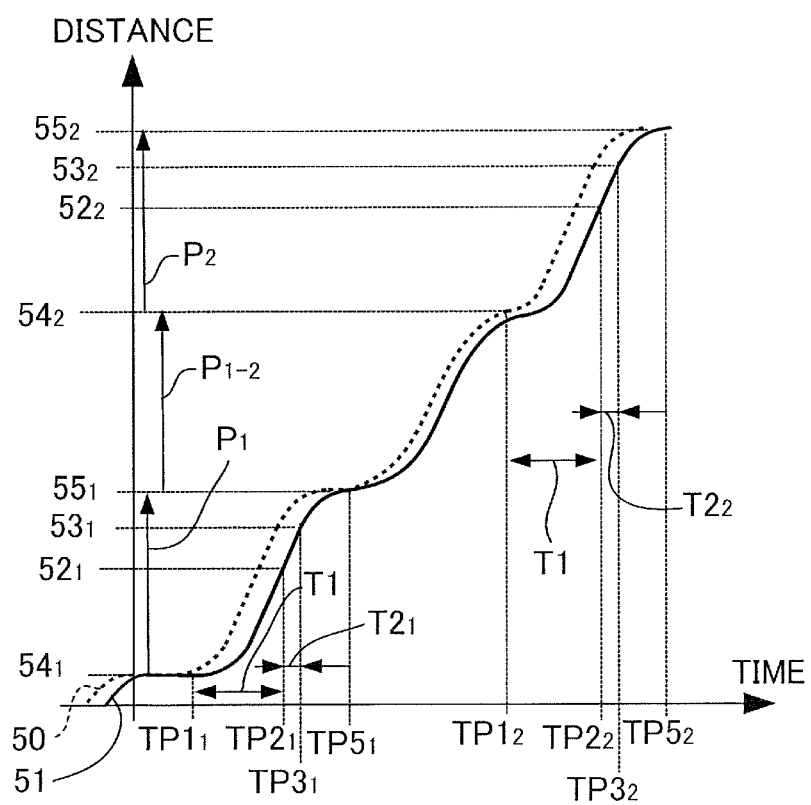
FIG. 4 is an explanatory diagram illustrating an example of a movement distance of the control point in the first exemplary embodiment.

FIG. 4 is an explanatory diagram illustrating an example of a movement distance of the control point by the operation of the robot 101 in the first exemplary embodiment. For the sake of convenience of description, time points $TP1_1$, $TP2_1$, $TP3_1$, $TP5_1$, $TP1_2$, $TP2_2$, $TP3_2$, and $TP5_2$ are illustrated in FIG. 4. The laser welding apparatus 100 of the first exemplary embodiment does not perform processing by counting timings at which the time points $TP1_1$, $TP2_1$, $TP3_1$, $TP5_1$, $TP1_2$, $TP2_2$, $TP3_2$, and $TP5_2$ are reached. To be noted, similarly to FIG. 3, a broken line indicates the commanded path 50, and a solid line indicates the actual path 51.

The robot controller 122 controls operation of the robot 101 by sequentially using the trajectory data $P_1$, the trajectory data $P_{1-2}$, and the trajectory data $P_2$ in this order. However, due to the response delay of the position control, the control point moves behind the commanded time as illustrated in FIG. 4.

When the robot controller 122 executes the linear interpolation command and starts supplying the trajectory data $P_1$ for welding on the first welding target portion, the command for the angle of the robot 101 starts to change from the position $54_1$ that is a start point of the trajectory data $P_1$ to the position $55_1$ that is an end point of the trajectory data $P_1$. At the time point $TP1_1$ when this change is started, the operation of the robot 101 to accelerate the control point, that is, the laser head 102 is started.

When the robot controller 122 commands the position $52_1$ to the robot 101, the control point passes a position corresponding to the commanded position $52_1$ at the time point $TP2_1$ delayed with respect to the commanded time. When the robot controller 122 commands the position $53_1$ to the robot 101, the control point passes a position corresponding to the commanded position $53_1$ at the time point $TP3_1$ delayed with respect to the commanded time. When the robot controller 122 commands the position $55_1$ that is the end point of the trajectory data $P_1$ to the robot 101, the control point passes a position corresponding to the commanded position $55_1$ at the time point $TP5_1$ delayed with respect to the commanded time. The irradiation of laser beam needs to be started when the control point actually passes the position $52_1$ and needs to be stopped when the control point actually passes the position $53_1$.

Next, the robot controller 122 operates the robot 101 in accordance with the trajectory data $P_{1-2}$ from the position $55_1$ to the position $54_2$ for preparation of next welding operation.

When the robot controller 122 executes the linear interpolation command and starts supplying the trajectory data $P_2$ for welding on the second welding target portion, the command for the angle of the robot 101 starts to change from the position $54_2$ that is a start point of the trajectory data $P_2$ to the position $55_2$ that is an end point of the trajectory data $P_2$. At the time point $TP1_2$ when this change is started, the operation of the robot 101 to accelerate the control point, that is, the laser head 102 is started.

When the robot controller 122 commands the position $52_2$ to the robot 101, the control point passes a position corresponding to the commanded position $52_2$ at the time point $TP2_2$ delayed with respect to the commanded time. When the robot controller 122 commands the position $53_2$ to the robot 101, the control point passes a position corresponding to the commanded position $53_2$ at the time point $TP3_2$ delayed with respect to the commanded time. When the robot controller 122 commands the position $55_2$ that is the end point of the trajectory data $P_2$ to the robot 101, the control point passes a position corresponding to the commanded position $55_2$ at the time point $TP5_2$ delayed with respect to the commanded time. The irradiation of laser beam needs to be started when the control point actually passes the position $52_2$ and needs to be stopped when the control point actually passes the position $53_2$.

In order to perform processing by irradiating the processing target object W with the laser beam L in a state in which the movement speed of the focal point of the laser beam L is constant at the target speed $VW_1$ or $VW_2$, the laser head 102 needs to be accelerated before the laser head 102 reaches the position to start irradiation of the laser beam L. The first time T1 is time for accelerating the laser head 102 such that the laser head 102 moves at the constant target speed $VW_1$ or $VW_2$. Second times $T2_1$ and $T2_2$ are respectively times for irradiating the processing target object W with the laser beam L in states in which the laser head 102 is moving at the constant target speeds $VW_1$ and $VW_2$.

In the first exemplary embodiment, a period between the time points $TP1_1$ and $TP2_1$ and a period between the time points $TP1_2$ and $TP2_2$ are set as the first time T1 for accelerating the laser head 102 with respect to the processing target object W. In addition, by performing an experiment or calculation in advance, a period between the time points $TP2_1$ and $TP3_1$ is set as the second time $T2_1$ for irradiation of the laser beam L, and a period between the time points $TP2_2$ and $TP3_2$ is set as the second time $T2_2$ for irradiation of the laser beam L.

Settings of the first time T1 and the second time $T2_j$ will be described in detail below. The actual speed of the laser head 102 is deviated from the commanded speed thereof due to response delay of position control. Therefore, it is difficult to set the first time T1 by only the robot program 422. Therefore, the robot 101 is operated in various conditions with trial and error to measure the time in which the actual speed of the laser head 102 reaches the target speed $Vw_j$ in each condition, and the first time T1 is set on the basis of measurement results thereof.

To be noted, although it is preferable that the speed of the laser head 102 reaches the target speed $Vw_j$ and be constant when the first time T1 has elapsed, an error occurs in the speed due to factors such as the position and orientation of the robot 101, the target speed $Vw_j$, and residual deviation derived from continuous operation of the robot 101. Therefore, it is preferable that, among values obtained by the measurement in various conditions, a value with the smallest speed error, that is, the longest time is set as the first time T1. That is, the first time T1 may be set such that the speed of the laser head 102 is within a predetermined range from the target speed $Vw_j$ when the first time T1 has elapsed after starting acceleration of the laser head 102. Although the first time T1 may be varied depending on the target speed $Vw_j$ of the laser beam at each welding target portion, the processing of the controller 121 can be more simplified when the first time T1 is set to the same value.

Figure 5A:
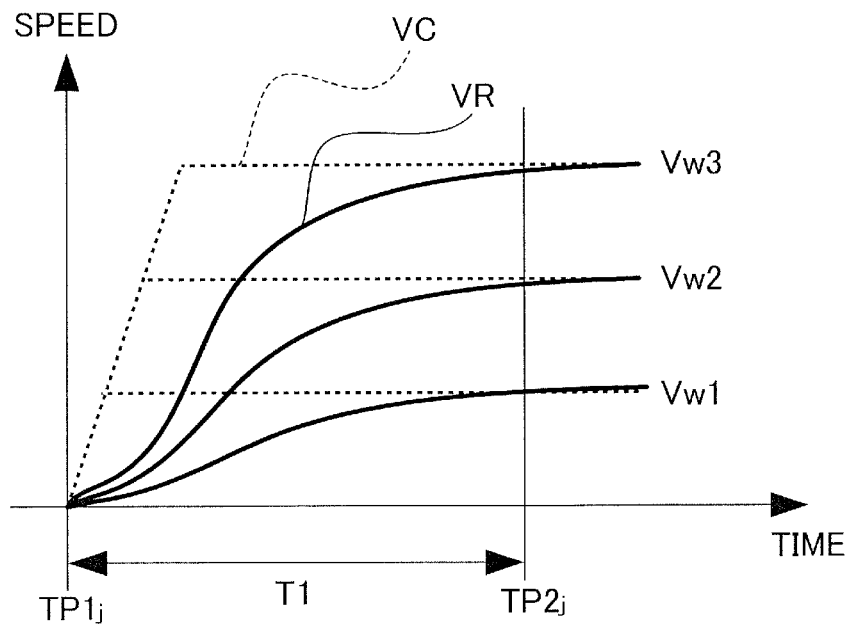
FIG. 5A is an explanatory diagram illustrating a movement profile when a target speed of a laser head is changed in the first exemplary embodiment.
Figure 5B:
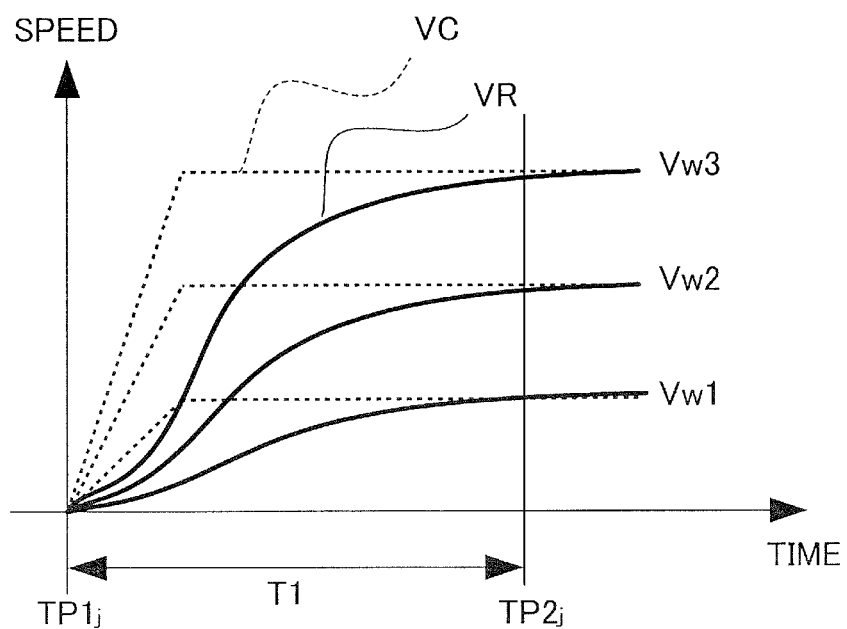
FIG. 5B is an explanatory diagram illustrating a movement profile when the target speed of the laser head is changed in the first exemplary embodiment.

FIGS. 5A and 5B are each an explanatory diagram illustrating a movement profile when the target speed of the laser head 102 supported by the robot 101 is changed. FIGS. 5A and 5B illustrate an example of changing the target speed of the laser head 102 at portions to be welded to three speeds $VW_1$, $VW_2$, and $Vw_3$. To be noted, commanded speeds VC and actual speeds VR of the robot 101 are shown in FIGS. 5A and 5B. In FIG. 5A, the acceleration rate of the robot 101 is set to the same value for the different target speeds $VW_1$, $VW_2$, and $Vw_3$. Therefore, the acceleration time of the robot 101 changes in accordance with the target speeds $VW_1$, $VW_2$, and $Vw_3$. In FIG. 5B, the acceleration time of the robot 101 is set to the same value for the different target speeds $VW_1$, $VW_2$, and $Vw_3$. Therefore, the acceleration rate of the robot 101 changes. In either of FIGS. 5A and 5B, the commanded speed VC and the actual speed VR approximately match in the case where the first time T1 is set to a sufficient value. Therefore, the robot 101 reaching a constant speed region can be guaranteed immediately after the elapse of the first time T1. That is, it suffices as long as it is guaranteed that the robot 101 has already reached the constant speed at the time point $TP2_j$ at which the elapse of the first time T1 is completed, and thus the robot 101 may reach the constant speed at a time point before the time point $TP2_j$.

To be noted, the algorithm for obtaining the positions $54_j$ and $55_j$ positioned on an extension line connecting the taught positions $52_j$ and $53_j$ needs to be changed between the FIGS. 5A and 5B. For example, the position $54_j$ is obtained by extending a line segment connecting the positions $52_j$ and $53_j$ on the position $52_j$ side, and the amount of this extension is a distance obtained by integrating the actual speed VR of FIGS. 5A and 5B from the time point $TP1_j$ to the time point $TP2_j$. The distance obtained by the integration is different between the FIGS. 5A and 5B, and also changes when the target speeds $VW_1$, $VW_2$, and $Vw_3$ are changed. Therefore, the algorithm for obtaining the position $54_j$ needs to be determined in consideration of these. The same applies to the algorithm for obtaining the position $55_j$.

The second times $T2_1$ and $T2_2$ are laser irradiation times, and are calculated by the following formula (1). Here, as algebra for calculation of the formula (1), Tw, Ps, Pe, and Vw are used. Tw corresponds to the second times $T2_1$ and $T2_2$, Ps corresponds to the positions $52_1$ and $52_2$ at which irradiation of the laser beam is started, Pe corresponds to the positions $53_1$ and $53_2$ at which the irradiation of the laser beam is stopped, and Vw corresponds to the target speed $Vw_j$. The second time Tw is calculated for each welding target portion by using Ps, Pe, and Vw in accordance with the following formula (1).

$$Tw = \frac{\|\vec{P}e - \vec{P}s\|_2}{Vw} \tag{1}$$

Tw: second time

Vw: target speed $\vec{P}s$: start position of laser beam irradiation $\vec{P}e$: end position of laser beam irradiation That is, the value of Tw serving as second time is obtained by dividing the distance between Ps and Pe by Vw. Different values of Ps, Pe, and Vw can be used for different welding target portions. Therefore, the value of Tw serving as the second time $T2_1$ or $T2_2$ corresponds to the length, or area of the welding target portion. Values of Tw calculated in this manner are set as the second times $T2_1$ and $T2_2$.

The positions $52_1$ and $52_2$ that are taught points are each constituted by information of six degrees of freedom about position and orientation. Specifically, the information constituting the positions $52_1$ and $52_2$ includes X, Y, and Z, which are information about the position of the robot 101 with respect to the base, and A, B, and C, which are information about the holding angle of the laser head 102. The same applies to the positions $53_1$ and $53_2$. Therefore, a distance in the three-dimensional space is obtained by only using the position information of X, Y, and Z as Ps and Pe.

To be noted, this calculation may be performed by the robot controller 122, and the robot controller 122 may transfer the value of Tw serving as the second time to the controller 121. In addition, the robot controller 122 may calculate only the distance between Ps and Pe and transfer information about the distance to the controller 121, and the controller 121 may perform the remaining calculation for obtaining the value of Tw serving as the second time. Which of these is selected can be appropriately selected on the basis of by which of the robot controller 122 and the controller 121 the target speed Vw is described or designated.

In this manner, the first time T1 and the second times $T2_1$ and $T2_2$ are set before actually starting operating the robot 101 in a production line. To be noted, the first time T1 is preferably set for both of the controller 121 and the robot controller 122 in advance.

Incidentally, the welding target portions to be subjected to laser seam welding need to be irradiated with the laser beam L not at timings at which the positions $52_1$ and $52_2$ are commanded to the robot 101 but at the time points $TP2_1$ and $TP2_2$ at which the control point actually passes the positions $52_1$ and $52_2$. Similarly, the irradiation of the laser beam L needs to be stopped not at timings at which the positions $53_1$ and $53_2$ are commanded to the robot 101 but at the time points $TP3_1$ and $TP3_2$ at which the control point actually passes the positions $53_1$ and $53_2$.

That is, there is a case where response delay has occurred in the position control of the robot 101 at the time point $TP2_1$ at which the control point reaches the constant speed region. The response delay of the position control is expressed by the difference between the commanded position and the actual position. In the case where there is response delay of the position control, this response delay of the position control needs to be incorporated in the calculation of the positions $54_1$, $54_2$, $55_1$, and $55_2$.

Therefore, the robot controller 122 calculates the positions $54_1$ and $54_2$ at which movement is started and the positions $55_1$ and $55_2$ at which movement is stopped such that the control point reaches a target position when the first time T1 has elapsed after starting the operation of accelerating the laser head 102. However, how the positions $54_1$, $54_2$, $55_1$, and $55_2$ are calculated is different between the case where the method of FIG. 5A is applied and the case where the method of FIG. 5B is applied.

This calculation needs to be performed before executing the linear interpolation command for generating the trajectory data $P_1$ and $P_2$. For example, the calculation can be performed immediately before the linear interpolation command or before actually operating the robot 101 in the production line. To be noted, the calculation algorithm thereof is described in the robot program 422 and executed by the robot controller 122.

Figure 6:
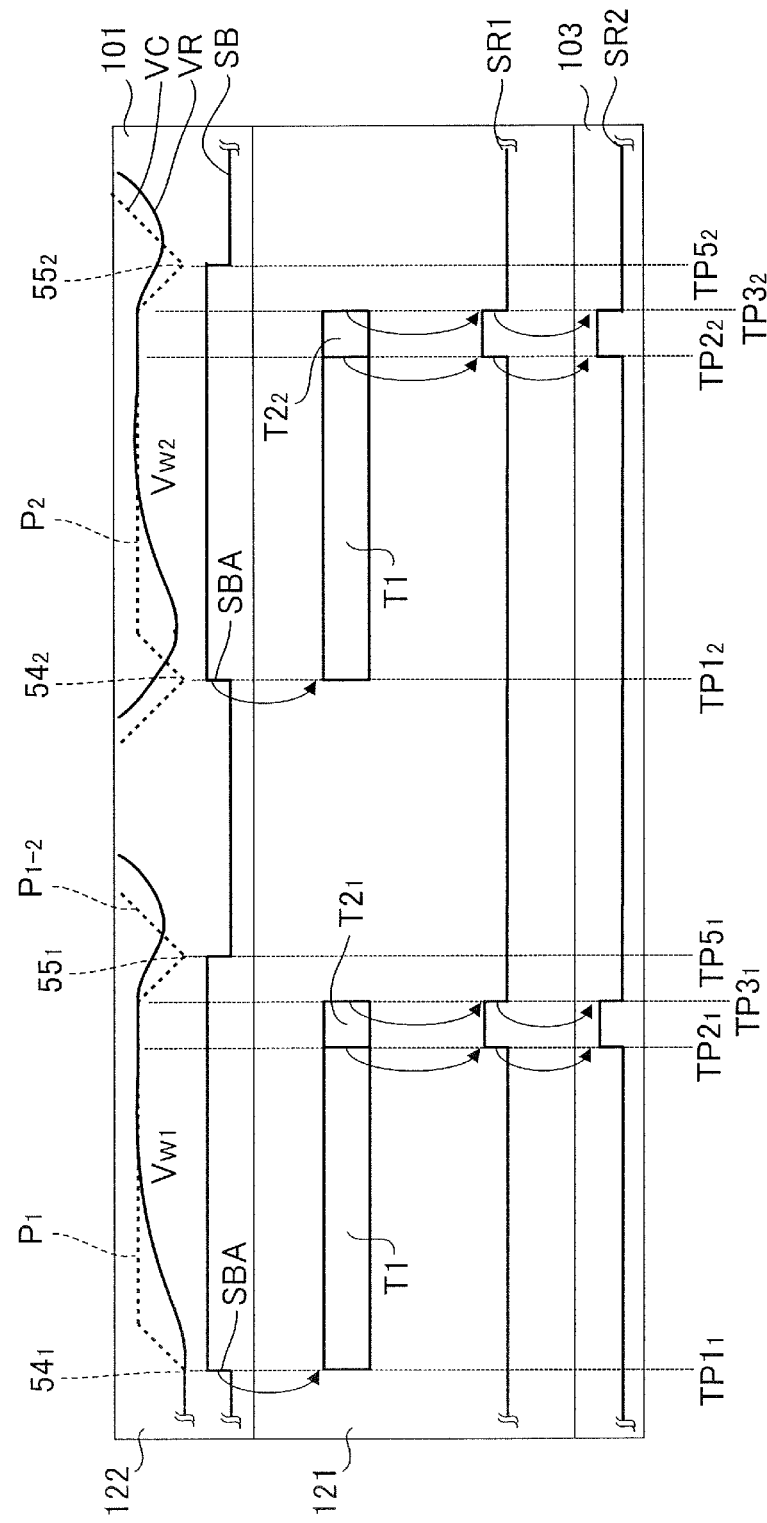
FIG. 6 is a timing chart illustrating each step of a laser processing method of performing laser processing by the laser welding apparatus in the first exemplary embodiment.

FIG. 6 is a timing chart illustrating each step of a laser processing method of performing laser processing by the laser welding apparatus 100 in the first exemplary embodiment. FIG. 6 illustrates the signal SB transmitted from the robot controller 122 to the controller 121. FIG. 6 also illustrates the actual speed VR and the commanded speed VC of the laser head 102 moved by the robot 101. FIG. 6 further illustrates the laser oscillation command SR1 transmitted from the controller 121 to the laser oscillator 103.

When automatic operation is started and the linear interpolation command including the position $55_1$ as the target position is executed, the robot controller 122 supplies the trajectory data $P_1$ for the movement from the position $54_1$ to the position $55_1$ at a predetermined control period. The robot 101 operates in accordance with the trajectory data $P_1$. That is, the robot controller 122 causes the robot 101 to start the operation of accelerating the laser head 102 such that the movement speed of the laser head 102 with respect to the processing target object W reaches the target speed $VW_1$. According to this, the laser head 102, that is, the control point starts moving from the position $54_1$ to the position $55_1$ and accelerating such that the movement speed thereof reaches the constant target speed $VW_1$.

When the robot controller 122 starts supplying the trajectory data $P_1$, the robot controller 122 simultaneously transmits a signal SBA obtained by switching the signal SB from off to on. The rising occurring when switching the signal SB from off to on serves as a synchronizing signal SBA serving as a predetermined signal. That is, the robot controller 122 transmits the synchronizing signal SBA that is the rising of the signal SB to the controller 121 when causing the robot 101 to start the operation of accelerating the laser head 102. This timing is shown as the time point $TP1_1$ in FIG. 6.

In the first exemplary embodiment, the rising of the signal SB is used as the synchronizing signal SBA. Therefore, the signal SB may shrink whenever before starting supplying the next trajectory data $P_2$ and after the control period of the controller 121 or more time has elapsed since the signal SB has risen. In the example of FIG. 6, when the robot controller 122 commands the position $55_1$ that is an end point of the trajectory data $P_1$, the robot controller 122 simultaneously switches the signal SB from on to off. To be noted, although the rising of the signal SB has been used as the synchronizing signal SBA, the synchronizing signal SBA is not limited to this, and shrinkage of the signal SB may be used as the synchronizing signal SBA.

The controller 121 monitors the signal SB transmitted from the robot controller 122, and starts timekeeping of the first time T1 when receiving the synchronizing signal SBA that is the rising of the signal SB. For example, the first time T1 is a fixed value such as 200 msec.

When the first time T1 has elapsed, the laser head 102 has reached a constant speed state at the target speed $VW_1$ for welding, and the control point is positioned at the commanded position $52_1$ illustrated in FIG. 3. Therefore, the controller 121 controls the laser oscillator 103 to generate the laser beam L when the first time T1 has elapsed after receiving the synchronizing signal SBA that is the rising of the signal SB, that is, when timekeeping of the first time T1 is finished. This time point is indicated as the time point $TP2_1$ in FIG. 6. Specifically, the controller 121 switches the laser oscillation command SR1 from off to on at the same time with the finish of timekeeping of the first time T1. That is, the controller 121 commands the laser oscillator 103 to generate a laser beam when the timekeeping of the first time T1 is finished. The laser oscillator 103 monitors the laser oscillation command SR1, and performs laser oscillation when receiving a signal indicating that the laser oscillation command SR1 has been switched from off to on. At the same time, the laser oscillator 103 switches the signal SR2 from off to on.

As described above, the robot controller 122 causes the robot 101 to start the operation of accelerating the laser head 102 such that the movement speed of the laser head 102 with respect to the processing target object W is constant at the target speed $Vw_j$. Then, the controller 121 controls the laser oscillator 103 to generate the laser beam when the first time T1 has elapsed after starting the acceleration of the laser head 102. The controller 121 detects the start of acceleration of the laser head 102 caused by the control of the robot controller 122 by receiving the synchronizing signal SBA.

Next, the controller 121 starts timekeeping of the second time $T2_1$ when the timekeeping of the first time T1 is finished. The robot controller 122 causes the robot 101 to operate such that the movement speed of the laser head 102 is maintained at the target speed Vw while the processing target object W is irradiated with the laser beam L from the laser head 102. The controller 121 controls the laser oscillator 103 to stop the generation of the laser beam L when the second time $T2_1$ has further elapsed after the first time T1 has elapsed, that is, when the timekeeping of the second time $T2_1$ is finished. This time point is indicated as the time point $TP3_1$ in FIG. 6.

Specifically, the controller 121 switches the laser oscillation command SR1 from on to off at the same time with finishing the timekeeping of the second time $T2_1$. That is, the controller 121 commands the laser oscillator 103 to stop the generation of the laser beam when the timekeeping of the second time $T2_1$ is finished. The laser oscillator 103 stops the laser oscillation when receiving the switch of the laser oscillation command SR1 from on to off.

The robot controller 122 commands the trajectory data $P_{1\text{-}2}$ to the robot 101 for the next welding after commanding the position $55_1$, which is the end point of the trajectory data $P_1$, to the robot 101. To be noted, in the case of performing the next welding by commanding the trajectory data $P_2$ to the robot 101, the above-described operation is repeated. As described above, the robot controller 122 sequentially controls the operation of the robot 101 in accordance with a plurality of pieces of trajectory data $P_1$ and $P_2$ different from each other. Each time the controller 121 receives the synchronizing signal SBA, the controller 121 controls the laser oscillator 103 to generate a laser beam when the first time T1 of the same value has elapsed. That is, the same value is used for the first time T1 instead of setting a different value for each welding target portion. Therefore, each time the controller 121 receives the synchronizing signal SBA, the controller 121 counts the same time as the first time T1 without recognizing which of the trajectory data $P_1$ and $P_2$ the robot controller 122 has started commanding, and thus the processing is simplified.

As described above, according to the first exemplary embodiment, the movement speed of the laser head 102 has reached the target speed Vw when the first time T1 has elapsed, and the processing target object W is irradiated with the laser beam in the state of the constant speed at this target speed Vw. That is, by moving the laser head 102 supported by the robot 101 at a constant speed with respect to the processing target object W, the focal point of the laser beam L can be moved at a constant speed along the surface of the processing target object W. Therefore, the amount of input heat on the processing target object W is uniformized in the movement direction of the focal point of the laser beam L, and thus a uniform welding bead can be formed on the processing target object W in the movement direction of the focal point of the laser beam L. As a result of this, highly precise laser seam welding can be realized.

Here, the control period of the robot controller 122 is set to a value suitable for controlling the operation of the robot 101, for example, several milliseconds. In the first exemplary embodiment, the controller 121 controls the start and stop of the laser beam by the laser oscillator 103 at a shorter control period than the control period of the robot controller 122. That is, in the first exemplary embodiment, the control period of the controller 121 to control the laser oscillator 103 is shorter than the control period of the robot controller 122 to control the robot 101. Therefore, the controller 121 can more accurately manage the first time T1 and the second times $T2_1$ and $T2_2$ than the robot controller 122. That is, since the controller 121 can control the laser oscillator 103 with a shorter control period, the controller 121 can more accurately manage the timing for causing the laser oscillator 103 to start and stop generation of the laser beam. As a result, variation of the length of the welding bead can be reduced, and thus variation of the welding strength can be reduced.

According to the first exemplary embodiment, the timing at which the robot controller 122 commands the start point of the trajectory data $P_j$ and the timing at which the controller 121 starts the timekeeping of the first time T1 are configured to be synchronized on the basis of the synchronizing signal SBA. The timing at which the robot controller 122 commands the start point of the trajectory data $P_j$ is the timing at which the robot controller 122 starts supplying the trajectory data $P_j$. That is, the robot controller 122 generates the synchronizing signal SBA synchronized with the operation of the robot 101, and the on/off switching of the irradiation of the laser beam is managed by the elapsed time from the time point at which the controller 121 is synchronized with the synchronizing signal SBA. Therefore, the controller 121 and the robot controller 122 synchronize the operation of the robot 101 with the on/off switching of the laser oscillation of the laser oscillator 103 without performing complicated arithmetic processing or the like. Therefore, the deviation between the timing of the operation of the robot 101 and the timing of the laser oscillation can be reduced. As a result of this, the difference between the actual position and the target position for starting the irradiation of the laser beam can be reduced. In addition, since the laser oscillation does not have to be controlled by performing complicated arithmetic processing while the robot 101 is operating, the operation of the robot 101 can be accelerated while securing the precision of laser processing, and thus the production efficiency of the processed product can be improved.

Second Exemplary Embodiment

Figure 7:
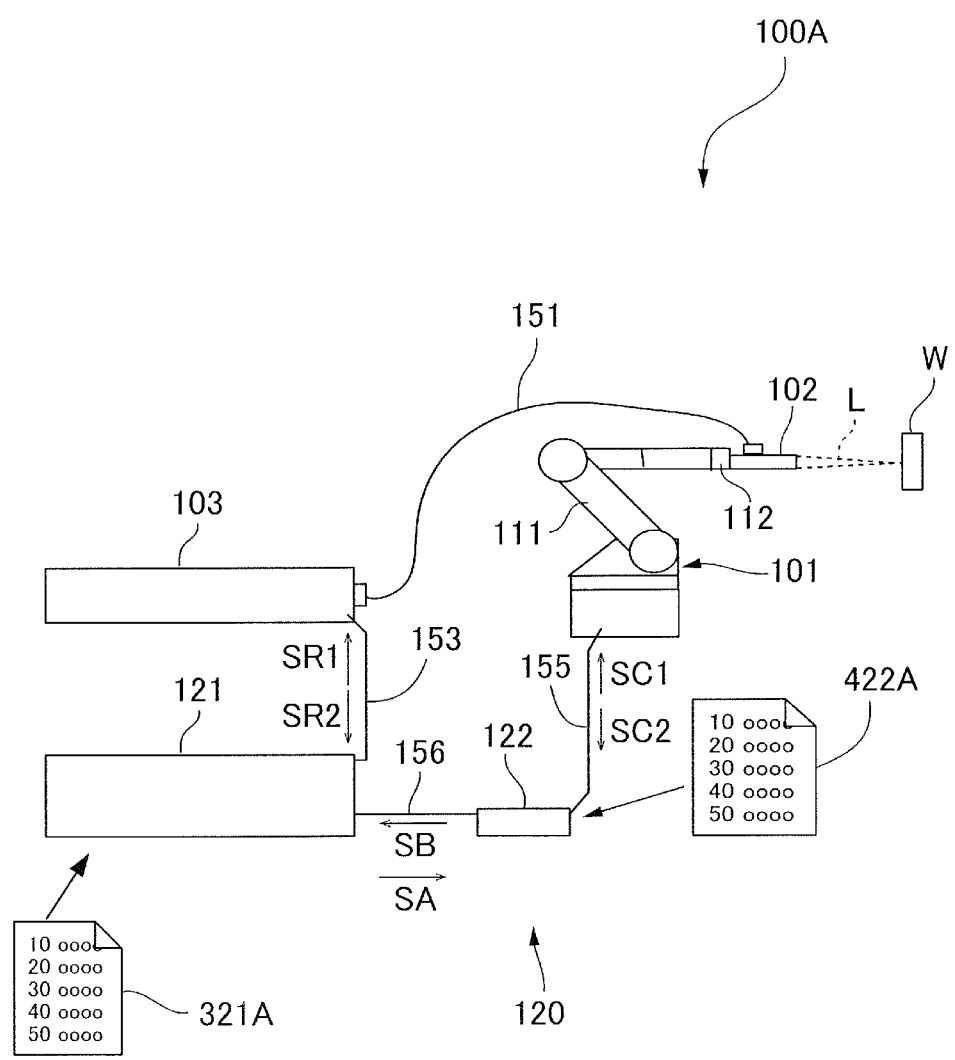
FIG. 7 is an explanatory diagram illustrating a schematic configuration of a laser welding apparatus serving as an example of a laser processing apparatus according to a second exemplary embodiment.

Next, a laser welding apparatus according to a second exemplary embodiment will be described. FIG. 7 is an explanatory diagram illustrating a schematic configuration of a laser welding apparatus 100A serving as an example of a laser processing apparatus according to the second exemplary embodiment. In the second exemplary embodiment, the overall sequence of the apparatus is managed by the controller 121. To be noted, the hardware configuration of the laser welding apparatus 100A of the second exemplary embodiment is the same as that of the laser welding apparatus 100 of the first exemplary embodiment, but programs 321A and 422A are different from the programs 321 and 422 of the first exemplary embodiment. In the second exemplary embodiment, descriptions of elements similar to the first exemplary embodiment will be omitted.

The control program 321A configured to manage the sequence is preset for the controller 121 illustrated in FIG. 7. The controller 121 transmits, to the robot controller 122, an operation start command SA serving as a predetermined command for commanding the start of operation of the robot 101. The robot controller 122 that has received the operation start command SA starts commanding the trajectory data $P_1$ and $P_2$ of FIG. 3 for performing welding in accordance with the operation start command SA. Specifically, when issuing the operation start command SA for the robot 101 to start operating, the controller 121 transmits, to the robot controller 122, an electric signal whose voltage is at a high level. Setting the voltage of the electric signal to the high level is also referred to as turning the operation start command SA on. After setting the voltage of the electric signal indicating the operation start command SA to the high level, the controller 121 sets the voltage to a low level at a predetermined timing. Setting the voltage of the electric signal to the low level is also referred to as turning the operation start command SA off. The robot controller 122 starts commanding the trajectory data $P_1$ and $P_2$ in response to the operation start command SA switching from off to on. In the example of FIG. 3, when receiving the operation start command SA, the robot controller 122 operates the robot 101 in accordance with the trajectory data $P_1$, and, subsequently, operates the robot 101 in accordance with the trajectory data $P_{1\text{-}2}$. After receiving the next operation start command SA, the robot controller 122 operates the robot 101 in accordance with the trajectory data $P_2$.

To be noted, the robot program 422A is described such that, when the robot controller 122 receives a signal indicating that the operation start command SA has been switched from off to on, the robot controller 122 starts commanding the trajectory data $P_1$ and $P_2$.

Figure 8:
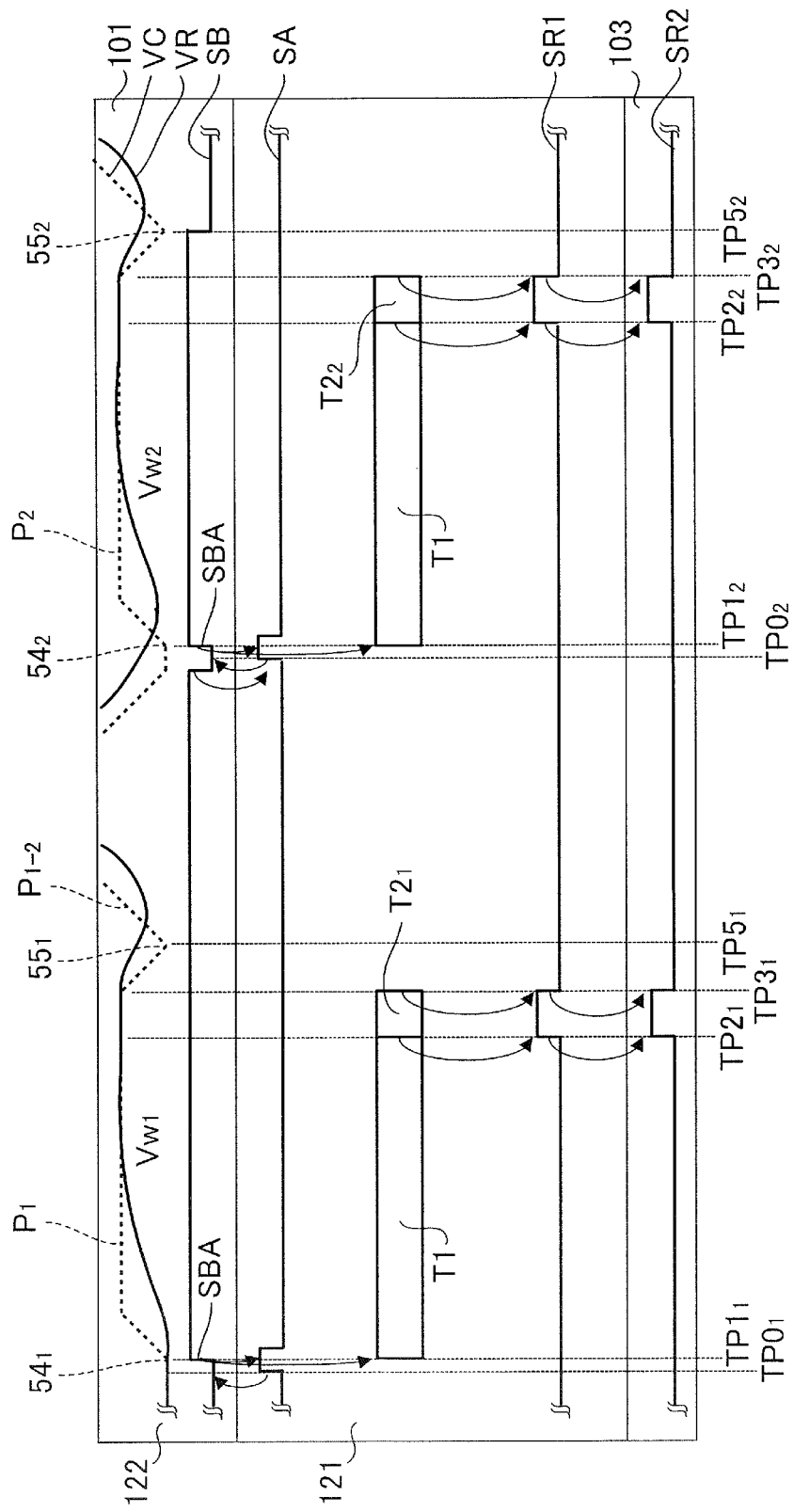
FIG. 8 is a timing chart illustrating each step of a laser processing method of performing laser processing by the laser welding apparatus in the second exemplary embodiment.

FIG. 8 is a timing chart illustrating each step of a laser processing method of performing laser processing by the laser welding apparatus 100A in the second exemplary embodiment.

FIG. 8 is different from the time chart of FIG. 6 in that the operation start command SA is added. The robot 101 starts operating in accordance with the operation start command SA. Specific description will be given below. When the automatic operation is started, the controller 121 turns the operation start command SA on. This timing is shown as a time point $TP0_1$ in FIG. 8.

The robot controller 122 monitors the operation start command SA, and starts commanding the trajectory data $P_1$ when the operation start command SA is switched from off to on. That is, the robot controller 122 causes the robot 101 to start the operation of accelerating the laser head 102 in the case of receiving the operation start command SA.

The robot controller 122 transmits the synchronizing signal SBA to the controller 121 when starting supplying the trajectory data $P_1$ to control the robot 101. This timing is shown as the time point $TP1_1$ in FIG. 8.

The controller 121 monitors the signal SB transmitted from the robot controller 122, starts timekeeping of the first time T1 when receiving the synchronizing signal SBA that is the rising of the signal SB, and then turns the operation start command SA off.

When the first time T1 has elapsed, the laser head 102 has reached the constant speed state at the target speed $VW_1$ for welding, and the control point is positioned at the commanded position $52_1$ illustrated in FIG. 3. Therefore, the controller 121 controls the laser oscillator 103 to generate the laser beam L when the first time T1 has elapsed after receiving the synchronizing signal SBA, that is, when the timekeeping of the first time T1 is finished. This time point is shown as the time point $TP2_1$ in FIG. 8.

Next, the controller 121 starts timekeeping of the second time $T2_1$ when the timekeeping of the first time T1 is finished. The controller 121 controls the laser oscillator 103 to stop the generation of the laser beam L when the second time $T2_1$ has elapsed after the first time T1 has elapsed, that is, when the timekeeping of the second time $T2_1$ is finished. This time point is shown as the time point $TP3_1$ in FIG. 8.

Specifically, the controller 121 switches the laser oscillation command SR1 from on to off at the same time with finishing the timekeeping of the second time $T2_1$. That is, the controller 121 commands the laser oscillator 103 to stop the generation of the laser beam when the timekeeping of the second time $T2_1$ is finished. The laser oscillator 103 stops the laser oscillation when receiving the switch of the laser oscillation command SR1 from on to off.

The robot controller 122 commands the trajectory data $P_{1-2}$ to the robot 101 for the next welding after commanding the position $55_1$, which is the end point of the trajectory data $P_1$, to the robot 101. The robot controller 122 switches the signal SB from on to off at the same time with commanding the end point of the trajectory data $P_{1-2}$.

After the timekeeping of the second time $T2_1$ is finished and the laser is stopped, the controller 121 monitors the signal SB turning off. The timing at which the signal SB is turned off is the timing at which the command of the end point of the trajectory data $P_{1-2}$ is completed, and indicates that the trajectory data $P_2$ for the next welding can be executed. The controller 121 turns the operation start command SA on if the signal SB has been turned off and the timekeeping of the second time $T2_1$ has been finished. This timing is shown as a time point $TP0_2$ in FIG. 8. As a result of this, the robot controller 122 commands the trajectory data $P_2$ for the next welding to the robot 101 to repeat the operation described above.

As described above, the robot controller 122 sequentially controls the operation of the robot 101 in accordance with the plurality of pieces of trajectory data $P_1$ and $P_2$ different from each other. Each time the controller 121 receives the synchronizing signal SBA, the controller 121 controls the laser oscillator 103 to generate a laser beam when the first time T1 of the same value has elapsed.

As illustrated in FIG. 8, the robot controller 122 turns the signal SB off when the command of the trajectory data $P_{1-2}$ between the trajectory data $P_1$ and $P_2$ is finished. If the operation start command SA is not turned on immediately after this, the robot controller 122 takes a standby state of monitoring the operation start command SA, and the robot 101 maintains the position. When the operation start command SA is transmitted from the controller 121 to the robot controller 122 again, the robot controller 122 starts supplying the trajectory data $P_2$.

To be noted, although the signal SB is used as a signal indicating that the robot 101 is in the standby state, a signal indicating that the robot 101 is in the standby state may be set in addition to the signal SB.

As described above, according to the second exemplary embodiment, laser seam welding can be performed with a high precision similarly to the first exemplary embodiment also in the case where the controller 121 manages the sequence. In addition, similarly to the first exemplary embodiment, complicated arithmetic processing does not have to be performed while the robot 101 is operating. Therefore, the operation of the robot 101 can be accelerated, and the production efficiency of the processed product can be improved.

As a result of the controller 121 constituted by a general-purpose computer having a good connectability with peripheral devices managing the sequence, it becomes easier for the controller 121 to access peripheral devices such as an unillustrated database. Since the controller 121 is a general-purpose computer, it is also easy to connect the controller 121 to various field buses to transmit information of the apparatus to another apparatus or reading a value of a sensor or the like. It is also easy to communicate with an external server via Ethernet (registered trademark) or the like.

The control period of the robot controller 122 is longer than the control period of the controller 121. Therefore, the timing at which the robot controller 122 recognizes the operation start command SA varies. In the second exemplary embodiment, the controller 121 starts timekeeping of the first time T1 in which the laser oscillation is performed, not at a timing at which the operation start command SA is transmitted but at a timing at which the synchronizing signal SBA is received. Therefore, the difference in the timing of operation of the robot 101 and the timing of laser oscillation of the laser oscillator 103 can be reduced.

Third Exemplary Embodiment

Next, a laser processing method using a laser welding apparatus according to a third exemplary embodiment will be described. In the third exemplary embodiment, a method of controlling the robot 101 such that the control point, that is, the focal point of the laser beam L passes taught points when the timekeeping of the first time T1 is completed and the timekeeping of the second time $T2_j$ is completed as described in the first exemplary embodiment and the second exemplary embodiment. That is, a control method of the robot 101 such that the control point passes the position $52_j$ that is the taught start point for the welding when the irradiation of the laser beam is started and a control method of the robot 101 such that the control point passes the position $53_j$ that is the taught end point for the welding when the irradiation of the laser beam is stopped will be described. In addition, in the third exemplary embodiment, a method of controlling the robot 101 such that the control point passes the position $52_j$ and the position $53_j$ at the target speed $Vw_j$ will be also described. To be noted, the laser processing method of the third exemplary embodiment can be applied to either of the first exemplary embodiment and the second exemplary embodiment.

Calculation for causing the control point to pass the position $52_j$ when starting the irradiation of the laser beam and pass the position $53_j$ when stopping the irradiation of the laser beam and for causing the scanning speed of the laser beam to be the target speed $Vw_j$ will be described.

The robot controller 122 illustrated in FIGS. 2 and 7 first calculates an acceleration distance $La_j$ and a deceleration distance $Ld_j$ for each welding target portion. Next, the robot controller 122 calculates the position $54_j$ that is a position at the acceleration distance $La_j$ from the position $52_j$ on an extension line connecting the positions $52_j$ and $53_j$. Similarly, the robot controller 122 calculates the position $55_j$ that is a position at the deceleration distance $Ld_j$ from the position $53_j$ on the extension line connecting the positions $52_j$ and $53_j$. The robot controller 122 accelerates the control point in the section between the positions $54_j$ and $52_j$ and decelerates the control point in the section between the positions $53_j$ and $55_j$, and thus the speed of the laser beam to be emitted can be the target speed $Vw_j$.

Figure 9:
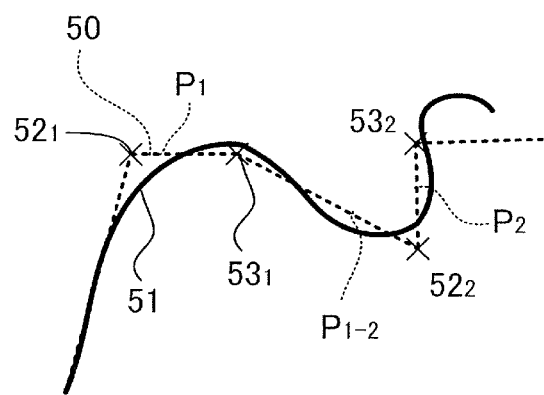
FIG. 9 is an explanatory diagram of a reference example.

The necessity of the acceleration distance $La_j$ and the deceleration distance $Ld_j$ will be described with reference to FIG. 9. FIG. 9 is an explanatory diagram of a reference example of a case where the acceleration distance $La_j$ and the deceleration distance $Ld_j$ are not provided. In FIG. 9, a broken line indicates the commanded path 50 serving as a commanded position of the control point, and a solid line indicates the actual path 51 serving as an actual position of the control point. In the example of FIG. 9, there are two portions to be subjected to laser seam welding. The first portion is a section between the position $52_1$ of the control point at which irradiation of the laser beam is started and the position $53_1$ of the control point at which the irradiation of the laser beam is finished. The second portion is a section between the position $52_2$ of the control point at which irradiation of the laser beam is started and the position $53_2$ of the control point at which the irradiation of the laser beam is finished. The first welding target portion will be described as an example. If an acceleration distance $La_1$ and a deceleration distance $Ld_1$ are 0, the actual path 51 serving as the actual position of the control point is deviated from the commanded path 50 serving as the commanded position of the control point. That is, the control point does not pass through the positions $52_1$ and $53_1$. To be noted, the commanded position is a commanded position in feedback control, and the actual position is an actual position obtained from angle information obtained from encoders provided for respective axes of the robot 101.

If the robot 101 is caused to execute the linear interpolation command to move the control point toward the position $53_1$ after recognizing that the control point has reached the position $52_1$, the control point can be linearly moved between the positions $52_1$ and $53_1$. However, in this method, the speed of the control point moving along the actual path 51 serving as the actual position when passing through the position $52_1$ is 0, and thus welding cannot be started at the target speed $VW_1$. Therefore, the acceleration distance $La_1$ and the deceleration distance $Ld_1$ need to be provided.

Figure 10:
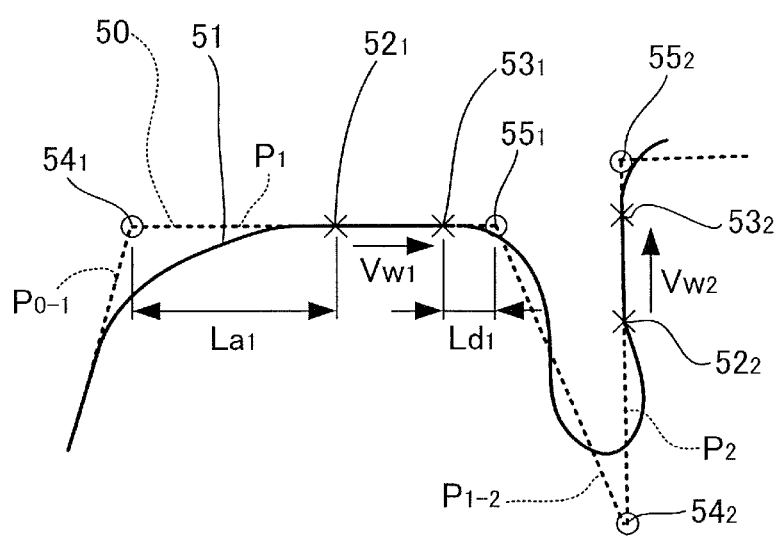
FIG. 10 is an explanatory diagram illustrating an example of a path of control point in a third exemplary embodiment.

FIG. 10 is an explanatory diagram illustrating an example of a path of the control point in which the acceleration distance $La_1$ and the deceleration distance $Ld_1$ are provided in the third exemplary embodiment. As illustrated in FIG. 10, the acceleration distance $La_1$ is the distance between the positions $54_1$ and $52_1$, and the deceleration distance $Ld_1$ is the distance between the positions $53_1$ and $55_1$. In the present exemplary embodiment, a case of FIG. 1 where the controller 121 does not command the start of operation of the robot 101 as described in the first exemplary embodiment and a case of FIG. 7 where the controller 121 commands the start of operation of the robot 101 as described in the second exemplary embodiment will be respectively described.

In the case of the first exemplary embodiment, when the robot controller 122 executes the linear interpolation command or the joint interpolation command and completes supplying trajectory data $P_{0-1}$, the robot controller 122 immediately starts executing the next linear interpolation command. The target position of the linear interpolation command is the position $55_1$. The robot controller 122 starts supplying the trajectory data $P_1$ by executing the linear interpolation command. The robot controller 122 transmits the synchronizing signal SBA of FIG. 6 serving as a predetermined signal to the controller 121 at the same time with supply of the trajectory data $P_1$, and thus causes the controller 121 to start the timekeeping of the first time T1.

In the case of the second exemplary embodiment, when the robot controller 122 completes supplying the trajectory data $P_{0-1}$, the robot controller 122 waits for the operation start command SA from the controller 121 illustrated in FIG. 8 serving as a predetermined command. The robot controller 122 immediately starts executing the next linear interpolation when receiving the operation start command SA serving as a predetermined command. The target position of the linear interpolation command is the position $55_1$. The supply of the trajectory data $P_1$ is started by the execution of the liner interpolation command. The robot controller 122 transmits the synchronizing signal SBA serving as a predetermined signal to the controller 121 at the same time with the supply of the trajectory data $P_1$, and thus causes the controller 121 to start the timekeeping of the first time T1.

In both cases of the first exemplary embodiment and the second exemplary embodiment, an appropriate acceleration distance $La_1$ is provided such that the control point passes the position $52_1$ at the same time with the controller 121 finishing the timekeeping of the first time T1. Similarly, an appropriate deceleration distance $Ld_1$ is provided such that the control point passes the position $53_1$ at the same time with the controller 121 finishing the timekeeping of the second time $T2_1$.

Figure 11:
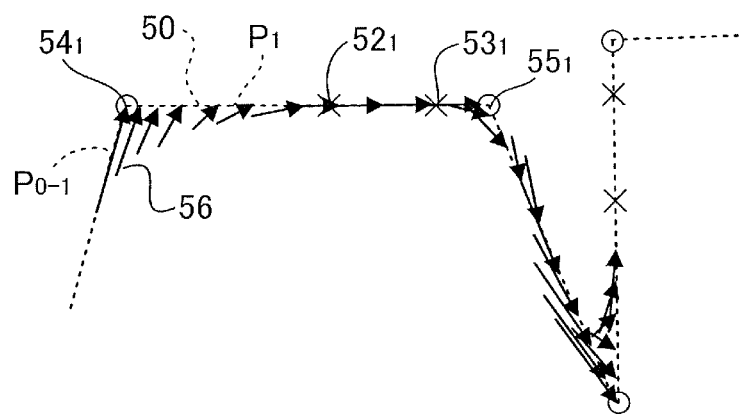
FIG. 11 is an explanatory diagram illustrating an example of the path of control point in the third exemplary embodiment.

The commanded position and the actual position do not coincide at some moments. This occurs due to response delay of the robot. The commanded position and the actual position at each moment will be described with reference to FIG. 11. FIG. 11 is an explanatory diagram illustrating an example of a relationship between the commanded position and the actual position serving as examples of the path of the control point in the third exemplary embodiment. A vector 56 in FIG. 11 indicates the actual position as a start point and the commanded position as an end point. The start point and the end point of the vector 56 changes as time passes. FIG. 11 illustrates a case where the start point and the end point are obtained a plurality of times at constant intervals and thus illustrates the change in the start point and the end point. The locus of the position of the start point of the vector 56 serves as the actual path 51 serving as the actual position of the control point, and the locus of the position of the end point of the vector 56 serves as the commanded path 50 serving as the commanded position of the control point. As illustrated in FIG. 11, although the commanded position is at the position $54_1$ at the moment in which the robot controller 122 completes supply of the trajectory data $P_{0-1}$, the actual position has not reached the position $54_1$. Therefore, when the robot controller 122 starts supplying the trajectory data $P_1$, the actual position $54_1$ is separated from the position $54_1$.

Figure 12A:
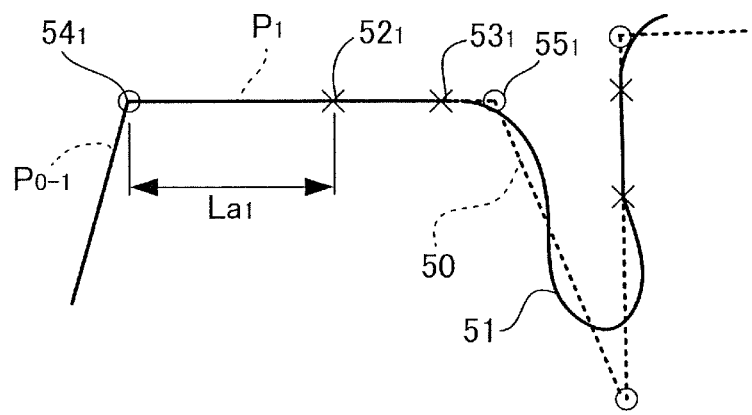
FIG. 12A is an explanatory diagram illustrating an example of the path of control point in the third exemplary embodiment.
Figure 12B:
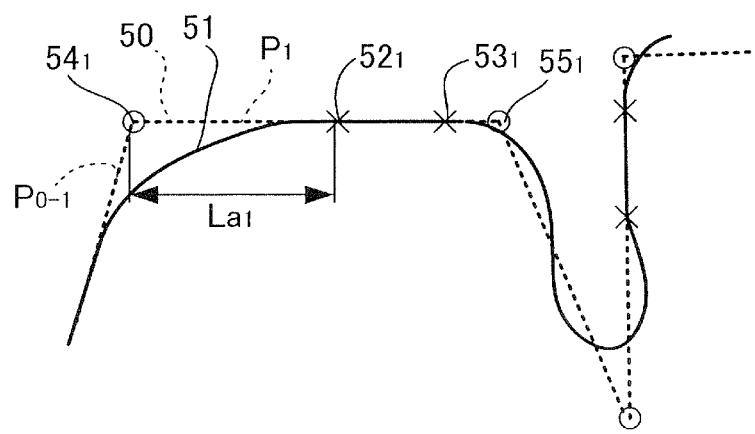
FIG. 12B is an explanatory diagram illustrating an example of the path of control point in the third exemplary embodiment.
Figure 13A:
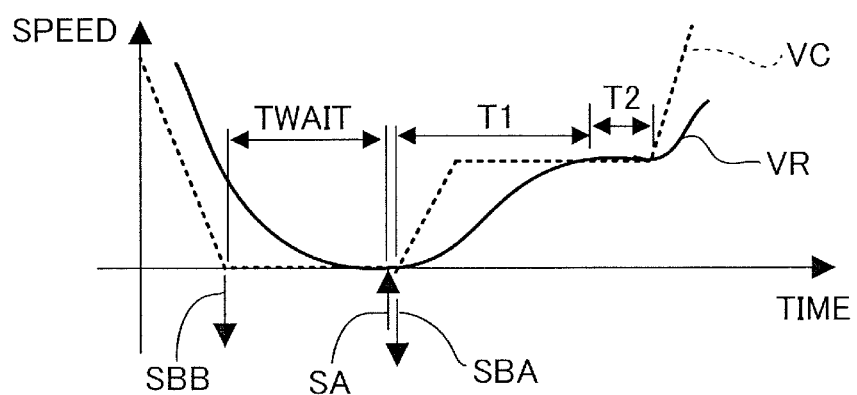
FIG. 13A is an explanatory diagram illustrating a relationship between speed and time in the third exemplary embodiment.
Figure 13B:
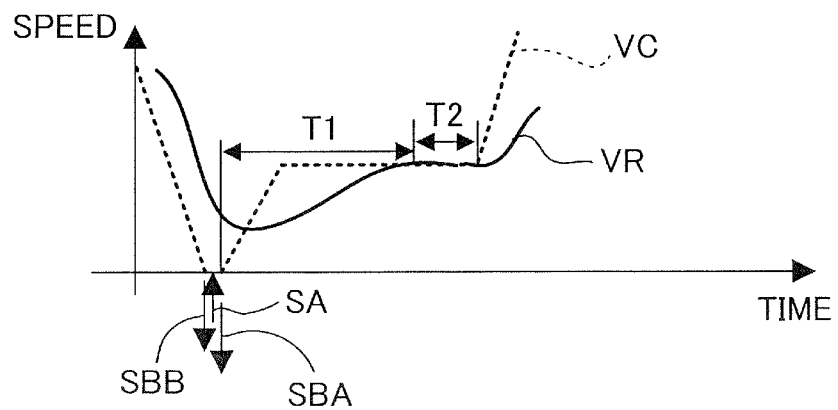
FIG. 13B is an explanatory diagram illustrating a relationship between speed and time in the third exemplary embodiment.

There is a first method in which the control point is caused to pass the position $54_1$ by starting the supply of the trajectory data $P_1$ after the control point reaches the position $54_1$ and a second method in which the control point passing the position $54_1$ is not waited for. The first method is illustrated in FIGS. 12A and 13A, and the second method is illustrated in FIGS. 12B and 13B. Since a time for waiting for the control point to actually reach the position $54_1$ is needed in the first method, which delays the operation, the second method is preferred.

FIGS. 12A and 12B are explanatory diagrams each illustrating an example of the path of the control point in the third exemplary embodiment. FIGS. 13A and 13B are explanatory diagrams each illustrating a relationship between speed and time in the third exemplary embodiment. Although FIG. 13A illustrates a case where the controller 121 transmits the operation start command SA serving as a predetermined command as in the second exemplary embodiment, the operation start command SA does not have to be transmitted as in the first exemplary embodiment.

According to the first method, by waiting for the control point to actually reach the position $54_1$ as illustrated in FIGS. 12A and 13A, it becomes easier to cause the control point to pass the positions $52_1$ and $53_1$. In the first method illustrated in FIGS. 12A and 13A, the first time T1 may be determined only in consideration of the time for the actual speed VR to reach the target speed. The acceleration distance $La_1$ may be determined by using the determined first time T1. However, in the first method, a time TWAIT for waiting for the control point to actually reach the position $54_1$ is needed. From the viewpoint of productivity, the waiting time TWAIT is preferably shorter.

To use the first method in the case where the operation start command is not used as in the first exemplary embodiment, the robot controller 122 performs the following processing. That is, the robot controller 122 recognizes the control point actually reaching the position $54_1$ after completing the supply of the trajectory data $P_{0-1}$, and then transmits the synchronizing signal SBA to the controller 121 at the same time with starting supplying the trajectory data $P_1$.

To use the first method in the case where the operation start command is used as in the second exemplary embodiment, the robot controller 122 performs the following processing. That is, the robot controller 122 recognizes the control point actually reaching the position $54_1$ after completing the supply of the trajectory data $P_{0-1}$, and then switches the signal SB from on to off to notify the controller 121 that the robot controller 122 is ready for receiving the operation start command SA. Hereinafter, a signal SBB for notifying that the signal SB has been switched from on to off and the robot controller 122 is ready for receiving the operation start command SA will be also referred to as a robot standby signal SBB.

According to the second method, there is a case where the control point does not reach the position $54_1$ as illustrated in FIGS. 12B and 13B. This case where the control point does not reach the position $54_1$ will be described.

In the case where the operation start command is not used as in the first exemplary embodiment, the robot controller 122 transmits the synchronizing signal SBA to the controller 121 at the same time with starting supplying the trajectory data $P_1$ after completing the supply of the trajectory data $P_{0-1}$.

In the case where the operation start command is used as in the second exemplary embodiment, the robot controller 122 transmits the robot standby signal SBB to the controller 121 to notify that the robot controller 122 is ready for receiving the operation start command SA after completing the supply of the trajectory data $P_{0-1}$.

It is often the case that the control point has not reached the position $54_1$ when the robot controller 122 receives the operation start command SA from the controller 121. To be noted, in the case where the robot controller 122 does not immediately receive the operation start command SA, there is a possibility that the control point reaches the position $54_1$ when the robot controller 122 receives the operation start command SA. In this case, the same relationship is obtained between speed and time as FIGS. 12A and 13A.

As illustrated in FIGS. 12B and 13B, in the second method, there is a possibility that although the commanded path 50 serving as the commanded position of the control point passes the position $54_1$, the actual path 51 serving as the actual position of the control point does not pass the position $54_1$. This is because the robot controller 122 starts supplying the trajectory data $P_1$ regardless of the actual position when the commanded position reaches the position $54_1$, that is, supply of the trajectory data $P_{0-1}$ is completed. Since the target position is changed from the position $54_1$, the control point does not actually pass the position $54_1$. In the second method, the time TWAIT as illustrated in FIG. 13A is not needed, and thus the second method is advantageous from the viewpoint of productivity. However, in the second method, how the first time T1 is determined is complicated. To determine the first time T1, time for the actual speed VR to reach the target speed is needed, and it is also needed that the control point passes the position $52_1$ serving as the start point for the welding and the position $53_1$ serving as the end point for the welding.

Figure 14A:
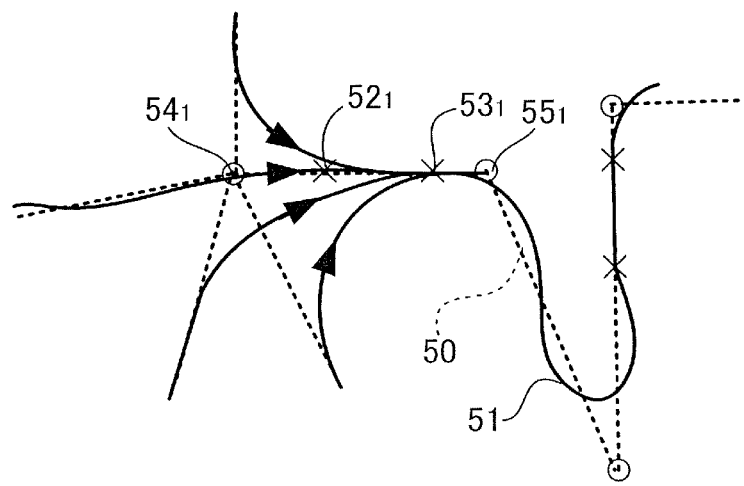
FIG. 14A is an explanatory diagram illustrating an example of the path of control point in the third exemplary embodiment.
Figure 14B:
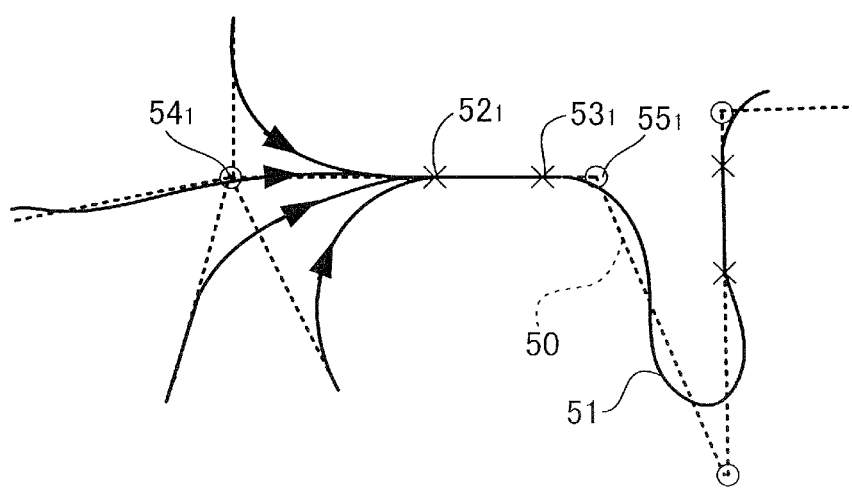
FIG. 14B is an explanatory diagram illustrating an example of the path of control point in the third exemplary embodiment.

A procedure of causing the control point to pass the positions $52_1$ and $53_1$ will be described. FIGS. 14A and 14B are each an explanatory diagram illustrating an example of the path of the control point in the third exemplary embodiment. FIGS. 14A and 14B each illustrate an example in which the control point approaches the position $54_1$ from various positions. Each of FIGS. 14A and 14B illustrates an example of the second method illustrated in FIGS. 12B and 13B, and the control point does not actually pass the position $54_1$.

FIG. 14A illustrates a case where the first time T1 is set to be short as an example. In FIG. 14A, since the first time T1 is short, the control point does not pass the position $52_1$ serving as the start point for the welding. That is, the actual path 51 of the control point is deviated from the position $52_1$ serving as the start point for the welding.

FIG. 14B illustrates a case where the first time T1 is set to be long as an example. In FIG. 14B, the control point passes the position $52_1$ serving as the start point for the welding. That is, the actual path 51 of the control point passes the position $52_1$ serving as the start point for the welding. Since the position $54_1$ is determined in accordance with the first time T1, the position $54_1$ is set at a position farther from the position $52_1$ when the first time T1 is longer. How the position $54_1$ is determined will be described later.

In the case of the second method illustrated in FIGS. 12B and 13B, two things need to be considered to determine the first time T1. The first is the time for the actual speed VR to reach the target speed. As has been described, the time at which the actual speed VR of the laser head 102 reaches a constant speed of the target speed $VW_1$ is measured in each condition while operating the robot 101 in various conditions with trial and error, and the lower limit value of the first time T1 is determined from measurement results of these.

The second is causing the control point to pass the positions $52_1$ and $53_1$. Whether or not the control point passes the position $52_1$ is tested while causing the robot 101 to approach the position $54_1$ from various positions in various conditions with trial and error. Then, the lower limit value of the first time T1 is determined from test results of the conditions. Finally, the larger value among the two lower limit values is determined as the first time T1.

Figure 15:
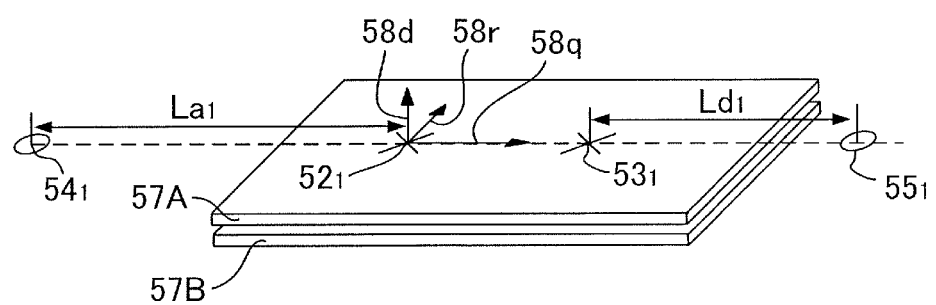
FIG. 15 is a diagram for describing a measurement method for determining a first time in the third exemplary embodiment.

A specific example of how the first time T1 is determined will be described. FIG. 15 is a diagram for describing a measurement method for determining the first time T1 in the third exemplary embodiment. FIG. 15 illustrates a case of welding a plate 57A and a plate 57B together. It is assumed that the positions $52_1$ and $53_1$ are on the plate 57A. The direction of a welding bead starting from the position $52_1$ and ending at the position $53_1$ is referred to as a direction $58q$. A direction perpendicular to the direction $58q$ and parallel to the plate 57A is referred to as a direction $58r$. A normal direction perpendicular to the plate 57A is referred to as a direction $58d$. A line segment connecting the positions $52_1$ and $53_1$ is extended on the position $52_1$ side, and the position $54_1$ is set on the extension line. The distance between the positions $52_1$ and $54_1$ is set to be sufficiently long, and the acceleration distance $La_1$ is preliminarily set. The acceleration distance $La_1$ is the length of a line segment connecting the positions $52_1$ and $54_1$. Similarly, the line segment connecting the positions $52_1$ and $53_1$ is extended on the position $53_1$ side, and the position $55_1$ is set on the extension line. The distance between the positions $53_1$ and $55_1$ are set to be sufficiently long, and the deceleration distance $Ld_1$ is preliminarily set. The deceleration distance $Ld_1$ is the length of a line segment connecting the positions $53_1$ and $55_1$.

The robot controller 122 is caused to perform the next processing in a state in which the positions $54_1$ and $55_1$ have been set. That is, the robot controller 122 performs control of moving the control point from various positions to the position $54_1$ in accordance with a linear interpolation movement commend or a joint interpolation movement command and then moving the control point from the moved position to the position $55_1$ in accordance with the linear interpolation movement command.

Figure 16:
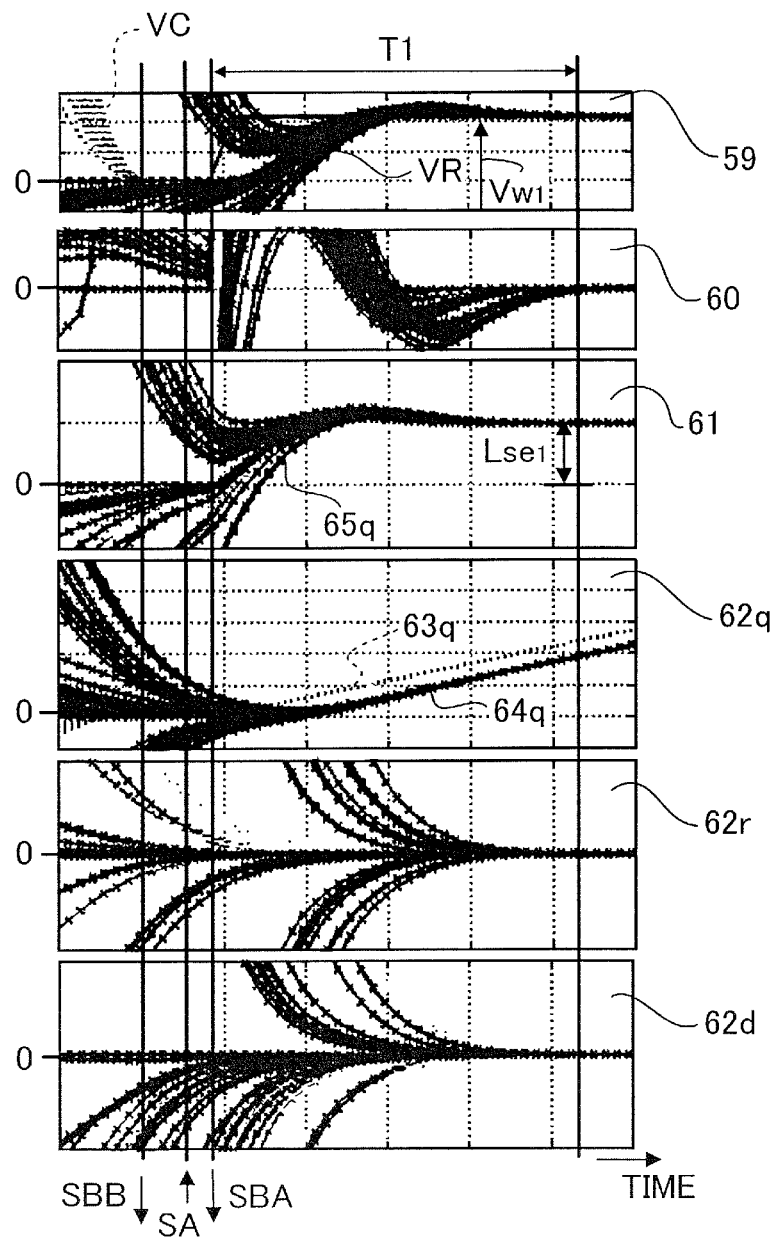
FIG. 16 is a graph illustrating an example of response in the case where a control point is moved in accordance with a movement command in the third exemplary embodiment.

FIG. 16 is a graph illustrating an example of response when the control point is moved in accordance with a movement command in the third exemplary embodiment. FIG. 16 illustrates graphs of response wave forms 59, 60, 61, $62q$, $62r$, and $62d$ in this order from the top to the bottom.

The response waveform 59 is a response waveform of the speed in the direction $58q$, which is the direction of the welding bead. The response waveform 60 is a response waveform of speed deviation in the direction $58q$, which is the direction of the welding bead. The response waveform 61 is a waveform of position deviation in the direction $58q$, which is the direction of the welding bead. The response waveform $62q$ is a waveform of the position in the direction $58q$, which is the direction of the welding bead. The response waveform $62r$ is a response waveform of the position in the direction $58r$. The response waveform $62d$ is a response waveform of the position in the direction $58d$. To be noted, in FIG. 16, the horizontal axis represents time. In FIG. 16, the signal SBB, the signal SA, and the signal SBA are indicated by vertical lines. In this measurement, it is preferable that the controller 121 transmits the signal SA immediately after receiving the signal SBB.

The first time T1 is determined on the basis of whether or not the speed is within an allowable range from the target speed $VW_1$ in the response waveform 59 of the speed, and whether or not the position is within an allowable range in the waveforms $62q$, $62r$, and $62d$ which are response waveforms of the position. The first time T1 can be determined as a time from when the signal SBA is transmitted to when all of the response waveforms 59, $62q$, $62r$, and $62d$ are within the allowable ranges.

Although only the target speed $VW_1$ is illustrated in FIG. 16 as an example for description, when there are a plurality of welding target portions, the target speed is set for each of the welding target portions. In the case of setting the first time T1 to a fixed value for all the welding target portions, it is preferable to measure the time for all the response waveforms 59, $62q$, $62r$, and $62d$ to be within the allowable ranges for each welding target portion.

In this manner, the first time T1 can be determined. Next, the acceleration distance $La_1$ is calculated by using the first time T1 such that the control point passes the position $52_1$ at a moment at which the elapse of the first time T1 is completed.

The calculation formula for calculating the acceleration distance $La_1$ changes in accordance with the characteristic of a control system. The control system has a concept called "type", and the response characteristic changes in accordance with the type. The type of the feedback control system of the robot controller 122 can be obtained from the results of measurement illustrated in FIG. 16. In the case of FIG. 16, the type is Type 1.

The feedback control system is known to have deviation shown in Table 1 in the case where feed forward control is not performed.

TABLE 1

| Input | | r(t) = h | r(t) = vt | r(t) = at²/2 |
|---|---|---|---|---|
| Control System | 0 | h/(1 + K) | ∞ | ∞ |
| | 1 | 0 | v/K | ∞ |
| | 2 | 0 | 0 | a/K |

Table 1 shows relationship between the type of the control system and position deviation at a time t=∞. Table 1 shows which constant value the position deviation has at t=∞ in the case where step input r(t)=h, ramp input r(t)=vt, and parabola input r(t)=at²/2 are respectively input in the control system.

In FIG. 16, the welding operation is an operation of controlling the control point at the constant target speed VW₁ in the welding direction 58q illustrated in FIG. 15, and thus the position command is ramp input. That is, in the response waveform 62q, a position command 63q in the welding direction 58q illustrated in FIG. 15 is ramp input. An actual position response 64q is a ramp response to the position command 63q. Position deviation 65q is obtained by subtracting the position response 64q from the position command 63q. Therefore, it can be seen that the position deviation 65q is a constant value at t=∞. That is, it can be seen that the type of the control system is Type 1 from FIG. 16. To be noted, although an example of the first welding target portion has been shown for description, the same applies to the j-th welding target portion.

Figure 17:
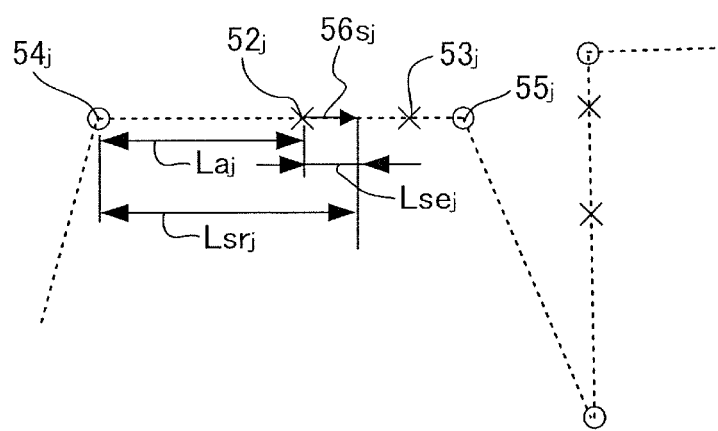
FIG. 17 is a diagram for describing a method of calculating an acceleration distance in the third exemplary embodiment.

The acceleration distance $La_j$ is calculated in consideration of the above. FIG. 17 is a diagram for describing how the acceleration distance $La_j$ is calculated in the third exemplary embodiment. To calculate the acceleration distance $La_j$, calculation needs to be performed backward from the position at which the robot 101 is supposed to be positioned at the moment at which the elapse of the first time T1 is completed. FIG. 17 illustrates the moment at which the elapse of the first time T1 is completed. In addition, FIG. 17 illustrates an example of the j-th welding target portion.

A vector $56s_j$ is a vector indicating the commanded position with respect to the actual position at the moment at which the elapse of the first time T1 is completed. The start point of the vector $56s_j$ corresponds to the actual position and the end point of the vector $56s_j$ corresponds to the commanded position. At the moment at which the elapse of the first time T1 is completed, the control point needs to be actually at the position $52_j$. The acceleration distance $La_j$ can be expressed by a distance $Lsr_j$ and a distance $Lse_j$. The distance $Lsr_j$ is a distance in which the commanded position of the robot 101 moves in the elapse of the first time T1, and the distance $Lse_j$ is a distance derived from the response delay of the robot 101 at the time point at which the elapse of the first time T1 is completed. The acceleration distance $La_j$ is calculated by the following formula (2). Specifically, the acceleration distance $La_j$ is obtained by subtracting the distance $Lse_j$ from the distance $Lsr_j$. The CPU 401 of the robot controller 122 illustrated in FIG. 2 obtains the acceleration distance $La_j$ by using the formula (2).

$$La_j = Lsr_j - Lse_j \tag{2}$$

If the acceleration distance $La_j$ is obtained, the position $54_j$ can be calculated. First, in order to determine an extension direction, the CPU 401 obtains a unit vector $Pdir_j$ by using the following formula (3). In the formula (3), $Ps_j$ represents the position $52_j$ at which the irradiation of the laser beam is started, and $Pe_j$ represents the position $53_j$ at which the irradiation of the laser beam is stopped.

$$\vec{P}dir_j = \frac{\vec{P}e_j - \vec{P}s_j}{\|\vec{P}e_j - \vec{P}s_j\|_2} \tag{3}$$

$\vec{P}dir_j$: unit vector $\vec{P}s_j$: start position of laser beam irradiation $\vec{P}e_j$: end position of laser beam irradiation The calculation of the formula (3) is calculation of dividing a vector having the position $52_j$ as the start point and the position $53_j$ as the end point by a distance. That is, the unit vector $Pdir_j$ is a vector of a length of 1 indicating the direction in which the formation of bead progresses. The CPU 401 calculates the position $54_j$ by using the unit vector $Pdir_j$ and the acceleration distance $La_j$. The following formula (4) is a calculation formula for the position $54_j$. Here, $Pa_j$ represents the position $54_j$ as a position at which the acceleration is started.

$$\vec{P}a_j = \vec{P}s_j - La_j \cdot \vec{P}dir_j \tag{4}$$

$\vec{P}a_j$: acceleration start position

Next, how the distance $Lsr_j$ in which the commanded position of the robot 101 moves in the elapse of the first time T1 and the distance $Lse_j$ derived from the response delay of the robot 101 at the time point at which the elapse of the first time T1 is completed are actually calculated will be described.

Although the distance $Lsr_j$ changes in accordance with the trajectory of the robot 101 generated by the robot controller 122, the distance $Lsr_j$ can be easily calculated in the case where a speed command has a trapezoidal shape. As an example, a case where the speed command has a trapezoidal shape and an acceleration time Ta is a fixed value will be described.

Figure 18:
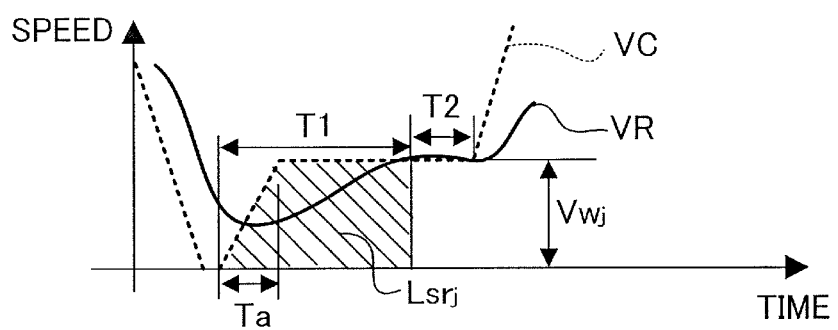
FIG. 18 is a diagram illustrating a relationship between time and speed of a moving control point in the third exemplary embodiment.

FIG. 18 is a diagram illustrating a relationship between speed and time of a moving control point in the third exemplary embodiment. FIG. 18 illustrates the distance $Lsr_j$ in which the commanded position of the robot 101 moves in the elapse of the first time T1. The area of a hatching portion illustrated in FIG. 18 is the distance $Lsr_j$. Therefore, the calculation formula for the distance $Lsr_j$ is the following formula (5). To be noted, the target speed $Vw_j$ is a target welding speed for the j-th welding target portion.

$$Lsr_j = \frac{1}{2} Ta \cdot Vw_j + (T1 - Ta) \cdot Vw_j \tag{5}$$

How the distance $Lse_j$ is calculated varies depending of the type of the control system shown in Table 1. The robot 101 is controlled such that the movement speed is kept at the target speed until the timekeeping of the first time T1 and the timekeeping of the second time $T2_j$ are completed. Therefore, as shown in Table 1, the ramp input r(t) is vt. Therefore, in the case of the control system of Type 2, the distance $Lse_j$ is 0. In the case of the control system of Type 1, the distance $Lse_j$ is v/K. In the case of the control system of Type 0, the distance $Lse_j$ is a function of the time t. Since the control system of Type 0 is seldom employed as the control system of the robot 101, the control system of the robot 101 is Type 2 or Type 1. In the case where the control system of the robot 101 is Type 1, the calculation formula for the distance $Lse_j$ is the following formula (6) in which the target speed $Vw_j$ is divided by a predetermined constant Kv. The CPU 401 of the robot controller 122 illustrated in FIG. 2 calculates the distance $Lse_j$ by using the formula (6).

$$Lse_j = \frac{Vw_j}{Kv} \tag{6}$$

In this manner, the acceleration distance $La_j$ can be calculated, and the position $54_j$ can be calculated. As a result of this, the control point can be caused to actually pass the position $52_j$ at the moment at which the elapse of the first time T1 is completed.

How the deceleration distance $Ld_j$ is calculated will be described in a similar manner. By calculating the deceleration distance $Ld_j$ and the position $55_j$, the control point can be caused to actually pass the position $53_j$ at the moment at which the elapse of the second time $T2_j$ is completed.

Figure 19:
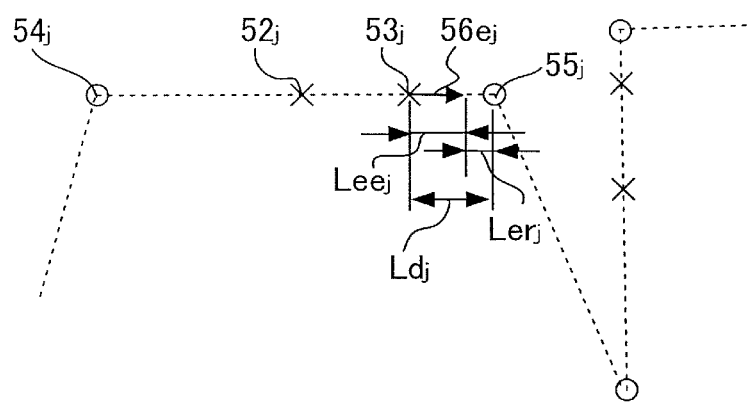
FIG. 19 is a diagram for describing a method of calculating a deceleration distance in the third exemplary embodiment.

FIG. 19 is a diagram for describing how the deceleration distance $Ld_j$ is calculated in the third exemplary embodiment. To calculate the deceleration distance $Ld_j$, calculation needs to be performed backward from the position at which the robot 101 is supposed to be positioned at the moment at which the elapse of the second time $T2_j$ is completed. FIG. 19 illustrates the moment at which the elapse of the second time $T2_j$ is completed. In addition, FIG. 19 illustrates an example of the j-th welding target portion.

A vector $56e_j$ is a vector indicating the commanded position with respect to the actual position at the moment at which the elapse of the second time $T2_j$ is completed. The start point of the vector $56e_j$ corresponds to the actual position and the end point of the vector $56e_j$ corresponds to the commanded position. At the moment at which the elapse of the second time $T2_j$ is completed, the control point needs to be actually at the position $53_j$. The actual speed at the moment at which the elapse of the second time $T2_j$ is completed is preferably equal to the target speed $Vw_j$. The deceleration distance $Ld_j$ can be expressed by a distance $Ler_j$ and a distance $Lee_j$. The distance $Le_j$ is a distance in which the commanded position moves after the time point when the elapse of the second time $T2_j$ is completed until the commanded position reaches the position $55_j$ and stops, and the distance $Lee_j$ is a distance derived from the response delay of the robot 101 at the time point at which the elapse of the second time $T2_j$ is completed. The deceleration distance $Ld_j$ is calculated by the following formula (7). Specifically, the deceleration distance $Ld_j$ is obtained by adding the distance $Ler_j$ to the distance $Lee_j$. The CPU 401 of the robot controller 122 illustrated in FIG. 2 obtains the deceleration distance $Ld_j$ by using the formula (7).

$$Ld_j = Ler_j + Lee_j \quad (7)$$

If the deceleration distance $Ld_j$ is obtained, the position $55_j$ can be calculated. The CPU 401 calculates the position $55_j$ by using the unit vector $Pdir_j$ obtained by using the formula (3). Here, Pdj represents the position $55_j$ as a position at which the control point stops after deceleration.

$$\vec{P}d_j = \vec{P}e_j + Ld_j \cdot \vec{P}dir_j \quad (8)$$

$\vec{P}d_j$: stop position after deceleration

Next, how the distance $Ler_j$ in which the commanded position moves after the time point when the elapse of the second time $T2_j$ is completed until the commanded position reaches the position $55_j$ and the distance $Lee_j$ derived from the response delay of the robot 101 at the time point at which the elapse of the second time $T2_j$ is completed are actually calculated will be described.

Although the distance $Ler_j$ changes in accordance with the trajectory of the robot 101 generated by the robot controller 122, the distance $Ler_j$ can be easily calculated in the case where a speed command has a trapezoidal shape. As an example, a case where the speed command has a trapezoidal shape and a deceleration time Td is a fixed value will be described.

Figure 20A:
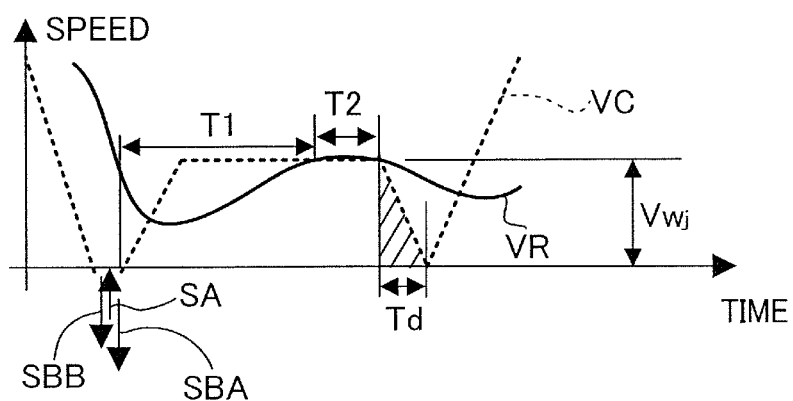
FIG. 20A is a diagram for describing processing of a robot controller in the third exemplary embodiment.
Figure 20B:
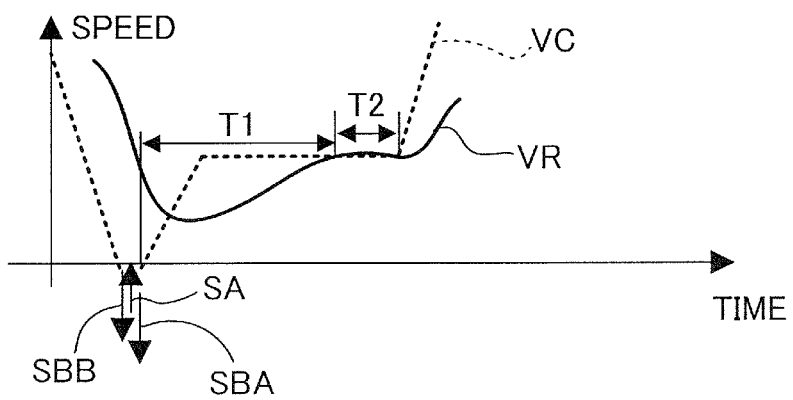
FIG. 20B is a diagram for describing processing of the robot controller in the third exemplary embodiment.

FIGS. 20A and 20B are diagrams for describing processing of the robot controller 122 after the elapse of the second time $T2_j$ in the third exemplary embodiment. FIG. 20A illustrates an example in which the commanded speed VC becomes 0 after the elapse of the second time $T2_j$, that is, an example in which the commanded position is temporarily stopped at the position $55_j$. Although the commanded speed VC temporarily becomes 0, since acceleration is immediately started, the actual speed VR does not become 0. Therefore, although the control point is decelerated, the control point moves toward the next welding target portion without stopping. In FIG. 20A, the area of the hatching portion is the distance $Ler_j$. Therefore, the following formula (9) is the calculation formula for the distance $Ler_j$.

$$Ler_j = \frac{1}{2} Td \cdot Vw_j \quad (9)$$

How the distance $Lee_j$ is calculated varies depending of the type of the control system shown in Table 1. In the case of the control system of Type 2, the distance $Lee_j$ is 0. In the case of the control system of Type 1, the distance $Lee_j$ is obtained by dividing the target speed $Vw_j$ by the predetermined constant Kv. In the case of the control system of Type 1, the calculation formula is the same as the formula (6), and $Lee_j$ is equal to $Lse_j$ in calculation. The CPU 401 of the robot controller 122 illustrated in FIG. 2 calculates the distance $Lee_j$ by using the following formula (10).

$$Lee_j = \frac{Vw_j}{Kv} \quad (10)$$

To be noted, the constant Kv used in the formulae (6) and (10) is an unknown value. Therefore, the constant Kv needs to be identified in advance and stored in a storage device of the robot controller 122 illustrated in FIG. 2, for example, the HDD 404. Regarding the identification method thereof, for example, an experiment such as one illustrated in FIG. 16 can be conducted to obtain the response waveform 61, and the value of the response waveform 61 when the first time T1 has elapsed can be calculated as the value of the distance $Lse_j$. Specifically, the target speed $Vw_j$ can be divided by the measured distance $Lse_j$. This calculation is expressed by the following formula (11).

$$Kv = \frac{Vw_j}{Lse_j} \quad (11)$$

Although an example in which the commanded position is caused to stop at the position $55_j$ has been described as an example of calculation of the deceleration distance $Ld_j$, the commanded position does not have to be stopped. FIG. 20B illustrates an example in which the commanded speed VC is not 0 after the elapse of the second time $T2_j$. This is generally referred to as continuous interpolation operation. From the viewpoint of productivity, it is preferable to perform the continuous interpolation operation of moving the control point to the next welding target portion without deceleration as illustrated in FIG. 20B. Although how the deceleration distance $Ld_j$ is obtained in the case of performing the continuous interpolation operation depends on how the trajectory is generated by the robot controller 122, the formula (9) can be still used in the case where the start points for acceleration and deceleration when the continuous interpolation operation is not performed serve as transition points for interpolation operation to the next target position. In the case where the transition points for the interpolation operation to the next target position are different, the formula (9) needs to be adjusted in accordance with how the trajectory is generated. In either case, it is necessary to keep the commanded speed VC at the target speed $Vw_j$ and prevent the commanded position from deviating from the line connecting the positions $52_j$ and $53_j$ until the moment at which the elapse of the second time $T2_j$ is completed. Since the robot 101 has response delay, the actual position is deviated from the commanded position. Therefore, correction needs to be performed by using the distance $Lee_j$.

In this manner, the deceleration distance $Ld_j$ can be calculated, and the position $55_j$ can be calculated. As a result of this, the control point can be caused to actually pass the position $53_j$ at the moment at which the elapse of the second time $T2_j$ is completed.

To be noted, in the case where there are a plurality of welding target portions, the distance $Lse_j$ may be measured for each welding target portion and the constant Kv may be calculated from the average value thereof. That is, the constant Kv may be calculated by the following formula (12) instead of the formula (11).

$$Kv = \frac{\sum_{j=1}^{N} \frac{Vw_j}{Lse_j}}{N} \qquad (12)$$

As described above, according to the third exemplary embodiment, the control point of the robot 101, that is, the focal point of the laser beam L can be caused to pass taught points when the timekeeping of the first time T1 is completed and when the timekeeping of the second time $T2_j$ is completed. That is, the control point can be caused to pass, with a high position precision, the position $52_j$ that is a taught start position for the welding when starting the laser irradiation. Similarly, the control point can be caused to pass, with a high position precision, the position $53_j$ that is a taught end position for the welding when stopping the laser irradiation. In addition, according to the third exemplary embodiment, the control point can be caused to pass the positions $52_j$ and $53_j$ at the target speed $Vw_j$.

Fourth Exemplary Embodiment

Next, a laser processing method using a laser welding apparatus according to a fourth exemplary embodiment will be described. In the third exemplary embodiment, a method of obtaining the distances $Lse_j$ and $Lee_j$ derived from the response delay of the robot 101 by using the formulae (6) and (10) in accordance with the type of the control system shown in Table 1 has been described. In addition, in the third exemplary embodiment, the constant Kv in the formulae (6) and (10) is set to the same value regardless of the welding target portion.

However, when the robot 101 is operated, since the inertia moment of the robot 101 varies between an orientation in which the robot arm 111 is extended and an orientation in which the robot arm 111 is contracted, the response characteristic of the robot 101 changes between these orientations. Therefore, error can occur in the case where the distances $Lse_j$ and $Lee_j$ are calculated by using the constant Kv of the same value regardless of the welding target portion. Therefore, in the fourth exemplary embodiment, a method of obtaining the distances $Lse_j$ and $Lee_j$ in advance for each welding target portion will be described.

Figure 21:
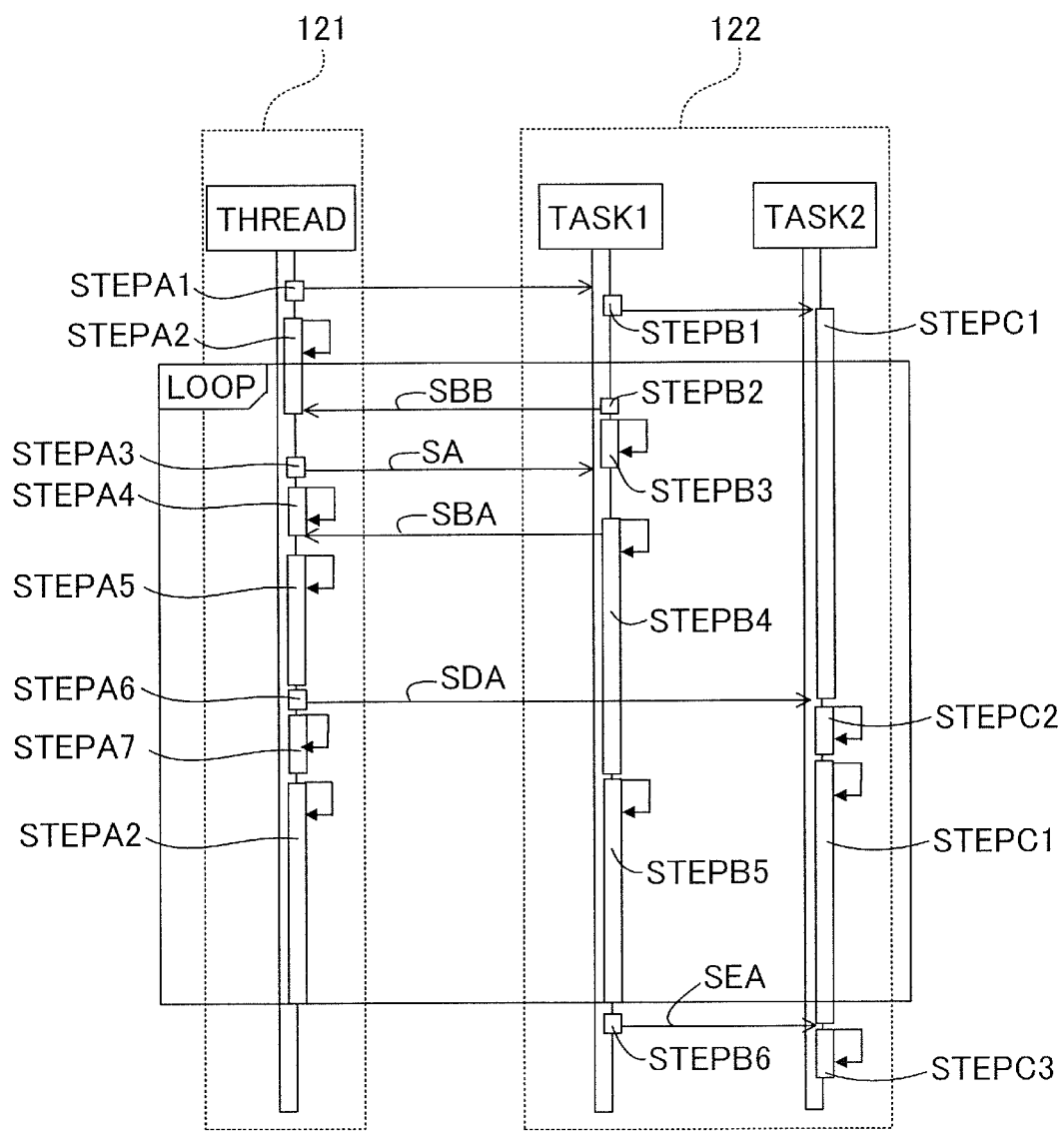
FIG. 21 is a sequence diagram illustrating communication between a controller and a robot controller in a fourth exemplary embodiment.

FIG. 21 is a sequence diagram illustrating communication between the controller 121 and the robot controller 122 in the fourth exemplary embodiment. FIG. 21 illustrates, as an example, a sequence of obtaining the distance $Lse_j$ for each welding target portion. Before starting the welding operation, the sequence of FIG. 21 is performed at least once, and the distance $Lse_j$ is stored in a storage device, for example, the HDD 404 illustrated in FIG. 2. This sequence needs to be performed again in the case where any of the position $52_j$, the position $53_j$, and the target speed $Vw_j$ is changed. In FIG. 21, STEPA1 to STEPA7 correspond to processing of the controller 121, and STEPB1 to STEPB6 and STEPC1 to STEPC3 correspond to processing of the robot controller 122.

In STEPA1, the controller 121 activates "TASK1" of the robot controller 122. In STEPA2, the controller 121 stands by until receiving the signal SBB. In STEPA3, the controller 121 turns the operation start command SA on. In STEPA4, the controller 121 stands by until receiving the signal SBA. In STEPA5, the controller 121 performs timekeeping of the first time T1. In STEPA6, the controller 121 transmits a signal SDA notifying the timing for recording the distance $Lse_3$ to "TASK2" of the robot controller 122. In STEPA7, the controller 121 performs timekeeping of the second time $T2_j$. Again in STEPA2, the controller 121 stands by until receiving the signal SBB. "LOOP" in FIG. 21 refers to repetition of the process enclosed by a frame thereof. The number of repetition is equal to the number of welding target portions.

Processing of the robot controller 122 includes processing of "TASK1" corresponding to the processing described in the first exemplary embodiment and the second exemplary embodiment, and processing of "TASK2" newly added to record the distance $Lse_j$.

The processing of "TASK1" is as follows. In STEPB1, the robot controller 122 activates "TASK2". In STEPB2, the robot controller 122 transmits the signal SBB. In STEPB3, the robot controller 122 stands by until receiving the switching of the operation start command SA to on. In STEPB4, the robot controller 122 executes the linear interpolation command and supplies the trajectory data $P_j$. In STEPB5, the robot controller 122 executes the linear interpolation command or the joint interpolation command and supplies the trajectory data $P_{j-(j+1)}$. The trajectory data $P_{j-(j+1)}$ is trajectory data connecting the end point of the trajectory data $P_j$ and the start point of the trajectory data $P_{(j+1)}$. In STEPB6, the robot controller 122 transmits a signal SEA notifying "TASK2" that all welding target portions have been passed.

The processing of "TASK2" is as follows. In STEPC1, the robot controller 122 stands by until receiving the signal SDA from the controller 121. In STEPC2, the robot controller 122 calls a function for obtaining a length of a line segment connecting the commanded position and the actual position, and stores a value of the distance $Lse_j$ in the RAM 403. Again in STEPC1, the robot controller 122 stands by until receiving the signal SDA from the controller 121. In STEPC3, the robot controller 122 records, as a file and in the HDD 404, the value of the distance $Lse_j$ for each welding target portion stored in the RAM 403.

Since the signal SDA is transmitted from the controller 121 to the robot controller 122 at a timing at which the timekeeping of the first time T1 is completed, the distance $Lse_j$ can be measured. Although the control period of the robot controller 122 is longer than the control period of the controller 121, if the type of the control system is Type 1, the distance $Lse_j$ converges into a certain value as shown in the response waveform 61 illustrated in FIG. 16. Therefore, a substantially correct value can be measured if the timekeeping of the first time T1 is completed. In the case where the type of the control system is Type 1, since the distances $Lse_j$ and $Lee_j$ can be the same value, it suffices when only the value of the distance $Lse_j$ is recorded in the HDD 404.

In the welding operation, the acceleration distance $La_j$ and the deceleration distance $Ld_j$ in each welding target portion can be calculated by using the distance $Lse_j$ stored in the HDD 404 and the formulae (2) and (7).

According to the fourth exemplary embodiment, since the distance $Lse_j$ is actually measured for each welding target portion, the control point can be caused to, with a high position precision, pass the positions $52_j$ and $53_j$ without being affected by the inertia moment of the robot 101 when the first time T1 has elapsed and when the second time $T2_j$ has elapsed.

To be noted, although the function for obtaining the length of the line segment connecting the commanded position and the actual position is called in STEPC2, difference between the commanded position and the actual position may be calculated by obtaining the commanded position and the actual position as long as the commanded position and the actual position can be obtained at the same timing.

Although the controller 121 performs timekeeping of the second time $T2_j$ in which the laser beam is irradiated in STEPA7, since the sequence shown in FIG. 21 is a sequence for measuring and recording the distance $Lse_j$, the laser beam for processing does not have to be actually radiated. For example, guide light of a lower intensity than the laser beam for processing may be radiated, and the laser beam does not have to be radiated.

According to the fourth exemplary embodiment, since the distances $Lse_j$ and $Lee_j$ are obtained, that is, measured and recorded for each welding target portion in advance, welding can be performed with a high position precision even in the case where the response characteristic changes in accordance with the orientation of the robot 101.

Fifth Exemplary Embodiment

A method of measuring and recording the distances $Lse_j$ and $Lee_j$ in an HDD for each welding target portion has been described in the fourth exemplary embodiment. However, error can occur due to the response delay of the robot controller 122. The error is error in the position of the robot 101 serving as the control point when the first time T1 has elapsed with respect to the taught position at which the irradiation of laser beam is started, that is, error of the actual position with respect to the taught position.

Therefore, in the fifth exemplary embodiment, to reduce the error, the acceleration distance $La_j$ and the deceleration distance $Ld_j$ are calculated by the following formulae (13) and (14) instead of the formulae (2) and (7). Since the component of the error is proportional to the movement speed of the robot 101, the component of the error can be expressed by using the target speed $Vw_j$ and a coefficient $\beta$ that is a constant.

$$La_j = Lsr_j - (Lse_j + \beta \cdot Vw_j) \quad (13)$$

$$Ld_j = Ler_j - (Lee_j + \beta \cdot Vw_j) \quad (14)$$

To be noted, the constant $\beta$ used in the formulae (13) and (14) is unknown. Therefore, the constant $\beta$ needs to be identified in advance and recorded in a storage device of the robot controller 122 illustrated in FIG. 2, for example, the HDD 404. The constant $\beta$ is a constant dependent on the robot controller 122.

Figure 22:
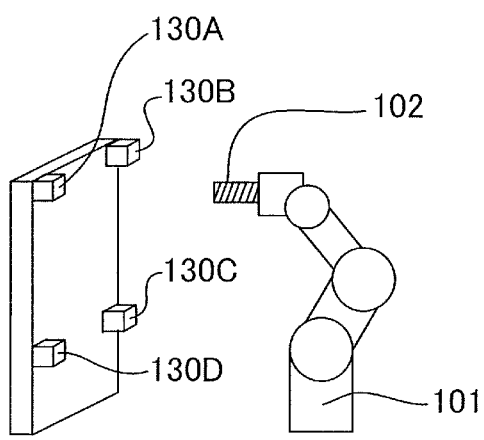
FIG. 22 is a diagram illustrating an example of arrangement of optical position sensors in a fifth exemplary embodiment.

FIG. 22 is a diagram illustrating an example of arrangement of optical position sensors in the fifth exemplary embodiment. As illustrated in FIG. 22, four optical position sensors 130A, 130B, 130C, and 130D are fixed to a wall adjacent to the robot 101. The optical position sensors 130A, 130B, 130C, and 130D are position sensitive detectors: PSDs. By radiating the laser beam toward the four optical position sensors 130A, 130B, 130C, and 130D, a position irradiated with the laser beam can be measured. To be noted, since the laser beam for processing can damage the optical position sensors 130A, 130B, 130C, and 130D, guide light of a lower intensity than the laser beam for processing may be radiated. A light source for generating the guide light may be the laser oscillator 103 or an unillustrated oscillator.

Identification of the constant $\beta$ is performed as follows. First, the positions $52_j$ and $53_j$ taught by the user need to be set within a measurement range of the optical position sensors 130A to 130D. For example, the optical position sensors 130A to 130D are first disposed, and the positions $52_j$ and $53_j$ are taught with reference to the optical position sensors 130A to 130D. Although the taught points herein are different from actual welding target points, there is no problem because this is a test operation for identifying the constant $\beta$. The letter j indicating the order of welding is associated with the optical position sensors. For example, j=1 corresponds to the optical position sensor 130A, and j=2 corresponds to the optical position sensor 130B. When the teaching is completed, the guide light is turned on while the robot 101 is stopped at a taught position, and position data of the positions $52_j$ and $53_j$ is measured by using the optical position sensors 130A to 130D. Next, as described in the fourth exemplary embodiment, a sequence of obtaining the distances $Lse_j$ and $Lee_j$ for each welding target portion is executed. Next, $\beta=0$ is preliminarily set, and the welding operation is executed by using the acceleration distance $La_j$ and the deceleration distance $Ld_j$ in the formulae (13) and (14).

Figure 23A:
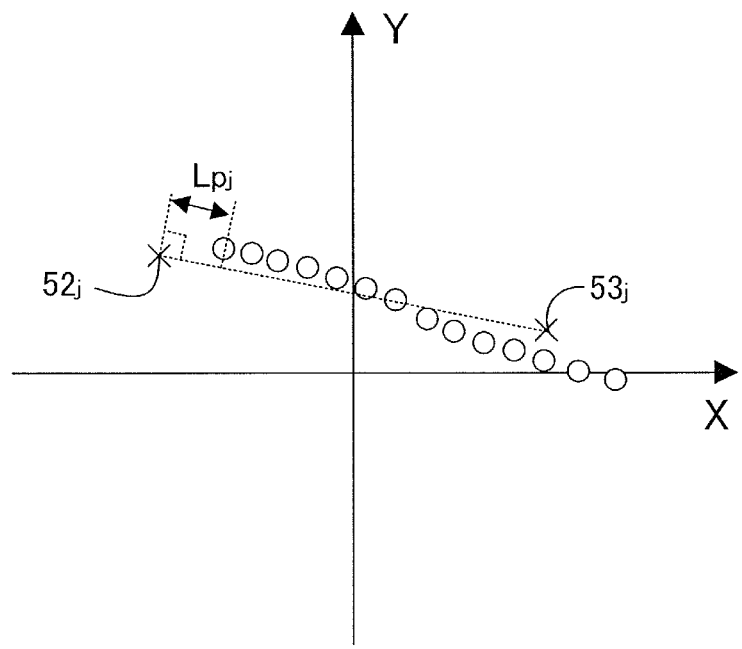
FIG. 23A is a graph illustrating measurement results of the fifth exemplary embodiment.
Figure 23B:
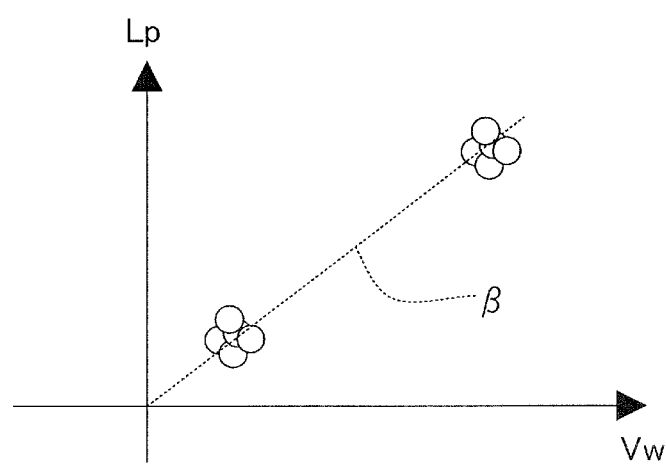
FIG. 23B is a graph illustrating measurement results of the fifth exemplary embodiment.

FIGS. 23A and 23B are graphs illustrating measurement results in the fifth exemplary embodiment. FIG. 23A illustrates an example of data of the optical position sensors 130A to 130D in the fifth exemplary embodiment. By using the optical position sensors 130A to 130D, the position of the guide light on a plane can be measured. The positions $52_j$ and $53_j$ illustrated in FIG. 23A are data measured by turning the guide light on when the teaching is completed. In FIG. 23A, each circle indicates a position of the guide light in the welding operation. Although the irradiation of the guide light is only performed once in the first time T1, the position data of the optical position sensors 130A to 130D is discrete data due to sampling.

In the present exemplary embodiment, a distance $Lp_j$ that is difference between the taught position $52_j$ and the start position of the irradiation of the laser beam in the welding operation. To be noted, although the component of positional difference can be divided into a component in the advance direction and a component perpendicular to the advance direction, only the component in the advance direction is measured as the distance $Lp_j$. This measurement is performed for a plurality of orientations, a plurality of speeds, and a plurality of laser scanning directions, and the constant $\beta$ is identified by using the measurement results of these.

FIG. 23B illustrates a relationship between the distance Lp and the target speed Vw in the fifth exemplary embodiment. When measurement is performed for the plurality of orientations, the plurality of speeds, and the plurality of laser scanning directions, the distance Lp shows a strong correlation with the target speed Vw. The inclination of this correlation is determined as the constant $\beta$. In this manner, the constant $\beta$ can be identified, and the acceleration distance $La_j$ and the deceleration distance $Ld_j$ can be calculated by using the formulae (13) and (14).

According to the fifth exemplary embodiment, the error derived from the response delay of the robot controller 122 can be reduced, and thus welding can be performed with a high position precision.

Sixth Exemplary Embodiment

A case where the acceleration distance $La_j$ is calculated by using the distance $Lsr_j$ in which the commanded position moves during the elapse of the first time T1 and the distance $Lse_j$ derived from the response delay has been described in the third exemplary embodiment to the fifth exemplary embodiment. Similarly, a case where the deceleration distance $Ld_j$ is calculated by using the distance $Ler_j$ in which the commanded position moves after the elapse of the second time $T2_j$ until the commanded position reaches the position $55_j$ and stops and the distance $Lee_j$ derived from the response delay at the moment at which the elapse of the second time $T2_j$ is completed has been described. However, if the robot controller 122 can accurately measure the actual position of the control point when the timekeeping of the first time T1 is completed, the acceleration distance $La_j$ can be obtained by using the taught position $52_j$ and the actual position of the control point when the timekeeping of the first time T1 is completed.

Figure 24:
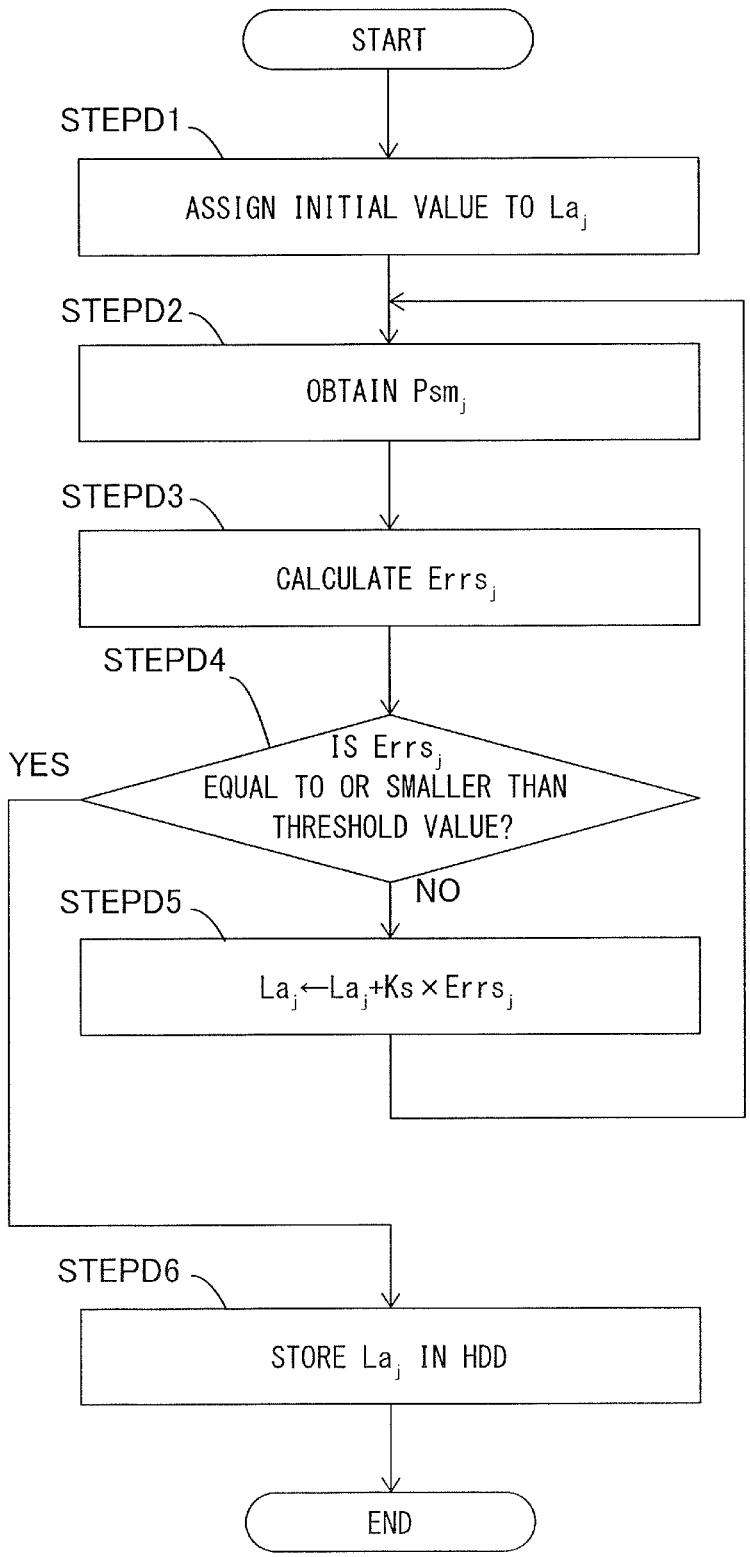
FIG. 24 is a flowchart illustrating a calculation sequence of an acceleration distance in a sixth exemplary embodiment.
Figure 25:
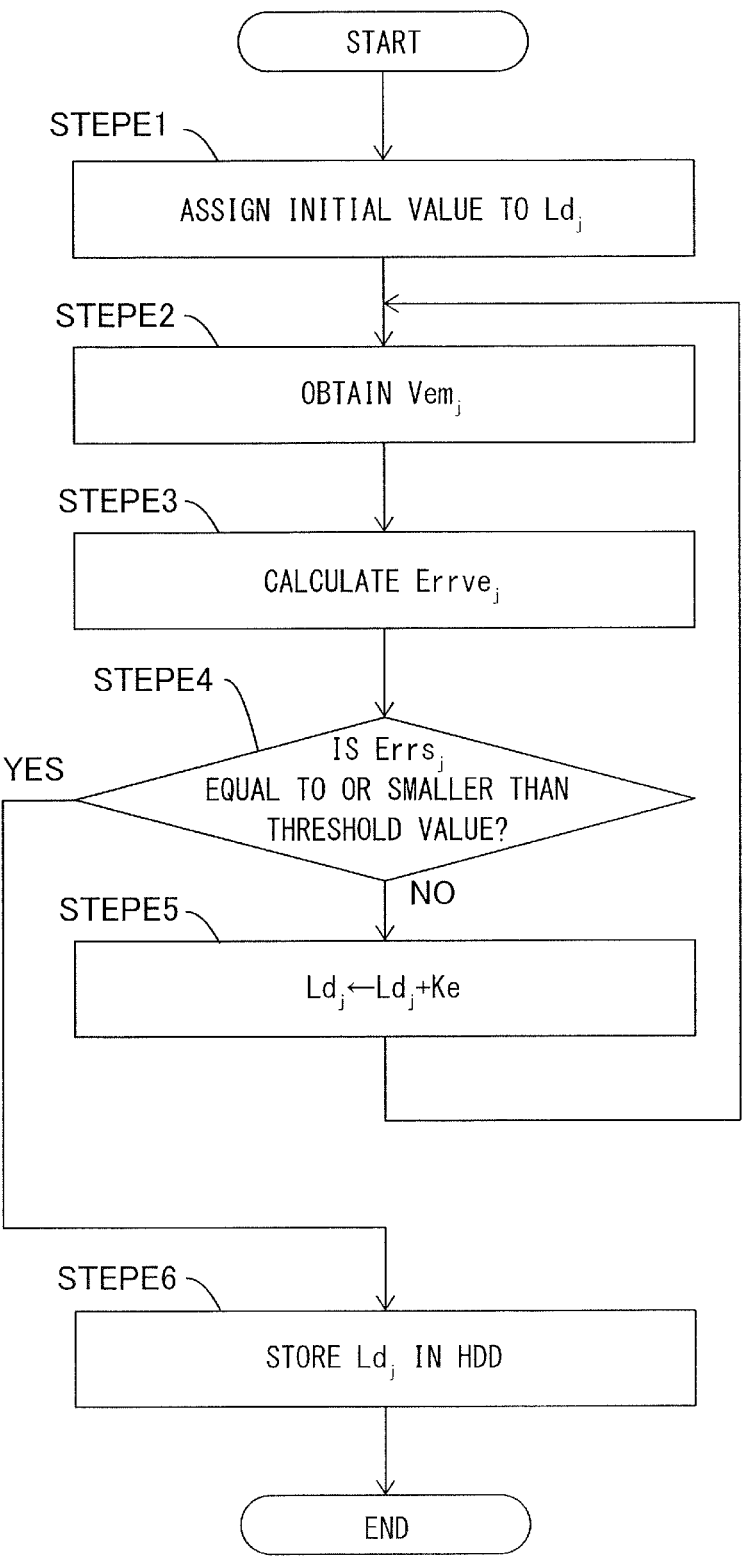
FIG. 25 is a flowchart illustrating a calculation sequence of a deceleration distance in the sixth exemplary embodiment.

FIG. 24 is a flowchart illustrating a calculation sequence for the acceleration distance $La_j$ in the sixth exemplary embodiment. FIG. 25 is a flowchart illustrating a calculation sequence for the deceleration distance $Ld_j$ in the sixth exemplary embodiment.

A method of calculating the acceleration distance $La_j$ illustrated in FIG. 24 will be described. In STEPD1, the CPU 401 of the robot controller 122 illustrated in FIG. 2 assigns an initial value to the acceleration distance $La_j$, in other words, the robot controller 122 preliminarily sets the acceleration distance $La_j$ to the initial value. The initial value may be, for example, the distance $Lsr_j$ calculated by using the formula (5). It is preferable that a value with which the robot 101 can be accelerated sufficiently is set as the initial value.

In STEPD2, the CPU 401 calculates the position $54_j$ by, for example, the formula (4). Then, the CPU 401 performs the welding operation, and obtains the actual position $Psm_j$ of the control point when the first time T1 has elapsed.

In STEPD3, the CPU 401 calculates difference $Errs_j$ between a position $Ps_j$ corresponding to the taught position $52_j$ and the actual position $Psm_j$. The difference $Errs_j$ is an error of the position $Psm_j$ that is the position of the robot 101 serving as the control point when the first time T1 has elapsed from the position $Ps_j$ corresponding to the position $52_j$ that is the taught position at which the irradiation of the laser beam is started. There are two methods for obtaining the difference $Errs_j$. That is, a method of using only the component in the welding direction and a method of also using the component in the direction perpendicular to the welding direction. The method of using only the component in the welding direction will be described. The calculation formula for the difference $Errs_j$ is the formula (15). That is, the difference $Errs_j$ is obtained by calculating the inner product of the unit vector $Pdir_j$ and a difference vector between the actual position $Psm_j$ and the position $Ps_j$ corresponding to the taught position $52_j$.

$$Errs_j = (\vec{P}sm_j - \vec{P}s_j) \cdot \vec{P}dir_j \quad (15)$$

In STEPD4, the CPU 401 determines whether or not all the difference $Errs_j$ is equal to or below a threshold value. In the case where all the difference $Errs_j$ is equal to or below the threshold value, that is, the result of determination in STEPD4 is YES, the CPU 401 executes STEPD6 and finishes the sequence. The threshold value used in STEPD4 is a value preset in a storage device, for example, the HDD 404, and may be set by the user. In STEPD6, the CPU 401 stores the value of the acceleration distance $La_j$ in each welding target portion as a file in the HDD 404.

In the case where any of the difference $Errs_j$ is greater than the threshold value, that is, where the result of determination in STEPD4 is NO, the CPU 401 executes STEPD5. In STEPD5, the CPU 401 multiplies the difference $Errs_j$ that is greater than the threshold value by a constant Ks, and adds the product to the value of the original acceleration distance $La_j$ to update the value of the acceleration distance $La_j$. This arithmetic processing is expressed by the following formula (16). After finishing the calculation of the acceleration distance $La_j$ in STEPD5, the CPU 401 performs the processing of STEPD2 again.

$$La_j \leftarrow La_j + Ks \cdot Errs_j \quad (16)$$

By the processing described above, the CPU 401 of the robot controller 122 sets the acceleration distance $La_j$ such that the difference $Errs_j$ becomes smaller than the threshold value.

A method for calculating the deceleration distance $Ld_j$ illustrated in FIG. 25 will be described. In STEPE1, the CPU 401 of the robot controller 122 illustrated in FIG. 2 assigns an initial value to the deceleration distance $Ld_j$, in other words, the robot controller 122 preliminarily sets the deceleration distance $Ld_j$ to the initial value. The initial value is, for example, 0.

In STEPE2, the CPU 401 calculates the position $55_j$ by, for example, the formula (8). Then, the CPU 401 performs the welding operation, and obtains an actual speed $Vem_j$ of the control point when the second time $T2_j$ has elapsed.

In STEPE3, the CPU 401 calculates difference $Errve_j$ between the target speed $Vw_j$ and the actual speed. The calculation formula for the difference $Errve_j$ is the following formula (17). Since the speed of the robot 101 serving as the control point is a three-dimensional vector, the target speed needs to be also evaluated as the three-dimensional vector. To vectorize the target speed, the target speed $Vw_j$ that is a scalar may be multiplied by the unit vector $Pdir_j$. By subtracting the vector of the target speed from the vector of the actual speed $Vem_j$, the vector of the difference $Errve_j$ that is the error of the actual speed with respect to the target speed can be obtained.

$$\vec{E}rrve_j = \vec{V}em_j - (Vw_j \cdot \vec{P}dir_j) \quad (17)$$

In the case where all the magnitude, that is, the absolute value of the difference $Errve_j$ is equal to or smaller than the threshold value, that is, where the result of determination in STEPE4 is YES, the CPU 401 executes STEPE6 and finishes the sequence. The threshold value used in STEPE4 is a value preset in a storage device, for example, the HDD 404, and may be set by the user. In STEPE6, the CPU 401 stores the value of the deceleration distance $Ld_j$ in each welding target portion as a file in the HDD 404.

In the case where any of the magnitude of the difference $Errve_j$ is greater than the threshold value, that is, where the result of determination in STEPE4 is NO, the CPU 401 executes STEPE5. In STEPE5, the CPU 401 increases the deceleration distance $Ld_j$ by the constant Ke only in a welding target portion in which the difference $Errve_j$ exceeds the threshold value. This arithmetic processing is expressed by the following formula (18). After finishing the calculation of the deceleration distance $Ld_j$ in STEPE5, the CPU 401 executes the processing of STEPE2 again.

$$Ld_j \leftarrow Ld_j + Ke \tag{18}$$

By the processing described above, the CPU 401 of the robot controller 122 sets the deceleration distance $Ld_j$ such that the magnitude of the difference $Errve_j$ becomes smaller than the threshold value.

As described above, the acceleration distance $La_j$ and the deceleration distance $Ld_j$ can be calculated by the sequence illustrated in FIGS. 24 and 25. To be noted, although the constant Ks of the formula (16) may be 1, the constant Ks may be changed to a value smaller than 1 in the case where the difference $Errs_j$ does not settle at the threshold value or a lower value. About a tenth of the distance $Ler_j$ calculated by using the formula (9) may be set as a constant Ke of the formula (18).

The robot 101 includes the encoders En1 to En6 illustrated in FIG. 2 provided at input shafts of a reduction gear such that the angle of each joint can be measured. However, the encoders may be provided at output shafts of the reduction gear. By using encoders provided at output shafts of the reduction gear, the angle of each joint can be directly measured. Therefore, welding can be performed with a high position precision by obtaining the position $Psm_j$ from the angle information of each joint.

It is preferable that the determination sequence for the deceleration distance $Ld_j$ of FIG. 25 is executed after executing the determination sequence for the acceleration distance $La_j$ of FIG. 24. In addition, since the laser beam for processing does not have to be radiated while executing the sequences of FIGS. 24 and 25, it is preferable that the guide light is radiated instead of the laser beam for processing or the irradiation of laser beam is not performed. In addition, in the case where the actual speed $Vem_j$ cannot be directly obtained, the speed $Vem_j$ may be obtained by obtaining two samples of the actual position including the sample at the completion of the timekeeping of the second time $T2_j$ and the immediately previous sample thereof and dividing difference therebetween by a sampling period.

According to the sixth exemplary embodiment, welding can be performed with a high position precision because the control point is directly aligned with the position $52_j$ represented by the position $Ps_j$. In addition, since the deceleration distance $Ld_j$ is determined by confirming the actual speed $Vem_j$, welding can be efficiently performed without wasting time.

In addition, in the case where the calculation of the formulae (5) and (9) of the third exemplary embodiment is difficult, that is, where the trajectory data generated by the robot controller 122 is not a speed command having a trapezoidal shape or changes in accordance with the condition, the acceleration distance $La_j$ and the deceleration distance $Ld_j$ may be set as in the sixth exemplary embodiment. In this case, the actual position $Psm_j$ and the actual speed $Vem_j$ do not have to be used, and the commanded position when the timekeeping of the first time T1 is completed and the commanded speed when the timekeeping of the second time $T2_j$ is completed may be used in calculation instead of these.

Seventh Exemplary Embodiment

In the third exemplary embodiment to the sixth exemplary embodiment, a method of calculating the acceleration distance $La_j$ and a method of obtaining the position $54_j$ to cause the robot 101 serving as the control point to pass the position $52_j$ when the timekeeping of the first time T1 is completed have been described. In addition, similarly, a method of calculating the deceleration distance $Ld_j$ and a method of obtaining the position $55_j$ to cause the robot 101 serving as the control point to pass the position $53_j$ when the timekeeping of the second time T2 is completed have been described. However, in the case where movement from a welding target portion to another welding target portion is fast, vibration occurs in the robot, and sometimes problems such as a problem that the bead becomes curved and a problem that the control point cannot pass the welding target portion at a constant speed occur. In the seventh exemplary embodiment, a method of suppressing this vibration will be described.

Figure 26A:
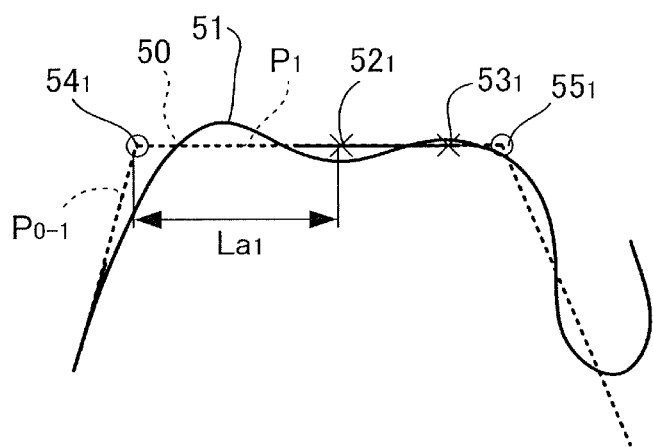
FIG. 26A is a diagram for describing, as a reference example, a path that a control point follows in a state in which a robot is vibrating.

FIG. 26A is a diagram for describing the path 51 that the control point follows in a state in which the vibration is occurring in the robot as a reference example. When vibration occurs in the robot, there is a possibility that the control point does not pass the position $52_j$ or the position $53_j$. In addition, when vibration occurs in the robot, there is a possibility that the welding bead is curved. FIG. 26A illustrates an example in which the control point does not pass the position $52_j$ and the welding bead is curved.

Figure 26B:
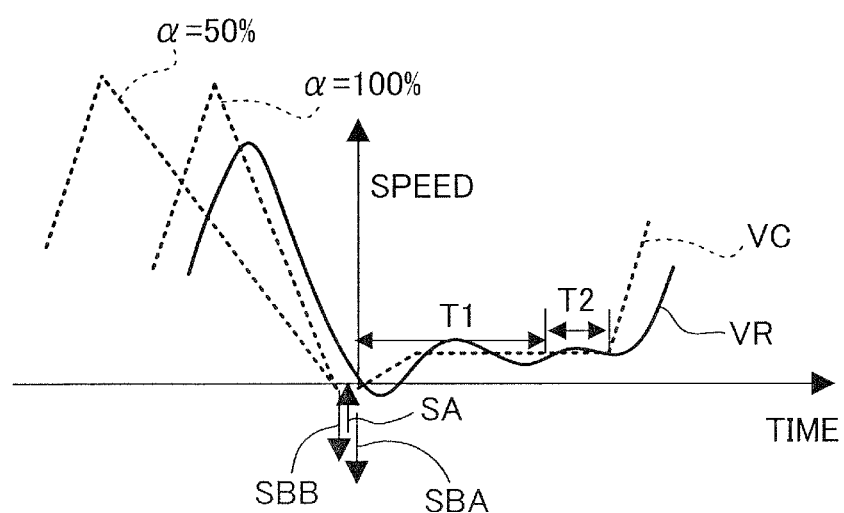
FIG. 26B is a diagram illustrating, as a reference example, a relationship between time and speed of a moving control point.

FIG. 26B is a diagram illustrating, as a reference example, a relationship between time and speed of the moving control point. When vibration occurs in the robot, sometimes the speed of the control point does not become the target speed $Vw_j$ and vibrates while performing the timekeeping of the second time $T2_j$ in which the irradiation of the laser beam is performed. In the seventh exemplary embodiment, the acceleration rate $\alpha$ of deceleration while moving from a welding target portion to another welding target portion is adjusted. FIG. 26B illustrates a case where the acceleration rate $\alpha$ of the deceleration of the commanded speed VC is 100% and a case where the acceleration rate $\alpha$ is 50%, which is a half of the former, as examples. In addition, FIG. 26B illustrates the timing at which the synchronizing signal SBA is transmitted as a standard for the time.

Figure 27:
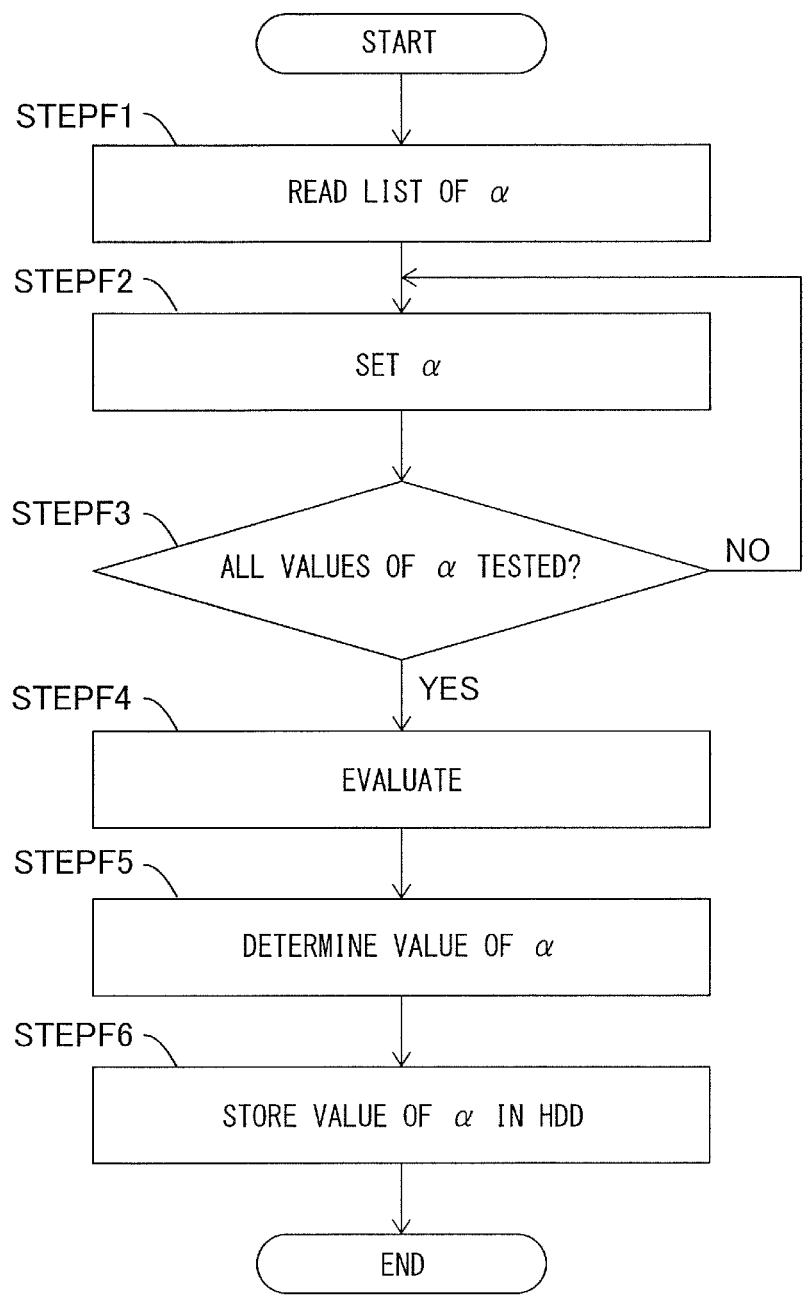
FIG. 27 is a flowchart illustrating a sequence of determining an acceleration rate in a seventh exemplary embodiment.

A specific method of adjusting the acceleration rate $\alpha$ will be described. FIG. 27 is a flowchart illustrating a sequence of determining the acceleration rate in the seventh exemplary embodiment. The sequence illustrated in FIG. 27 is a sequence of determining the acceleration rate $\alpha$ of deceleration in movement from a welding target portion to another welding target portion. The sequence illustrated in FIG. 27 is executed in a test operation performed before the actual operation of performing laser processing on a processing target object. In the test operation, the robot 101 is operated so as to emulate the actual operation of performing laser processing on a processing target object.

In STEPF1, the CPU 401 of the robot controller 122 illustrated in FIG. 2 reads a list of the acceleration rate $\alpha$ from a file in the HDD 404. For example, a list of 5 acceleration rates $\alpha$ including 100%, 80%, 60%, 40%, and 20%. In STEPF2, the CPU 401 sets one value in the list of acceleration rate $\alpha$, and causes the robot 101 to perform the test operation of performing welding as a test. In STEPF2, the operation of moving the control point to the acceleration start position of each of the plurality of welding target portions is performed at the set acceleration rate $\alpha$.

In STEPF3, the CPU 401 checks whether all the acceleration rates $\alpha$ in the list have been tested. In the case where the CPU 401 has not tested all the acceleration rates $\alpha$ in the list, that is, in the case whether the result of STEPF3 is NO, the CPU 401 returns to the processing of STEPF2. For example, in the case where the list of acceleration rate $\alpha$ includes five values of 100%, 80%, 60%, 40%, and 20%, the processing of STEPF2 is performed five times by performing the test operation while sequentially changing the acceleration rate from 100% to 20%. In the case where the CPU 401 has tested all the acceleration rates α in the list in STEPF3, that is, in the case where the result of STEPF3 is YES, the CPU 401 executes processing of STEPF4.

In STEPF4, the CPU 401 executes a sequence of evaluating the vibration of the robot, and makes an OK/NG determination for the acceleration rate α. The OK/NG determination is made for each welding target portion. Table 2 shows an example of a determination result. In the example of FIG. 2, for the first welding target portion, the acceleration rate of 100% is NG, and the acceleration rates of 80%, 60%, 40%, and 20% are OK.

TABLE 2

| | α | | | | |
|---|---|---|---|---|---|
| j | 100% | 80% | 60% | 40% | 20% |
| 1 | NG | OK | OK | OK | OK |
| 2 | NG | NG | NG | OK | OK |
| 3 | NG | NG | OK | OK | OK |
| ... | ... | ... | ... | ... | ... |

In STEPF5, the CPU 401 determines the value of the acceleration rate α for each welding target portion. That is, for each welding target portion, the CPU 401 selects a value of acceleration rate α that is determined as OK in the determination of STEPF4. It is preferable that, for each welding target portion, the largest value among values determined as OK in the determination of STEPF4 is selected as the value of the acceleration rate α. For example, in the case of Table 2, the CPU 401 selects 80% for the first welding target portion, 40% for the second welding target portion, and 60% for the third welding target portion.

In STEPF6, the CPU 401 stores the value of acceleration rate α associated with each welding target portion in the HDD 404. As described above, the CPU 401 adjusts, for each welding target portion and on the basis of the vibration of the robot 101 that has occurred during the test operation, the acceleration rate α used when moving the robot 101 serving as the control point to a position at which the operation of accelerating the laser head 102 is performed in the actual operation.

To be noted, in the test operation in STEPF2 of the sequence illustrated in FIG. 27, since the irradiation of laser beam does not have to be performed, it is preferable that the laser beam is not radiated, or guide light is radiated instead of the laser beam for processing.

As described above, according to the seventh exemplary embodiment, since the acceleration rate α for deceleration at the time of moving the control point from a welding target portion to the next welding target portion is adjusted for each welding operation before the actual operation such that the vibration of the robot 101 is within an allowable range, the efficiency of processing is improved. That is, the control point can be moved from a welding target portion to the next welding target portion quickly while satisfying the position precision and speed precision required for processing.

Eighth Exemplary Embodiment

In the seventh exemplary embodiment, a method for adjusting the acceleration rate α for deceleration at the time of moving the control point from a welding target portion to another welding target portion such that the vibration of the robot 101 is within the allowable range has been described.

Figure 28A:
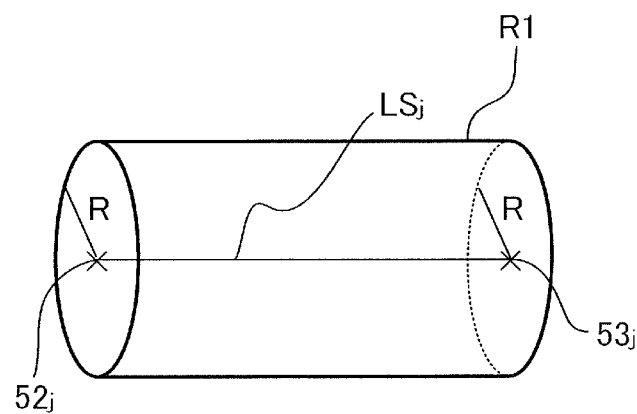
FIG. 28A is a diagram illustrating a method of evaluating vibration of a robot in an eighth exemplary embodiment.
Figure 28B:
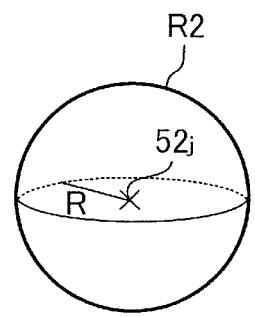
FIG. 28B is a diagram illustrating the method of evaluating vibration of the robot in the eighth exemplary embodiment.
Figure 28C:
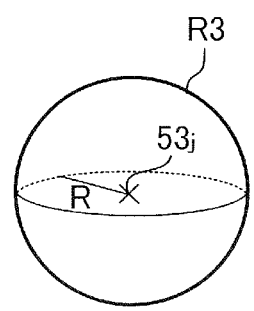
FIG. 28C is a diagram illustrating the method of evaluating vibration of the robot in the eighth exemplary embodiment.

In the eighth exemplary embodiment, an example of an evaluation method for the vibration of the robot 101 will be described in detail. FIGS. 28A, 28B, and 28C are diagrams for describing a method for evaluating the vibration of the robot in the eighth exemplary embodiment.

As illustrated in FIG. 28A, the position at which the welding bead is formed is determined by the user teaching the position $52_j$, which is the taught position at which the irradiation of the laser beam is started, and the position $53_j$, at which the irradiation of the laser beam is stopped. A line segment $LS_j$ connecting the positions $52_j$ and $53_j$ being greatly different from the position of the welding bead formed by actually radiating the laser beam is problematic from the viewpoint of position precision.

Therefore, the CPU 401 illustrated in FIG. 2 obtains the positional coordinate of the control point of the robot 101 by forward kinematics calculation on the basis of, for example, the angle of each joint of the robot 101 during the second time $T2_j$ in which the irradiation of the laser beam is performed, and evaluates the vibration of the robot 101 on the basis of the positional coordinate.

The CPU 401 of the robot controller 122 obtains a plurality of positional coordinates over time while the control point moves in the second time $T2_j$. Then, the CPU 401 determines whether or not the plurality of positional coordinates are within a predetermined region. The CPU 401 makes "OK" determination in the case where all the positional coordinates are within the predetermined region, and makes "NG" determination in the case where not all the positional coordinates are within the predetermined region. The predetermined region can be arbitrarily set by the user such that the predetermined region includes the line segment $LS_j$. In the present exemplary embodiment, an allowable region R1, R2, or R3 serving as the predetermined region is set as illustrated in FIG. 28A, 28B, or 28C. The allowable region R1 illustrated in FIG. 28A is a cylindrical region having a diameter of R and the line segment $LS_j$ as the center axis thereof. The allowable region R2 illustrated in FIG. 28B is a spherical region having a diameter of R and centered on the position $52_j$. The allowable region R3 illustrated in FIG. 28C is a spherical region having a diameter of R and centered on the position $53_j$. The CPU 401 makes the "OK" determination in the case where each positional coordinate is in any of the regions R1, R2, and R3, and makes the "NG" determination in the case where at least one positional coordinate is out of all the regions R1, R2, and R3.

To be noted, in the case where the direction of the vibration of the robot 101 approximately matches the movement direction of the control point of the robot 101, the vibration appears as vibration of the speed of the control point. In the case where the period of the vibration is long, the speed of the control point during the second time $T2_j$ in which irradiation of the laser beam is performed is only a part of the vibration of speed. In this case, the speed in the section corresponding to the part of vibration can be slower than the target speed $Vw_j$. In the case where the speed of the control point is slow, the welding bead becomes short even if the positional coordinate of the control point is within the predetermined region that has been described above. Therefore, the CPU 401 calculates difference between positional coordinates of the control point obtained over time in the second time $T2_j$, and divides the difference by the sampling time to obtain temporal speed data of the control point. Then, the CPU 401 calculates the average value of the temporal speed data to obtain the average speed of the control point. The CPU 401 may make the "OK" determination in the case where an absolute value of difference between the average speed of the control point and the target speed $Vw_j$ is equal to or smaller than a predetermined value, and make the "NG" determination in the case where the difference is larger than the predetermined value. That is, as determination of occurrence of the vibration of the robot, whether or not the absolute value of the difference between the average speed of the control point during the timekeeping of the second time $T2_j$ and the target speed $Vw_j$ is equal to or smaller than the predetermined value may be determined.

The adjustment of the acceleration rate α is performed in a similar manner to the seventh exemplary embodiment. As described above, the CPU 401 adjusts the acceleration rate α such that the plurality of positional coordinates are within the predetermined region including the line segment $LS_j$ in advance. Since the acceleration rate α is adjusted for each welding target portion before the actual operation, the processing trace of the laser beam is within the predetermined region in the actual operation. That is, the control point can be moved quickly from a welding target portion to another welding target portion while satisfying the position precision and speed precision required for processing.

To be noted, in the robot 101, the reduction gear elastically deforms. Therefore, error derived from the elastic deformation of the reduction gear can be prevented from being superimposed on the output values of the encoders if the encoders are provided at the output shafts of the reduction gear. Therefore, the positional coordinate of the control point may be calculated from the output values of the encoders provided at the output shafts of the reduction gear.

As a method for the CPU 401 to obtain the timing at which the CPU 301 causes the laser beam to be radiated/stopped, there is a method of transmitting a signal from the controller 121 when the timekeeping of the first time T1 is completed and when the timekeeping of the second time $T2_j$ is completed. In addition to this, for example, there are a method in which the robot controller 122 executes a special command and a method in which the robot controller 122 performs the timekeeping of the first time T1 and the second time $T2_j$. Further, it is possible to determine the occurrence of the vibration of the robot by performing an image processing to an image captured through a camera. In this case, the robot 101 supports the camera. At first, the sequence of the seventh exemplary embodiment is performed. When the occurrence of the vibration of the robot is determined through the image processing, the test operation in the seventh exemplary embodiment is a test machining with an actual laser radiation. After performing the test machining, the robot circulates and captures each welded portion so that the captured image of each welded portion is memorized in the HDD 404. The vibration of the robot is suppressed when the acceleration rate α is low. Accordingly, the occurrence of the vibration of the robot is determined by comparing images of the welding bead corresponding to the acceleration rates α on the list at each welded portion. For example, the occurrence of the vibration of the robot is determined by comparing an image of the welding bead captured in a setting of the minimum acceleration rate α and an image of the welding bead captured in a setting of another acceleration rate α at each welded portion. More specifically, the CPU 401 binarizes each captured image and extracts the welding bead portion from the other portion. Then the CPU 401 determines XY coordinate data of the center of gravity of the welding bead portion. Here, the XY coordinate system is a coordinate system in which the coordinate origin (0, 0) is located at the lower left corner of the image. After then, the CPU 401 determines a length between the center of gravity of the image of the welding bead captured in a setting of the minimum acceleration rate α and the center of gravity of the image of the welding bead captured in a setting of another acceleration rate α. If the length is loner than a predetermined threshold value, the CPU 401 determines as "OK" and if the length is equal or shorter than the predetermined threshold value, the CPU 401 determines as "NG". As described above, the occurrence of the vibration of the robot is determined by performing the image processing to the image captured through the camera.

Ninth Exemplary Embodiment

Figure 29:
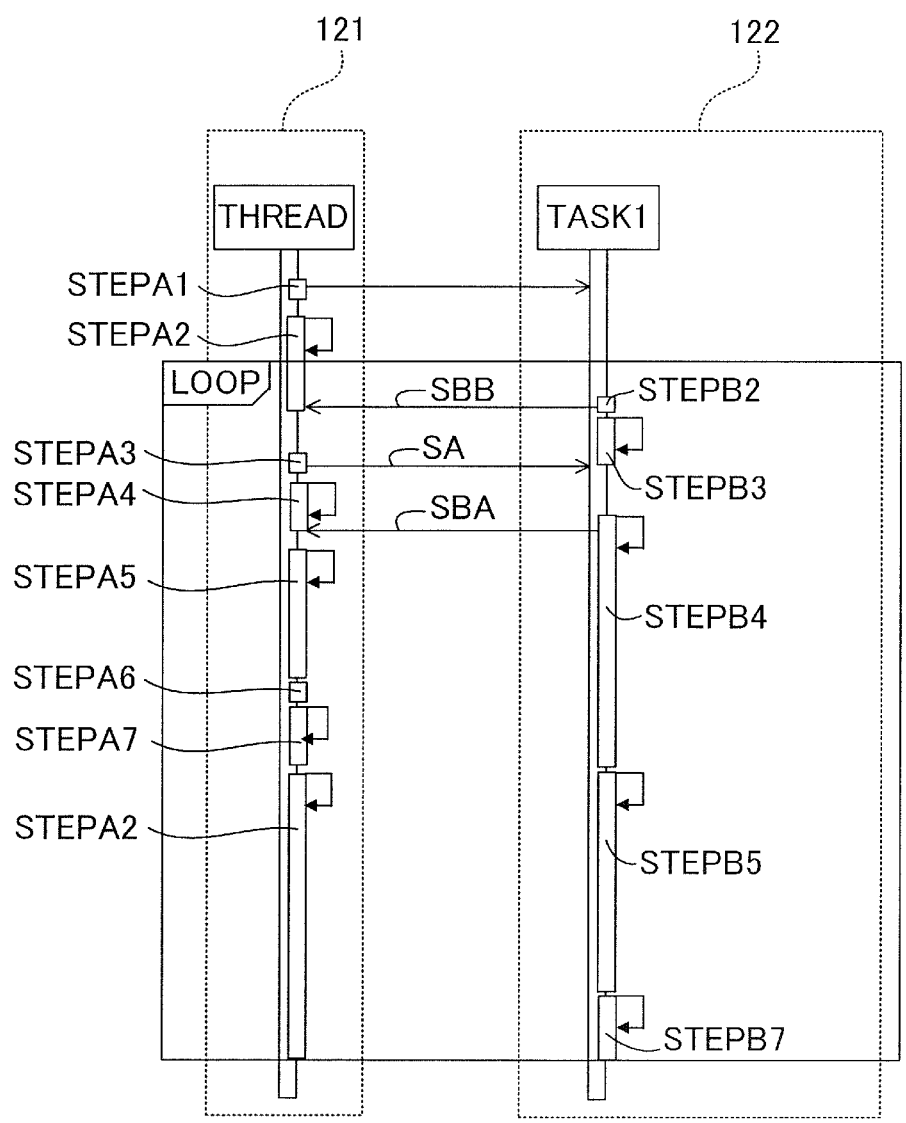
FIG. 29 is a sequence diagram illustrating communication between a controller and a robot controller in a ninth exemplary embodiment.

In a ninth exemplary embodiment, an example of a method of evaluating the vibration of the robot 101 different from the eighth exemplary embodiment will be described in detail. FIG. 29 is a sequence diagram illustrating communication between the controller 121 and the robot controller 122 in the ninth exemplary embodiment. FIG. 29 illustrates an example of a sequence indicating a method of evaluating the vibration of the robot 101. To be noted, in FIG. 29, the same steps as in FIG. 21 are denoted by the same reference signs, and the description thereof will be omitted.

In STEPB5 of FIG. 29, the CPU 401 illustrated in FIG. 2 moves the control point from a welding target portion to the next welding target portion. In the second exemplary embodiment to the eighth exemplary embodiment, as illustrated in FIG. 21, the CPU 401 performs transmission of the signal SBB, which is the processing of STEPB2, after the processing of STEPB5 is finished. In the ninth exemplary embodiment, as illustrated in FIG. 29, the CPU 401 performs processing of STEPB7 after the processing of STEPB5 is finished. In STEPB7, the CPU 401 waits for settling of the control point. In STEPB5, when the supply of the trajectory data is completed, that is, when the commanded position reaches the position $54_j$, STEPB5 is finished. However, at this time, the control point has not reached the position $54_j$. Therefore, by executing STEPB7, whether or not the control point has reached the position $54_j$ without vibration is checked.

In the present exemplary embodiment, occurrence of vibration of the robot 101 can be determined by, for example, describing a command for waiting for the settlement in the robot program 422A illustrated in FIG. 7. In STEPB7 of FIG. 29, the CPU 401 executes a settlement standby command. The settlement standby command is finished in the case where a state in which the difference between the commanded position and the actual position is smaller than a threshold value is maintained for a certain period set as a parameter. The CPU 401 can easily determine the occurrence of vibration of the robot 101 by measuring the time from start to completion of execution of the settlement standby command. For example, the settlement standby command being finished in a time shorter than the predetermined period indicates no vibration and the settlement standby command being finished in a time longer than the predetermined period indicates vibration. To be noted, the settlement standby of STEPE7 is not performed in the case of actually performing welding. That is, the steps described above are performed in the test operation before the actual operation. Then, in the case where it is determined that the vibration of the robot 101 has occurred, the CPU 401 performs the adjustment of decreasing the acceleration rate α.

As described above, the CPU 401 adjusts the acceleration rate α on the basis of the time required for the control point of the robot 101 to settle after the time point at which the commanded position of the robot 101 is moved to the position 54$_j$ that is a position at which the operation of accelerating the laser head 102 is started as the test operation.

According to the ninth exemplary embodiment, occurrence of vibration of the robot 101 can be determined by a simple method without requiring complicated processing, and thus the acceleration rate α can be easily adjusted.

To be noted, in the first to ninth exemplary embodiments described above, sometimes abnormality occurs while the robot 101 is operating in accordance with the linear interpolation command. The robot controller 122 may periodically transmit a signal indicating the state of the robot 101 to the controller 121. The controller 121 may control the laser oscillator 103 to not oscillate the laser beam in the case of receiving a signal indicating that the robot 101 is in an abnormal state.

In the first to ninth exemplary embodiments described above, the robot controller 122 may transmit a permission signal that permits laser oscillation to the controller 121. For example, while the robot controller 122 is supplying the trajectory data P$_j$ in accordance with the linear interpolation command, the permission signal is turned on. The controller 121 may perform AND calculation on the permission signal and the laser oscillation command and transmit a calculation result thereof to the laser oscillator 103. As a result of this, the laser beam is not oscillated unless the robot controller 122 turns the permission signal on. Although this AND calculation is performed by the controller 121, this AND calculation may be performed by another electronic circuit instead.

In the first to ninth exemplary embodiments described above, it is preferable that the robot 101 is installed in an unillustrated light-shielding booth such that any person is not exposed to the laser beam. The laser oscillator 103 is configured to stop the laser oscillation when a person opens a door to enter the booth. In the case where the optical fiber cable 151 is not correctly connected to the laser head 102 and the laser oscillator 103, wiring in the optical fiber cable 151 is not connected, and the laser oscillation of the laser oscillator 103 is stopped. In addition, in the case where the optical fiber cable 151 is bent to a certain degree or more, the wiring therein is broken and the laser oscillation of the laser oscillator 103 is stopped. It is also possible to configure the laser oscillator 103 to stop the laser oscillation when a person is detected by a safety laser scanner, a safety light curtain, or the like. It is also possible to stop the laser oscillation by monitoring the booth by external hardware in case the robot controller 122 or the controller 121 stops responding for some reason. For example, a signal that is turned on and off at regular intervals may be output from the robot controller 122 and the controller 121, and the laser oscillation may be stopped when the output signal does not change for a certain period.

Although a case where the control apparatus 120 is constituted by the controller 121 and the robot controller 122 has been described in the first to ninth exemplary embodiments described above, the configuration of the control apparatus 120 is not limited to this. The control apparatus may be realized by one computer as long as the control apparatus has both functions of the controller 121 and the robot controller 122. For example, the control apparatus can be realized by one computer if parallel processing can be performed by a plurality of processors or a plurality of cores included in a processor.

Although a case where the robot 101 is a vertically articulated robot has been described in the first to ninth exemplary embodiments described above, the configuration of the robot 101 is not limited to this. For example, the robot 101 may be a horizontally articulated robot, a parallel link robot, or a cartesian coordinate robot.

Although a case where a laser processing apparatus performs laser welding has been described in the first to ninth exemplary embodiments described above, the configuration is not limited to this. For example, the laser processing apparatus may perform laser grooving processing or laser cutting processing.

Although a case where a laser welding apparatus includes one laser head 102 has been described in the first to ninth exemplary embodiments described above, the configuration is not limited to this. That is, the laser welding apparatus may include a plurality of laser heads 102. In this case, the laser welding apparatus may include a plurality of robots 101 such that the plurality of laser heads 102 can be individually moved.

Tenth Exemplary Embodiment

Figure 30:
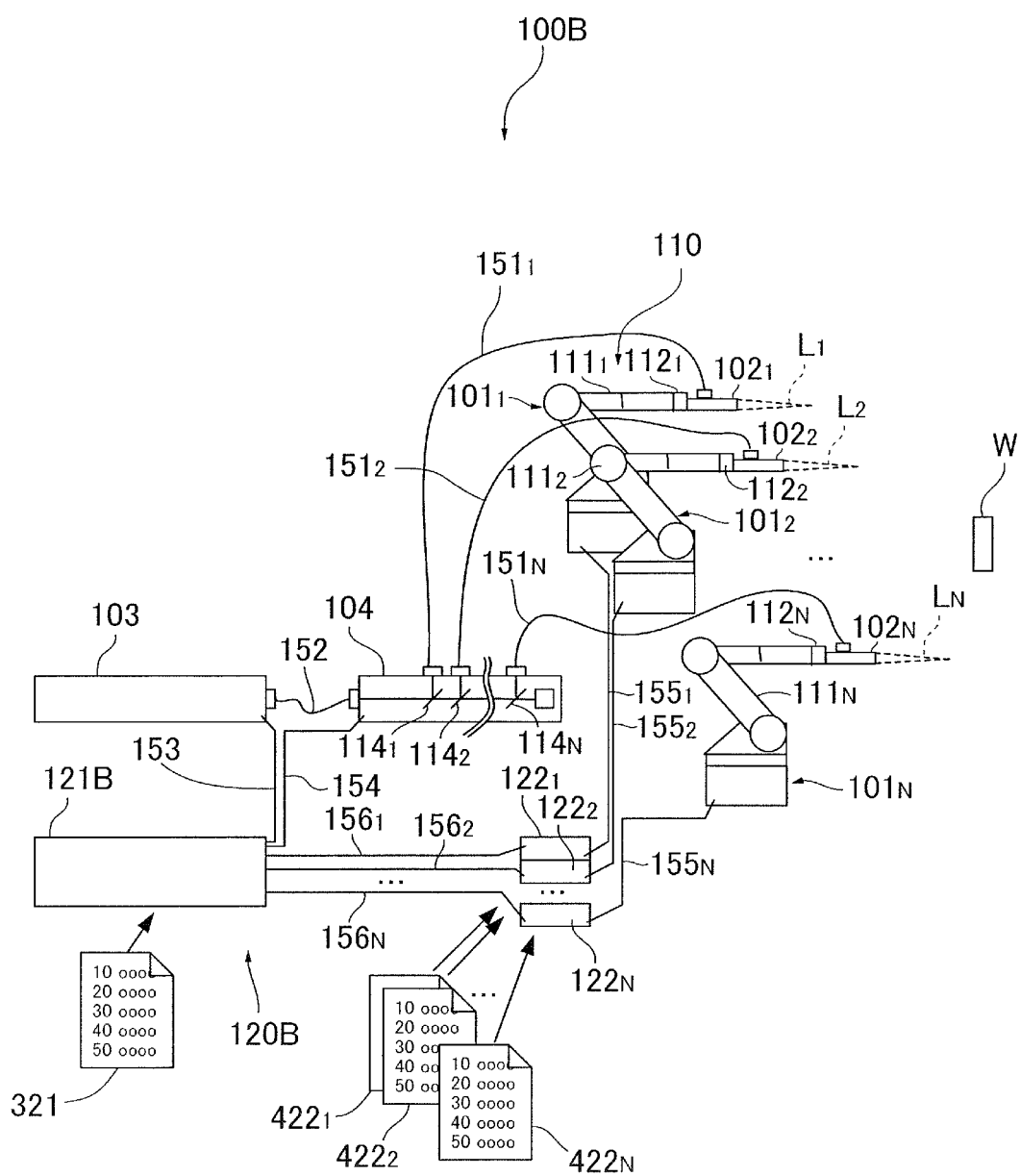
FIG. 30 is an explanatory diagram illustrating a schematic configuration of a laser welding apparatus serving as an example of a laser processing apparatus according to a tenth exemplary embodiment.

FIG. 30 is an explanatory diagram illustrating a schematic configuration of a laser welding apparatus 100B serving as an example of a laser processing apparatus according to a tenth exemplary embodiment. The same constituents as in FIG. 1 are denoted by the same reference signs. The laser welding apparatus 100B includes a robot apparatus 110, a plurality of laser heads 102$_1$ to 102$_N$, and a single laser oscillator 103 serving as a light source. The robot apparatus 110 includes a plurality of robots 101$_1$ to 101$_N$, and N is a positive integer of two or more. The laser welding apparatus 100B includes a switcher 104 and a control apparatus 120B. The control apparatus 120B performs overall control of the apparatus. Specifically, the control apparatus 120B controls the operation of the robot apparatus 110, start and stop of generation of a laser beam in the laser oscillator 103, and switching operation of the switcher 104. The control apparatus 120B includes a controller 121B serving as an example of a first controller and a plurality of robot controllers 122$_1$ to 122$_N$ serving as an example of a plurality of second controllers. The robots 101$_1$ to 101$_N$ each serve as a manipulator.

The switcher 104 and the laser heads 102$_1$ to 102$_N$ are interconnected via optical fiber cables 151$_1$ to 151$_N$ serving as optical paths for laser beams. The switcher 104 and the laser oscillator 103 are interconnected via an optical fiber cable 152. The laser oscillator 103 and the controller 121B are interconnected via the cable 153 such that a digital signal can be communicated therebetween. The switcher 104 and the controller 121B are interconnected via a cable 154 such that a digital signal can be communicated therebetween.

Robot arms 111$_1$ to 111$_N$ and the robot controllers 122$_1$ to 122$_N$ are interconnected via cables 155$_1$ to 155$_N$ each including a power line and a signal line. The controller 121B and the robot controllers 122$_1$ to 122$_N$ are interconnected via cables 156$_1$ to 156$_N$ such that digital signals can be communicated therebetween.

The laser oscillator 103 is a continuous wave laser or a pulsed laser, and generates a laser beam by laser oscillation. The laser beam generated in the laser oscillator 103 is transmitted to the switcher 104 via the optical fiber cable 152. The switcher 104 switches the optical path such that the laser beam generated in the laser oscillator 103 is guided to one of the plurality of laser heads 102$_1$ to 102$_N$ through corresponding one of the optical fiber cables 151$_1$ to 151$_N$. Specifically, the switcher 104 includes a plurality of mirrors 114$_1$ to 114$_N$, and switches the optical path by operating the mirrors $114_1$ to $114_N$ so as to guide the laser beam into different one of the laser heads $102_1$ to $102_N$ at different time. Therefore, the laser oscillator 103 does not need to be provided in a plural number, and thus the cost can be reduced.

The laser heads $102_1$ to $102_N$ respectively emit laser beams $L_1$ to $L_N$ guided by the switcher 104. The laser beams $L_1$ to $L_N$ emitted from the laser heads $102_1$ to $102_N$ are respectively focused on positions in predetermined distances from the laser heads $102_1$ to $102_N$. The controller 121B controls start and stop of generation of the laser beam in the laser oscillator 103 and the switching operation of the switcher 104. That is, the controller 121B commands the laser oscillator 103 to start or stop generation of laser beam via the cable 153.

In the present exemplary embodiment, the robots $101_1$ to $101_N$ have the same configuration. The robot $101_i$ of the robot apparatus 110 is, for example, a vertically articulated robot. The letter i used herein represents an integer from 1 to N, and serves as a serial number assigned to each of the robots. The robot $101_i$ includes a robot arm $111_i$ and a robot hand $112_i$. The robot hand $112_i$ serves as an example of an end effector attached to the robot arm $111_i$. The robot $101_i$ supports the laser head $102_i$. In the present exemplary embodiment, the robot $101_i$ supports the laser head $102_i$ by holding the laser head $102_i$ by the robot hand $112_i$. To be noted, for example, the laser head $102_i$ may be supported by the robot $101_i$ by attaching the laser head $102_i$ to the distal end of the robot arm $111_i$ or to the robot hand $112_i$.

Since the laser head $102_i$ is supported by the robot $101_i$, the laser head $102_i$ can be moved to a desired position and orientation by moving the robot $101_i$. By moving the robot $101_i$ to move the laser head $102_i$ to the desired position and orientation, the focal point of the laser beam $L_i$ can be moved to a desired position in the space. By focusing the laser beam $L_i$ on a position at which a welding bead is to be formed on the processing target object W, the processing target object W can be subjected to welding by the laser beam $L_i$. As described above, the robot apparatus 110 including the plurality of robots $101_1$ to $101_N$ can individually move the plurality of laser heads $102_1$ to $102_N$. To be noted, a processed product can be obtained by processing the processing target object W.

In the present exemplary embodiment, the control apparatus 120B controls the laser oscillator 103, the robot apparatus 110, and the switcher 104 to perform laser seam welding. In the laser seam welding, there are a mode in which a continuous wave is used as the laser beam $L_i$ and a mode in which a pulse wave is used as the laser beam $L_i$, and either of these modes may be selected. In the laser seam welding, the surface of the processing target object W needs to be scanned by the laser beam $L_i$. In the present exemplary embodiment, the laser beam $L_i$ is emitted while moving the laser head $102_i$ supported by the robot $101_i$ to scan the surface of the processing target object W by the laser beam $L_i$ without using a galvano mirror, and thus laser welding is performed. Since the galvano mirror is omitted, the cost can be reduced.

Although welding may be performed on one welding target portion on the processing target object W by one robot $101_i$, that is, one laser head $102_i$, description will be given on the premise that welding is performed on a plurality of welding target portions by one laser head $102_i$. The serial number of i=1 to N is given to the plurality of robots $101_1$ to $101_N$, that is, the plurality of laser heads $102_1$ to $102_N$ for the sake of convenience of description. A case where laser welding is sequentially performed on one welding target portion at a time while switching the laser heads $102_1$ to $102_N$ in the order from 1 to N will be described below. For example, in the case where the robot $101_1$ is referred to as the first robot and the laser head $102_1$ is referred to as the first laser head, the robot $101_2$ is the second robot to be operated next, and the laser head $102_2$ is the second laser head into which the laser beam is guided next.

Figure 31:
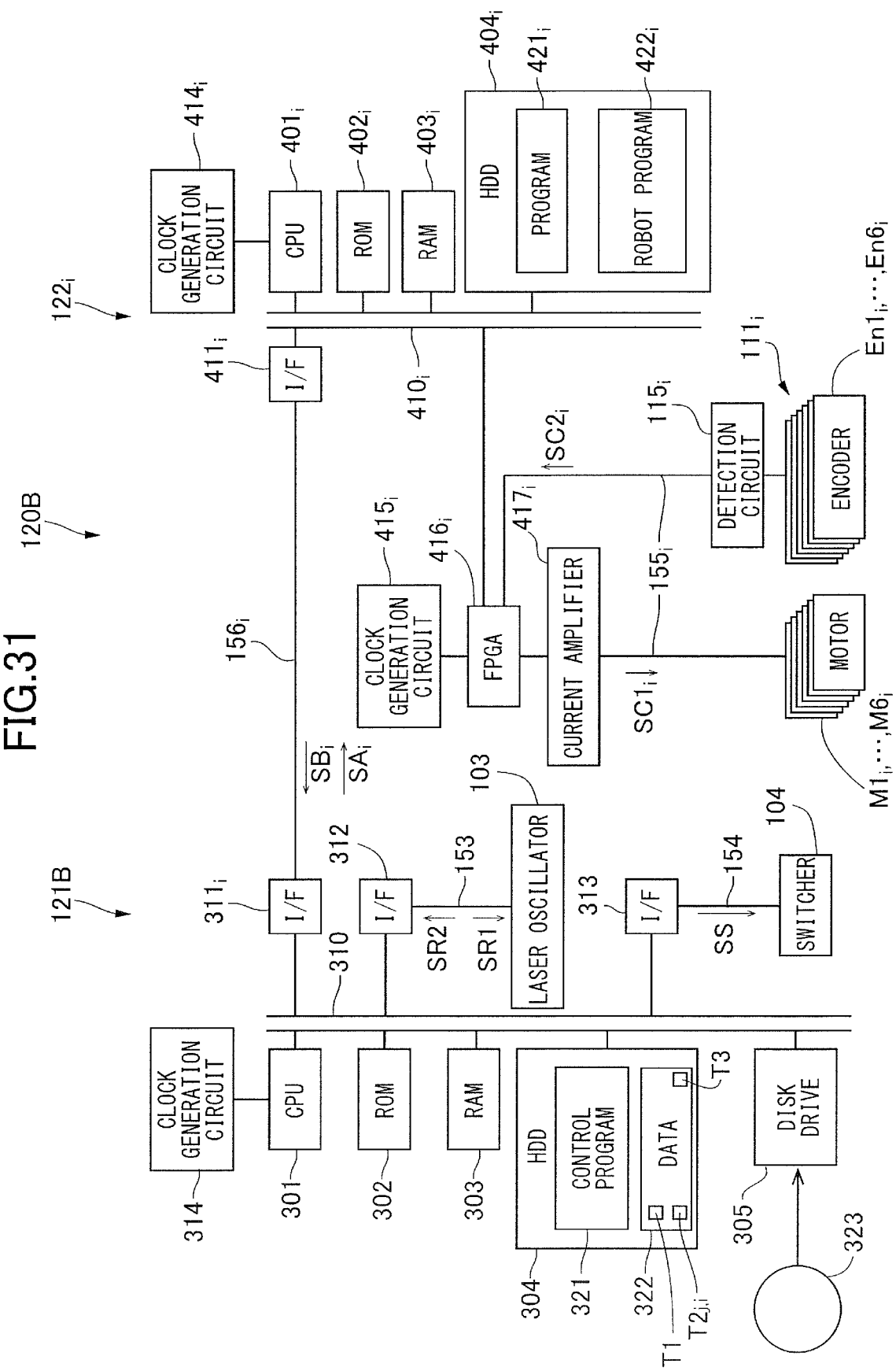
FIG. 31 is a block diagram illustrating an example of a control system of the laser welding apparatus according to the tenth exemplary embodiment.

FIG. 31 is a block diagram illustrating an example of a control system of the laser welding apparatus 100B in the tenth exemplary embodiment. The same constituents as in FIG. 2 will be denoted by the same reference signs. The controller 121B is constituted by, for example, a general-purpose computer, and includes a CPU 301 serving as an example of a processor. The controller 121B includes a ROM 302 and a RAM 303. The ROM 302 stores a basic program for operating the CPU 301 and the like, and the RAM 303 serves as a work area of the CPU 301. The controller 121 includes an HDD 304 and a disk drive 305. The HDD 304 serves as an example of a storage device. The disk drive 305 is capable of reading the program or the like recorded in a recording disk 323 serving as an example of a recording medium.

The controller 121B includes I/Fs $311_1$ to $311_N$, 312, and 313. The CPU 301, the ROM 302, the RAM 303, the HDD 304, the disk drive 305, and the I/Fs $311_1$ to $311_N$, 312, and 313 are communicably interconnected via a bus 310. The I/F 312 is connected to the laser oscillator 103 via the cable 152. The I/F 313 is connected to the switcher 104 via the cable 154.

The CPU 301 is connected to a clock generation circuit 314. The CPU 301 operates in synchronization with a clock signal generated in the clock generation circuit 314. That is, the operating frequency of the CPU 301 is determined depending on the clock signal of the clock generation circuit 314.

The HDD 304 stores, in other words, records a control program 321 configured for managing the overall sequence of the apparatus such that the CPU 301 performs timekeeping processing and signal communication processing. The CPU 301 performs various processing such as the timekeeping processing and the signal communication processing in accordance with the control program 321. The HDD 304 stores, in other words, records various data 322 including data of time such as the first time T1 and a second time $T2_{j,i}$, and a third time T3. To be noted, the data 322 may be incorporated in the control program 321.

Here, the first time T1 is time required for accelerating the laser head $102_i$ toward a welding target portion such that the laser head $102_i$ is at a constant speed at the welding target portion. The second time $T2_{j,i}$ is time required for the laser head $102_i$ to irradiate the welding target portion with the laser beam. As described above, the letter i represents a positive integer of 1 to N that is a serial number given to the laser heads and so forth, and corresponds to the order of operation. The letter j represents a positive integer that is a serial number given to the welding target portions and corresponds to the order of welding. That is, the second time $T2_{j,i}$ is time required for irradiating the j-th welding target portion with the laser beam that is subjected to welding by the laser head $102_i$ supported by the robot $101_i$. The third time T3 is time required for the switching operation in the switcher 104. Hereinafter, (j,i) added to the reference signs indicates the j-th welding target portion welded by the i-th robot $101_i$, that is, the i-th laser head $102_i$.

The CPU 301 functions as a software timer by executing the control program 321. Specifically, the CPU 301 functions as a timer that measures the first time T1 and a timer that measures the second time $T2_{j,i}$. In addition, the CPU 301 functions as a timer that measures a total time $T2_{j,i}+T3$ of the second time $T2_{j,i}$ and the third time T3. The CPU 301 controls the laser oscillator 103 by executing the control program 321 and transmitting a laser oscillation command SR1 serving as a signal to the laser oscillator 103. The CPU 301 controls the switcher 104 by executing the control program 321 to transmit a switching signal SS to the switcher 104. Further, CPU 301 executes the control program 321 to transmit an operation start command $SA_i$ serving as a predetermined command that commands start of operation of the robot $101_i$ to the robot controller $122_i$.

To be noted, the recording medium in which the control program 321 is recorded may be any recording medium as long as the recording medium can be read by a computer. For example, as the recording medium for supplying the control program 321, the ROM 302 illustrated in FIG. 31, the recording disk 323, or an unillustrated external storage device may be used. Specific examples of the recording medium include flexible disks, hard disks, optical disks such as digital versatile disk-ROM: DVD-ROM, compact disk-ROM: CD-ROM, and Blu-ray disks, magnetic disks, magnetic tapes, and semiconductor memories.

The robot controller $122_i$ is a dedicated computer for controlling the robot $101_i$. To be noted, in FIG. 31, a control system of the robot arm $111_i$ of the robot $101_i$ is illustrated, and illustration of a control system of the robot hand $112_i$ is omitted. The robot controller $122_i$ includes a CPU $401_i$, a ROM $402_i$, and a RAM $403_i$. The CPU $401_i$ serves as an example of a processor, the ROM $402_i$ store a basic program or the like for operating the CPU $401_i$, and the RAM $403_i$ serves as a work area of the CPU $401_i$. The robot controller $122_i$ includes an HDD $404_i$ serving as an example of a storage device.

The robot controller $122_i$ includes an FPGA $416_i$ and a current amplifier $417_i$. The FPGA $416_i$ serves as an example of a servo calculation portion. The robot controller $122_i$ includes an I/F $411_i$. The CPU $401_i$, the ROM $402_i$, the RAM $403_i$, the HDD $404_i$, the FPGA $416_i$, and the I/F $411_i$, are communicably interconnected via a bus $410_i$. The I/F $311_i$ of the controller 121B and the I/F $411_i$ of the robot controller $122_i$ are interconnected via a cable $156_i$.

The CPU $401_i$ is connected to a clock generation circuit $414_i$, and the FPGA $416_i$ is connected to a clock generation circuit $415_i$ The CPU $401_i$ operates in synchronization with a clock signal generated in the clock generation circuit $414i$, and the FPGA $416_i$ operates in synchronization with a clock signal generated in the clock generation circuit $415_i$. That is, the operating frequency of the CPU $401_i$ is determined depending on the clock signal of the clock generation circuit $414_i$, and the operating frequency of the FPGA $416_i$ is determined depending on the clock signal of the clock generation circuit $415_i$.

The HDD $404_i$ stores, in other words, records a program $421_i$ and a robot program $422_i$.

The robot arm $111_i$ includes a plurality of motors that drive joints thereof and a plurality of encoders serving as examples of a position sensor that detects the rotation angles or rotation positions of the motors. For example, six motors $M1_i$ to $M6_i$ and six encoders $En1_i$ to $En6_i$ are provided. The robot arm $111_i$ includes a detection circuit $115_i$ connected to the encoders $En1_i$ to $En6_i$ and constituted by an electronic circuit.

In the configuration described above, the controller 121B, specifically the CPU 301 transmits the laser oscillation command SR1 serving as a signal from the I/F 312 to the laser oscillator 103. The laser oscillator 103 that has received the laser oscillation command SR1 operates to generate a laser beam in accordance with the laser oscillation command SR1. Specifically, as the laser oscillation command SR1, the controller 121B switches the voltage of an electric signal from a low level to a high level when commanding the laser oscillator 103 to generate a laser beam, and transmits the command from the I/F 312. The switching of the voltage of the electric signal to the high level is also referred to as turning the laser oscillation command SR1 on. The controller 121B switches the voltage of the electric signal to the low level when commanding the laser oscillator 103 to stop generation of the laser beam. The switching of the voltage of the electric signal to the low level is also referred to as turning the laser oscillation command SR1 off. Therefore, the laser oscillator 103 generates the laser beam when the laser oscillation command SR1 is on, and stops generation of the laser beam when the laser oscillation command SR1 is off.

The laser oscillator 103 transmits a signal SR2 indicating that a laser beam is being generated to the controller 121B. Specifically, the laser oscillator 103 transmits, as the signal SR2, an electric signal whose voltage is the high level to the controller 121B when the laser beam is being generated. Setting the voltage of the electric signal to the high level is also referred to as turning the signal SR2 on. The laser oscillator 103 sets the voltage of the electric signal to the low level when the laser beam is stopped. Setting the voltage of the electric signal to the low level is also referred to as turning the signal SR2 off.

Further, the controller 121B, specifically the CPU 301 transmits a switching signal SS from the I/F 313 to the switcher 104. The switching signal SS is a digital signal composed of a plurality of bits, in other words, a bit stream, serving as a unique sign assigned to each laser head $102_i$. The switcher 104 that has received the switching signal SS switches the optical path in accordance with the bit stream of the switching signal SS.

Furthermore, the controller 121B, specifically the CPU 301 transmits the operation start command $SA_i$ that commands the start of operation of the robot $101_i$ from the I/F $311_i$ to the robot controller $122_i$. Specifically, when transmitting the operation start command $SA_i$ to start the operation of the robot $101_i$, the controller 121B transmits an electric signal having a voltage of a high level to the robot controller $122_i$. Setting the voltage of the electric signal to the high level is also referred to as turning the operation start command $SA_i$ on. After setting the voltage of the electric signal indicating the operation start command $SA_i$ to the high level, the controller 121B sets the voltage to a low level at a predetermined timing. Setting the voltage of the electric signal to the low level is also referred to as turning the operation start command $SA_i$ off.

The robot controller $122_i$ receives the operation start command $SA_i$, and controls the operation of the robot $101_i$ in accordance with the robot program $422_i$. That is, the robot controller $122_i$ monitors the operation start command $SA_i$, and causes the robot $101_i$ to start the operation of accelerating the laser head $102_i$ to perform laser seam welding by the laser head $102_i$ when the operation start command $SA_i$ is switched from off to on.

The robot controller $122_i$ transmits, to the controller 121B, a signal $SB_i$ that is a digital signal indicating that the robot $101_i$ is operating on the basis of trajectory data of a predetermined section including a welding target portion. Specifically, the robot controller $122_i$ switches the voltage of the electric signal indicating the signal $SB_i$ from the low level to the high level and transmits the signal $SB_i$ to the controller 121B when causing the robot $101_i$ to start the operation of accelerating the laser head $102_i$. The robot controller $122_i$ switches the voltage of the electric signal indicating the signal $SB_i$ from the high level to the low level at a predetermined timing. Switching the voltage of the electric signal indicating the signal $SB_i$ to the high level will be also referred to as turning the signal $SB_i$ on hereinbelow. In addition, switching the voltage of the electric signal indicating the signal $SB_i$ to the low level will be also referred to as turning the signal $SB_i$ off.

Orientation control of the robot arm $111_i$, that is, position/orientation control of the laser head $102_i$, specifically position control of the focal point of the laser beam $L_i$ is performed with a motor current $SC1_i$ supplied to the motors $M1_i$ to $M6_i$ of the robot arm $111_i$ of the robot controller $122_i$. The robot program $422_i$ is a program described in a robot language. A user can instruct operation of the robot $101_i$ by describing the robot language in text data. The CPU $401_i$ of the robot controller $122_i$ executes the program $421_i$ to interpret the robot program $422_i$, generate trajectory data constituted by a plurality of commands, and output the generated trajectory data to the FPGA $416_i$. The FPGA $416_i$ performs servo calculation in accordance with the trajectory data. That is, the FPGA $416_i$ generates a motor current command by the servo calculation, and transmits the generated motor current command to the current amplifier $417_i$. The current amplifier $417_i$ generates the motor current $SC1_i$ corresponding to the motor current command, and supplies the motor current $SC1_i$ to the motors $M1_i$ to $M6_i$ at respective joints of the robot arm $111_i$. The motors $M1_i$ to $M6_i$ of the robot arm $111_i$ are driven by the supplied motor current $SC1_i$. The detection circuit $115_i$ obtains detection signals from the encoders $En1_i$ to the $En6_i$ when the motors $M1_i$ to $M6_i$ rotate. The detection circuit $115_i$ converts the detection signals into a serial digital signal $SC2_i$, and transmits the digital signal $SC2_i$ to the FPGA $416_i$ of the robot controller $122_i$.

The digital signal $SC2_i$ indicating rotation angles, or rotation positions of the motors $M1_i$ to $M6_i$ is used for the servo calculation in the FPGA $416_i$. The program $421_i$ regularly performs reading from I/Fs, arithmetic processing, and output to I/Fs. The period of this regular processing will be referred to as a control period of the robot controller $122_i$. The detection signals of the encoders $En1_i$ to $En6_i$ are pulse signals of ABZ phase. The detection circuit $115_i$ converts the pulse signals of the encoders $En1_i$ to $En6_i$ into the digital signal $SC2_i$ indicating a pulse number, which can be converted into a positional coordinate, and feeds the digital signal $SC2_i$ back to the FPGA $416_i$. To be noted, the servo mechanism, that is, the FPGA $416_i$ and the current amplifier $417_i$ may be disposed in the robot arm $111_i$, and a position command, that is, the trajectory data may be transmitted to the servo mechanism in the robot arm $111_i$ from the CPU $401_i$ via a cable. The FPGA $416_i$ may be omitted by imparting the function of the FPGA $416_i$ to the CPU $401_i$. Although the pulse signals of the encoders $En1_i$ to $En6_i$ are converted into a digital signal and transmitted to the robot controller $122_i$ has been described, the pulse signals of the encoders $En1_i$ to $En6_i$ may be directly transmitted to the robot controller $122_i$. Resolvers may be used as position sensors instead of the encoders $En1_i$ to $En6_i$.

Here, a control point of movement of the robot $101_i$ may be a point that moves together with the tip of the hand of the robot $101_i$, and, in the present exemplary embodiment, a focal point of the laser beam is set as the control point of movement of the robot $101_i$. The control point is expressed by six parameters composed of three parameters X, Y, and Z indicating a position in the three-dimensional space and three parameters A, B, and C indicating an orientation in the three-dimensional space based on the base of the robot $101_i$. Therefore, the control point can be regarded as one point in a six-dimensional task space. In the robot program $422_i$, a taught point that is a movement target of the control point is described, in other words, designated by a user. The robot controller $122_i$ interprets the robot program $422_i$ and generates the trajectory data connecting taught points, that is, the trajectory data in which the taught points are interpolated. Examples of an interpolation method of interpolating the taught points include linear interpolation, circular interpolation, and joint interpolation, and these interpolation methods are described, in other words, designated in the robot program $422_i$ as an interpolation command by the user.

The CPU $401_i$ of the robot controller $122_i$ converts the trajectory data obtained by the interpolation into a command of angles of respective joints of the robot $101_i$, and the FPGA $416_i$ performs servo calculation. As a result of the servo calculation, the FPGA $416_i$ determines a current command to be transmitted to the current amplifier $417_i$. The servo calculation is performed in each cycle of the control period of the CPU $401_i$ of the robot controller $122_i$. The command of angles of respective joints is updated in each cycle of the control period, and the speed of the robot $101_i$ is determined by controlling the amount of increase or decrease thereof. That is, the robot $101_i$ moves quickly in the case where the amount of increase or decrease thereof is large, and moves slowly in the case where the amount of increase or decrease thereof is small.

A path in which the control point, which is the focal point of the laser beam, actually moves by the operation of the robot $101_i$ can be deviated from a path commanded by the robot program $422_i$ due to response delay of position control.

Figure 32:
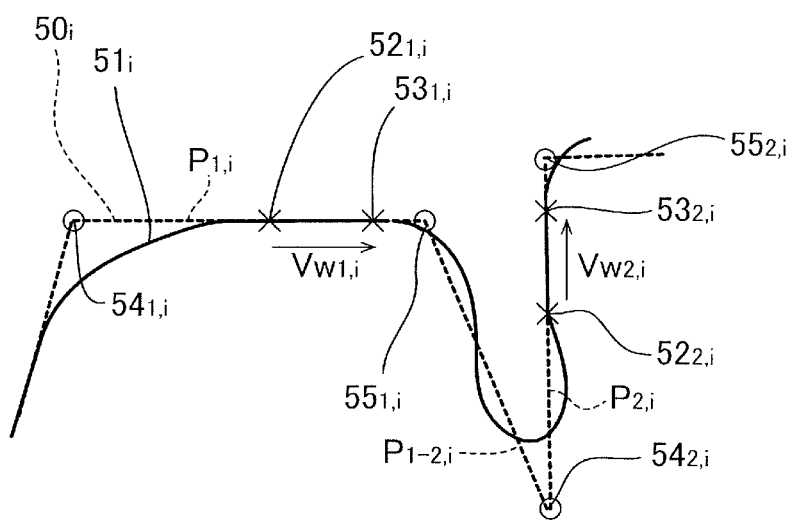
FIG. 32 is an explanatory diagram illustrating an example of a path of control point in the tenth exemplary embodiment.

FIG. 32 is an explanatory diagram illustrating an example of a path of the control point in the tenth exemplary embodiment. Here, since the path of the control point, which is the focal point of the laser beam is defined by the operation of the robot $101_i$, the path of the control point is equivalent to the path of the laser head $102_i$ supported by the robot $101_i$.

A case of executing a linear interpolation command serving as an example of the interpolation command described in the robot program $422_i$ will be described below. The linear interpolation command is a command of performing interpolation such that the control point moves along a straight line connecting a first positional coordinate and a second positional coordinate, and the path of the control point becomes a line segment in the three-dimensional space. To be noted, there are two possible options one of which is also interpolating the orientation of the robot $101_i$ by using the first positional coordinate and the second positional coordinate and the other of which is maintaining the orientation at the first positional coordinate to the second positional coordinate, and, in the present exemplary embodiment, the orientation is also interpolated. In both of these options, the control point of the robot $101_i$, that is, the focal point of the laser beam moves on a line segment connecting the first positional coordinate and the second positional coordinate. To be noted, in most case, the robot program $422_i$ uses a current commanded position of the robot $101_i$ as the first positional coordinate and only the second positional coordinate, which is a movement destination, is designated. For the positional coordinate, a taught point, in other words, a taught position set by a user may be used, or a positional coordinate obtained by additional calculation of the taught point indicating a position different from the taught point may be used. When the CPU $401_i$ of the robot controller $122_i$ executes the linear interpolation command, the CPU $401_i$ generates trajectory data connecting the current commanded position and a target position that is the movement destination, and supplies the trajectory data to the FPGA $416_i$ in each cycle of the control period. The linear interpolation command is completed when supply of all trajectory data by the CPU $401_i$ of the robot controller $122_i$ is completed, and the CPU $401_i$ executes the next command described in the robot program $422_i$.

In FIG. 32, a broken line indicates a path $50_i$ serving as a commanded position of the control point, and a solid line indicates an actual path $51_i$ serving as an actual position of the control point. In the example of FIG. 32, there are two portions to be subjected to laser seam welding. The j-th portion is a section between a position $52_{j,i}$ of the control point at which irradiation of the laser beam is started and a position $53_{j,i}$ of the control point at which the irradiation of the laser beam is finished. In the example of FIG. 32, j is 1 or 2. To be noted, the portion to be subjected to laser seam welding is not limited to two portions, and may be one portion or three or more portions. The positions $52_{j,i}$ and $53_{j,i}$ of the control point are taught points serving as taught positions set by the user.

The robot controller $122_i$ derives, in accordance with a predetermined algorithm, positions $54_{j,i}$ and $55_{j,i}$ positioned on an extension line passing through the taught positions $52_{j,i}$, and $53_{j,i}$. This algorithm is described in the robot program $422_i$. The position $55_{j,i}$, is provided to the robot program $422_i$ as a parameter to execute the linear interpolation command. To be noted, in order to cause the robot program $422_i$ to execute the linear interpolation command to the position $55_{j,i}$, it is required that a movement command to the position $54_{j,i}$ has been executed and the commanded position of the robot $101_i$ has reached the position $54_{j,i}$.

The position $54_{j,i}$ is a commanded position at which movement of the control point is started. The position $55_{j,i}$ is a commanded position at which movement of the control point is finished. Further, the robot controller $122_i$ generates trajectory data $P_{j,i}$ of a predetermined section by linear interpolation. The predetermined section includes the section between the taught positions $52_{j,i}$ and $53_{j,i}$, and includes the position $54_{j,i}$ as a start point and the position $55_{j,i}$ as an end point.

As described above, the positions $52_{j,i}$ and $53_{j,i}$ that are included in the trajectory data $P_{j,i}$ to be commanded to the robot $101_i$ are taught points designated by the user. In contrast, the positions $54_{j,i}$ and $55_{j,i}$ that are included in the trajectory data $P_{j,i}$ commanded to the robot $101_i$ are commands obtained by the robot controller $122_i$ by automatic calculation in accordance with the robot program $422_i$, and are not taught points.

For also the section between the positions $55_{1,i}$ and $54_{2,i}$, the robot controller $122_i$ performs interpolation in accordance with the interpolation command described in the robot program $422_i$ to generate trajectory data $P_{1-2,i}$. To be noted, since the laser head $102_i$ is just moved in the section between the positions $55_{1,i}$ and $54_{2,i}$, the interpolation can be performed by an arbitrary interpolation method. Therefore, an arbitrary interpolation command can be described in the robot program $422_i$. For example, in the case where a linear interpolation command is described in the robot program $422_i$, linear interpolation can be performed. For example, in the case where a joint interpolation command is described in the robot program $422_i$, joint interpolation can be performed. The joint interpolation command is a command for dividing operation amount of each joint of the robot $101_i$ by time and performing interpolation, and the path of the control point is not linear in this case. However, in this case, the operation of the robot $101_i$ is faster than in the case where the robot $101_i$ is operated in accordance with the linear interpolation command.

In the case of performing laser seam welding, an acceleration section for the movement speed of the control point to reach a target speed $Vw_{j,i}$ is required. In the present exemplary embodiment, the section between the positions $54_{j,i}$ and $52_{j,i}$ is an acceleration section. The target speed $Vw_{j,i}$ of each welding target portion is described, in other words, designated in the robot program $422_i$.

To be noted, although the control point needs to be moved with a high precision in the section for welding, that is, the section between the positions $52_{j,i}$ and $53_{j,i}$, the position precision may be low in sections in which laser seam welding is not performed, for example, the acceleration section. Therefore, as illustrated in FIG. 32, the actual path $51_i$ may be deviated from the commanded path $50_i$ in the sections other than the sections for welding. In other words, the robot controller $122_i$ obtains the position $54_{j,i}$ serving as a start point and the position $55_{j,i}$ serving as an end point such that the control point moves with a high precision in the section between the positions $52_{j,i}$ and $53_{j,i}$.

Here, when the robot controller $122_i$ commands the position $54_{j,i}$ to the robot $101_i$, the robot $101_i$ is still or moving, and these are both acceptable.

The robot controller $122_i$ that has received the operation start command $SA_i$ starts commanding the trajectory data $P_{j,i}$ for performing welding in accordance with the operation start command $SA_i$. That is, the robot controller $122_i$ starts commanding the trajectory data $P_{j,i}$ in response to the operation start command $SA_i$ switching from off to on. In the example of FIG. 32, when receiving the operation start command $SA_i$, the robot controller $122_i$ operates the robot 101 in accordance with the trajectory data $P_{1,i}$, and, subsequently, operates the robot $101_i$ in accordance with the trajectory data $P_{1-2,i}$. After the operation is completed, the robot $101_i$ takes a preparation complete state, and the next operation start command $SA_i$ is monitored. When receiving the next operation start command $SA_i$, the robot controller $122_i$ operates the robot $101_i$ in accordance with the trajectory data $P_{2,j}$.

To be noted, the robot program $422_i$ is described such that, when the robot controller $122_i$ receives a signal indicating that the operation start command $SA_i$ has been switched from off to on, the robot controller $122_i$ starts commanding the trajectory data $P_{j,i}$.

Figure 33:
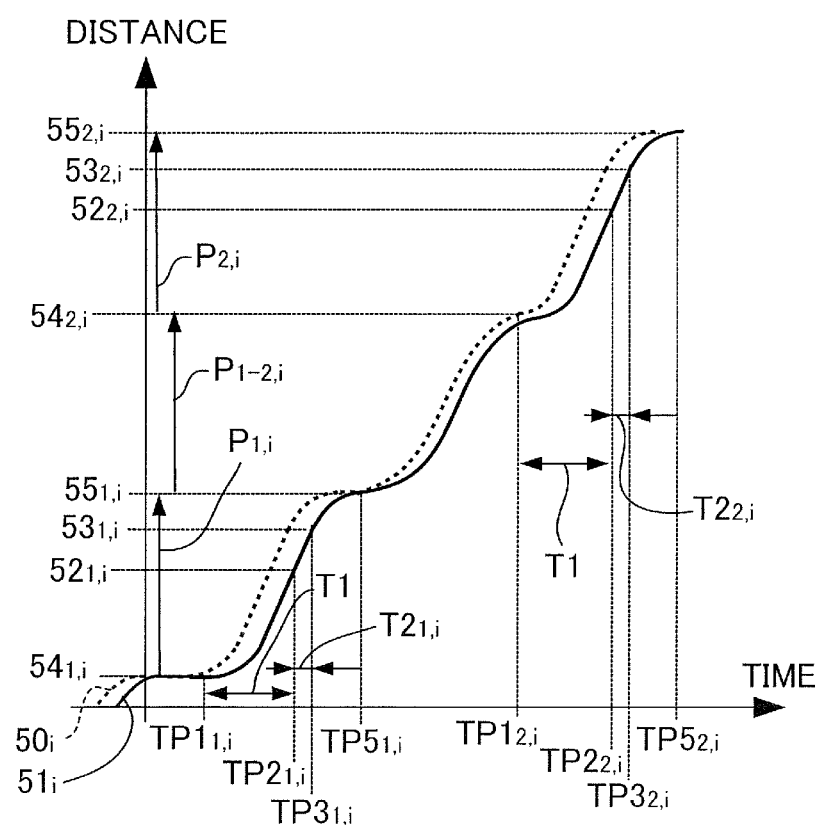
FIG. 33 is an explanatory diagram illustrating an example of a movement distance of the control point in the tenth exemplary embodiment.

FIG. 33 is an explanatory diagram illustrating an example of a movement distance of the control point by the operation of the robot $101_i$ in the tenth exemplary embodiment. The same constituents as in FIG. 4 will be denoted by the same reference signs. For the sake of convenience of description, time points $TP1_{1,i}$, $TP2_{1,i}$, $TP3_{1,i}$, $TP5_{1,i}$, $TP1_{2,i}$, $TP2_{2,i}$, $TP3_{2,i}$, and $TP5_{2,i}$ are illustrated in FIG. 33. The laser welding apparatus 100B of the present exemplary embodiment does not perform processing by counting the time points $TP1_{1,i}$, $TP2_{1,i}$, $TP3_{1,i}$, $TP5_{1,i}$, $TP1_{2,i}$, $TP2_{2,i}$, $TP3_{2,i}$, and $TP5_{2,i}$. To be noted, similarly to FIG. 32, a broken line indicates the commanded path $50_i$, and a solid line indicates the actual path $51_i$.

The robot controller $122_i$ controls operation of the robot $101_i$ by sequentially using the trajectory data $P_{1,i}$, the trajectory data $P_{1-2,i}$, and the trajectory data $P_{2,i}$. However, due to the response delay of the position control, the control point moves behind the commanded time as illustrated in FIG. 33.

When the robot controller $122_i$ executes the linear interpolation command and starts supplying the trajectory data $P_{1,i}$ for welding of the first portion, the command for the angle of the robot $101_i$ starts to change from the position $54_{1,i}$ that is a start point to the position $55_{1,i}$, that is an end point of the trajectory data $P_{1,i}$. At the time point $TP1_{1,i}$ when this change is started, the operation of the robot $101_i$ to accelerate the control point, that is, the laser head $102_i$ is started.

When the robot controller $122_i$ commands the position $52_{1,i}$ to the robot $101_i$, the control point passes a position corresponding to the commanded position $52_{1,i}$ at the time point $TP2_{1,i}$ delayed with respect to the commanded time. When the robot controller $122_i$ commands the position $53_{1,i}$ to the robot $101_i$, the control point passes a position corresponding to the commanded position $53_{1,i}$ at the time point $TP3_{1,i}$ delayed with respect to the commanded time. When the robot controller $122_i$ commands the position $55_{1,i}$ that is the end point of the trajectory data $P_{1,i}$ to the robot $101_i$, the control point passes a position corresponding to the commanded position $55_{1,i}$ at the time point $TP5_{1,i}$ delayed with respect to the commanded time. The irradiation of laser beam needs to be started when the control point actually passes the position $52_{1,i}$ and needs to be stopped when the control point actually passes the position $53_{1,i}$.

Next, the robot controller $122_i$ operates the robot $101_i$ in accordance with the trajectory data $P_{1-2,i}$ from the position $55_{1,i}$ to the position $54_{2,i}$ for preparation for next welding operation.

When the robot controller $122_i$ executes the linear interpolation command and starts supplying the trajectory data $P_{2,i}$ for welding of the second portion, the command for the angle of the robot $101_i$ starts to change from the position $54_{2,i}$ that is a start point of the trajectory data $P_{2,i}$ to the position $55_{2,i}$ that is an end point of the trajectory data $P_{2,i}$. At the time point $TP1_{2,i}$ when this change is started, the operation of the robot $101_i$ to accelerate the control point, that is, the laser head $102_i$ is started.

When the robot controller $122_i$ commands the position $52_{2,i}$ to the robot $101_i$, the control point passes a position corresponding to the commanded position $52_{2,i}$ at the time point $TP2_{2,i}$ delayed with respect to the commanded time. When the robot controller $122_i$ commands the position $53_{2,i}$ to the robot $101_i$, the control point passes a position corresponding to the commanded position $53_{2,i}$ at the time point $TP3_{2,i}$ delayed with respect to the commanded time. When the robot controller $122_i$ commands the position $55_{2,i}$ that is the end point of the trajectory data $P_{2,i}$ to the robot $101_i$, the control point passes a position corresponding to the commanded position $55_{2,i}$ at the time point $TP5_{2,i}$ delayed with respect to the commanded time. The irradiation of laser beam needs to be started when the control point actually passes the position $52_{2,i}$ and needs to be stopped when the control point actually passes the position $53_{2,i}$.

In order to perform processing by irradiating the processing target object W with the laser beam $L_i$ in a state in which the movement speed of the focal point of the laser beam $L_i$ is constant at the target speed $Vw_{j,i}$, the laser head $102_i$ needs to be accelerated before the laser head $102_i$ reaches the position to start irradiation of the laser beam $L_i$. The first time T1 is time for accelerating the laser head $102_i$ such that the laser head $102_i$ moves at the constant target speed $Vw_{j,i}$. The second time $T2_{j,i}$ is time for irradiating the processing target object W with the laser beam $L_i$ in a state in which the laser head $102_i$ is moving at the constant target speed $Vw_{j,i}$.

In the present exemplary embodiment, a period between the time points $TP1_{j,i}$ and $TP2_{j,i}$ is set as the first time T1 for accelerating the laser head $102_i$ with respect to the processing target object W. In addition, by performing an experiment or calculation in advance, a period between the time points $TP2_{j,i}$ and $TP3_{j,i}$ is set as the second time $T2_{j,i}$ for irradiation of the laser beam $L_i$.

Settings of the first time T1, the second time $T2_{j,i}$, and the third time T3 will be described in detail below. The actual speed of the laser head $102_i$ is deviated from the commanded speed thereof due to response delay of position control. Therefore, it is difficult to set the first time T1 by only the robot program $422_i$. Therefore, the robot $101_i$ is operated in various conditions with trial and error to measure the time in which the actual speed of the laser head $102_i$ reaches the target speed $Vw_{j,i}$ in each condition, and the first time T1 is set on the basis of measurement results thereof.

To be noted, although it is preferable that the speed of the laser head $102_i$ reaches the target speed $Vw_{j,i}$ and be constant when the first time T1 has elapsed, an error occurs in the speed due to factors such as the position and orientation of the robot $101_i$, the target speed $Vw_{j,i}$, and residual deviation derived from continuous operation of the robot $101_i$. Therefore, it is preferable that, among values obtained by measurement in various conditions, a value with the smallest speed error, that is, the longest time is set as the first time T1. That is, the first time T1 may be set such that the speed of the laser head $102_i$ is within a predetermined range based on the target speed $Vw_{j,i}$ when the first time has elapsed after starting acceleration of the laser head $102_i$. Although the first time T1 may be varied depending on the target speed $Vw_{j,i}$ of the laser beam at each welding target portion, the processing of the controller 121B can be more simplified when the first time T1 is set as the same value. Further, the same first time T1 is used for acceleration of all of the laser heads $102_1$ to $102_N$.

Figure 34A:
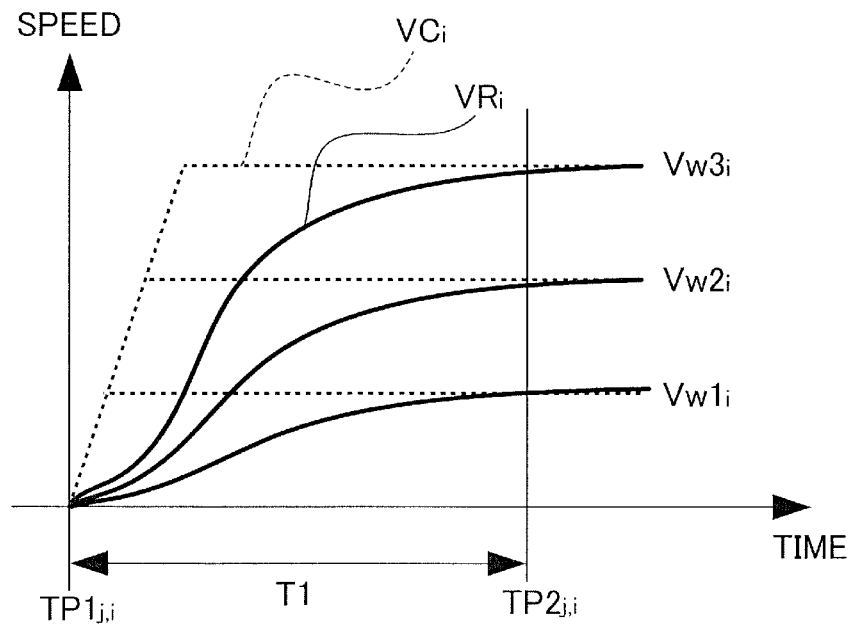
FIG. 34A is an explanatory diagram illustrating a movement profile when a target speed of a laser head is changed in the tenth exemplary embodiment.
Figure 34B:
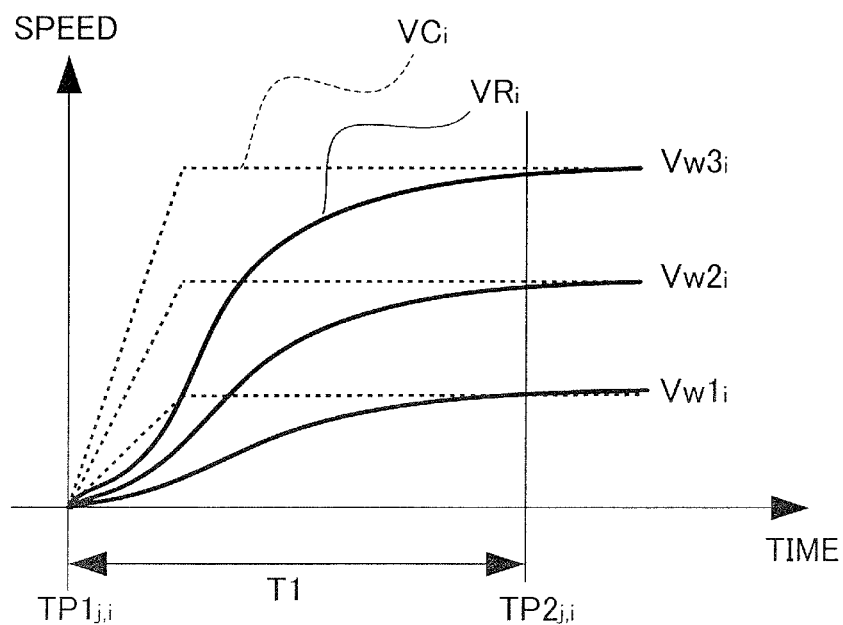
FIG. 34B is an explanatory diagram illustrating a movement profile when the target speed of the laser head is changed in the tenth exemplary embodiment.

FIGS. 34A and 34B are each an explanatory diagram illustrating a movement profile when the target speed of the laser head $102_i$ supported by the robot $101_i$ is changed. The same constituents as in FIGS. 5A and 5B will be denoted by the same reference signs. FIGS. 34A and 34B illustrate an example of changing the target speed of the laser head $102_i$ at portions to be welded to three speeds $VW_{1,i}$, $VW_{2,i}$, and $Vw3_i$. To be noted, commanded speeds $VC_i$ and actual speeds $VR_i$ of the robot $101_i$ are shown in FIGS. 34A and 34B. In FIG. 34A, the acceleration rate of the robot $101_i$ is set to the same value for the different target speeds $VW_{1,i}$, $VW_{2,i}$, and $Vw3_i$. Therefore, the acceleration time of the robot $101_i$ changes in accordance with the target speeds $VW_{1,i}$, $VW_{2,i}$, and $Vw3_i$. In FIG. 34B, the acceleration time of the robot $101_i$ is set to the same value for the different target speeds $VW_{1,i}$, $VW_{2,i}$, and $Vw3_i$. Therefore, the acceleration rate of the robot $101_i$ changes. In either of FIGS. 34A and 34B, the commanded speed $VC_i$ and the actual speed $VR_i$ approximately match in the case where the first time T1 is set to a sufficient value. Therefore, the robot $101_i$ reaching the constant speed region can be guaranteed immediately after the elapse of the first time T1. That is, it suffices as long as it is guaranteed that the robot $101_i$ has already reached the constant speed at the time point $TP2_{j,i}$ at which the elapse of the first time T1 is completed, and thus the robot $101_i$ may reach the constant speed at a time point before the time point $TP2_{j,i}$.

To be noted, the algorithm for obtaining the positions $54_{j,i}$ and $55_{j,i}$ positioned on an extension line connecting the taught positions $52_{j,i}$ and $53_{j,i}$ needs to be changed between the FIGS. 34A and 34B. For example, the position $54_{j,i}$ is obtained by extending a line segment between the positions $52_{j,i}$ and $53_{j,i}$ on the position $52_{j,i}$ side, and the amount of this extension is a distance obtained by integrating the actual speed $VR_i$ of FIGS. 34A and 34B from the time point $TP1_{j,i}$ to the time point $TP2_{j,i}$. The distance obtained by the integration is different between FIGS. 34A and 34B, and also changes when the target speeds $VW_{1,i}$, $VW_{2,i}$, and $Vw3_i$ are changed. Therefore, the algorithm for obtaining the position $54_{j,i}$ needs to be determined in consideration of these. The same applies to the algorithm for obtaining the position $55_{j,i}$.

The second time $T2_{j,i}$ is laser irradiation time, and is calculated by the following formula (19). Here, as algebra for calculation of the formula (19), Tw, Ps, Pe, and Vw are used. Tw corresponds to the second times $T2_{j,i}$, Ps corresponds to the positions $52_{1,i}$ and $52_{2,i}$, at which irradiation of the laser beam is started, Pe corresponds to the positions $53_{1,i}$ and $53_{2,i}$, at which the irradiation of the laser beam is stopped, and Vw corresponds to the target speed $Vw_{j,i}$. The second time Tw is calculated for each welding target portion by using Ps, Pe, and Vw in the following formula (19).

$$Tw = \frac{\|\vec{P}e - \vec{P}s\|_2}{Vw} \quad (19)$$

Tw: second time

Vw: target speed $\vec{P}s$: start position of laser beam irradiation $\vec{P}e$: end position of laser beam irradiation That is, the value of Tw serving as second time is obtained by dividing the distance between Ps and Pe by Vw. Different values of Ps, Pe, and Vw can be used for different welding target portions. Therefore, the value of Tw serving as the second time $T2_{1,i}$ or $T2_{2,i}$ corresponds to the length, or area of the welding target portion. Values of Tw calculated in this manner are set as the second times $T2_{1,i}$ and $T2_{2,i}$.

The positions $52_{1,i}$ and $52_{2,i}$ that are taught positions are each constituted by information of six degrees of freedom about position and orientation. Specifically, the information constituting the positions $52_{1,i}$ and $52_{2,i}$ includes X, Y, and Z, which are information about the position of the robot $101_i$ with respect to the base, and A, B, and C, which are information about the holding angle of the laser head $102_i$. The same applies to the positions $53_{1,i}$ and $53_{2,i}$. Therefore, a distance in the three-dimensional space is obtained by only using the position information of X, Y, and Z as Ps and Pe.

To be noted, this calculation may be performed by the robot controller $122_i$, and the robot controller $122_i$ may transfer the value of Tw serving as the second time to the controller 121B. In addition, the robot controller $122_i$ may calculate only the distance between Ps and Pe and transfer information about the distance to the controller 121B, and the controller 121B may perform the remaining calculation for obtaining the value of Tw serving as the second time. Which of these is selected can be appropriately selected on the basis of by which of the robot controller $122_i$ and the controller 121B the target speed Vw is described or designated.

The third time T3 is a time required for switching operation of the switcher 104, and is obtained by conducting an experiment in advance. For example, time required for the switching operation is measured by performing the switching operation of the switcher 104 a plurality of times, and a value obtained by adding a margin to the maximum value of measured values is set as the third time T3. The reason why the value obtained by adding the margin to the maximum value is set is because the switching needs to be certainly completed when the third time T3 has elapsed since the switching is commanded. To be noted, in the case where data of switching time is available in advance, a value obtained by adding a margin to a value of the data may be set as the third time T3. As described above, the first time T1, the second time $T2_{j,i}$, and the third time T3 are set in advance before actually operating the robot $101_i$ in a production line. To be noted, it is preferable that the first time T1 is set for both of the controller 121B and the robot controller $122_i$ in advance.

Incidentally, the welding target portion to be subjected to laser seam welding need to be irradiated with the laser beam $L_i$ not at a timing at which the position $52_{j,i}$ is commanded to the robot $101_i$ but at the time point $TP2_{j,i}$ at which the control point actually passes the position $52_{j,i}$. Similarly, the irradiation of the laser beam $L_i$ needs to be stopped not at a timing at which the position $53_{j,i}$ is commanded to the robot $101_i$ but at the time point $TP3_{j,i}$ at which the control point actually passes the position $53_{j,i}$.

That is, there is a case where response delay has occurred in the position control of the robot $101_i$ at the time point $TP2_{j,i}$ at which the control point reaches the constant speed region. The response delay of the position control is expressed by the difference between the commanded position and the actual position. In the case where there is response delay of the position control, this response delay of the position control needs to be incorporated in the calculation of the positions $54_{j,i}$ and $55_{j,i}$.

Therefore, the robot controller $122_i$ calculates the position $54_{j,i}$ at which movement is started and the position $55_{j,i}$ at which movement is stopped such that the control point reaches a target position when the first time T1 has elapsed after starting the operation of accelerating the laser head $102_i$. However, how the positions $54_{j,i}$ and $55_{j,i}$ are calculated is different between the case where the method of FIG. 34A is applied and the case where the method of FIG. 34B is applied. This calculation needs to be performed before executing the linear interpolation command for generating the trajectory data $P_1$ and $P_2$. For example, the calculation can be performed immediately before the linear interpolation command or before actually operating the robot $101_i$ in the production line. To be noted, the calculation algorithm thereof is described in the robot program $422_i$ and executed by the robot controller $122_i$.

Figure 35:
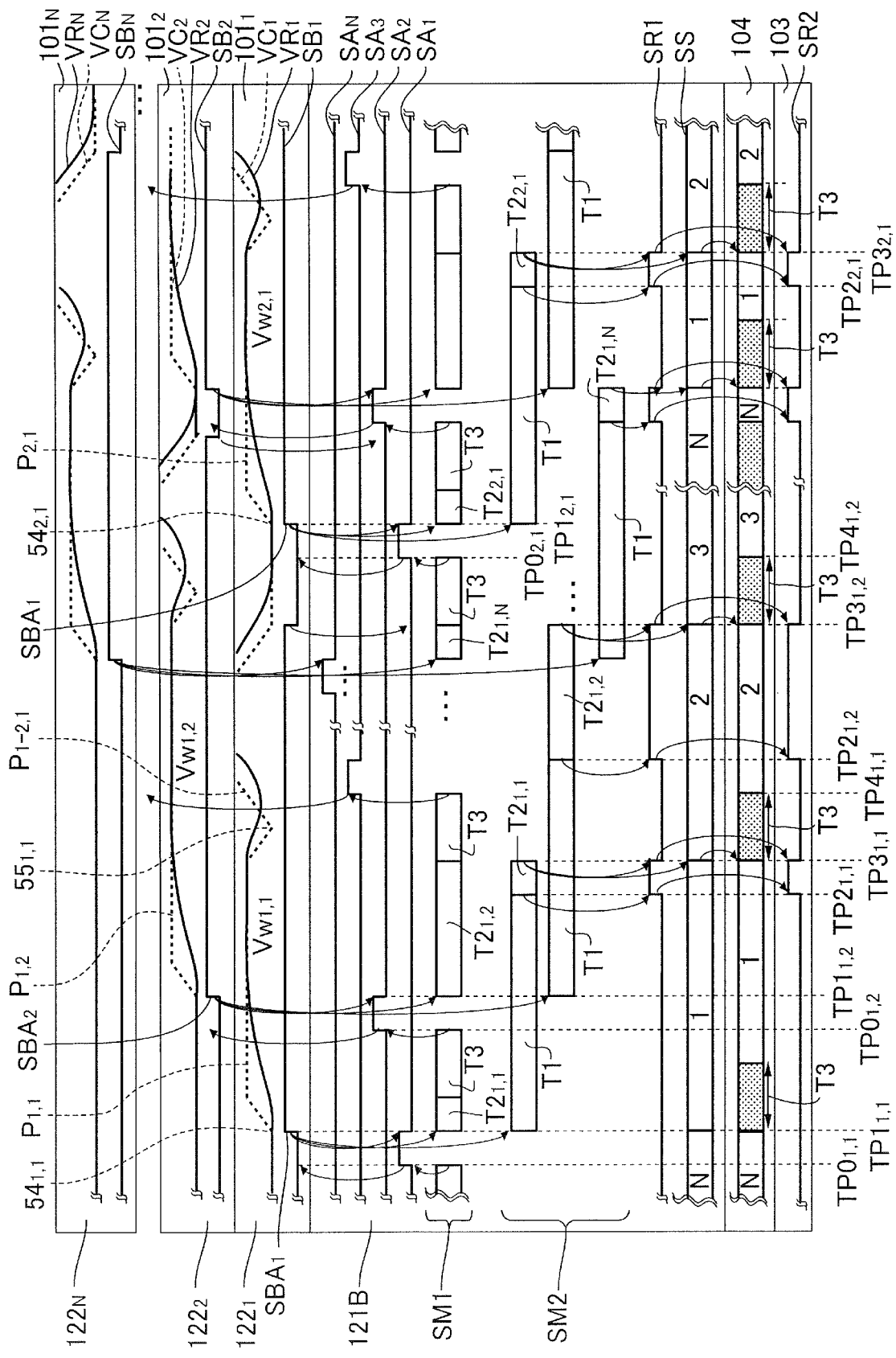
FIG. 35 is a timing chart illustrating each step of a laser processing method of performing laser processing by the laser welding apparatus in the tenth exemplary embodiment.

FIG. 35 is a timing chart illustrating each step of a laser processing method of performing laser processing by the laser welding apparatus 100B in the tenth exemplary embodiment. The same constituents as in FIG. 6 are denoted by the same reference signs. FIG. 35 illustrates the signals $SB_1$ to $SB_N$ transmitted from the robot controllers $122_1$ to $122_N$ to the controller 121B. FIG. 35 also illustrates the actual speeds $VR_1$ to $VR_N$ and the commanded speeds $VC_1$ to $VC_N$ of the laser heads $102_1$ to $102_N$ moved by the robots $101_1$ to $101_N$. FIG. 35 further illustrates the laser oscillation command SR1, the switching signal SS, and the operation start commands $SA_1$ to $SA_N$ transmitted from the controller 121B. In FIG. 35, numbers given to the switching signal SS each indicate to which of the robots $101_i$ that is, the laser heads $102_i$ switching is performed. Likewise, numbers given to the switcher 104 each indicate to which of the robots $101_i$, that is, the laser heads $102_i$ switching has been performed. The numbers given to the switching signal SS and the switcher 104 are serial numbers of i=1 to N described above. In FIG. 35, hatched parts of the portion corresponding to the switcher 104 indicates that the switching is being performed.

To be noted, as a precondition, which welding target portion one robot $101_i$ takes charge of is predetermined before starting the automatic operation. In addition, in what order the robots $101_1$ to $101_N$ operate is also predetermined before the automatic operation is started. That is, the order in which start of movement for welding is commanded to the robots $101_1$ to $101_N$ is preset in the controller 121B. Hereinafter, a case where the robots $101_1$ to $101_N$ are operated in the order of the robot $101_1$, the robot $101_2$, . . . the robot $101_N$, the robot $101_1$, the robot $101_2$, . . . will be described as an example. That is, the laser beam is guided to the laser heads $102_1$ to $102_N$ by the switcher 104 in the order of the laser head $102_1$, the laser head $102_2$, . . . the laser head $102_N$, the laser head $102_1$, the laser head $102_2$, . . . .

The controller 121B mainly manages two sequences SM1 and SM2. Specifically, as management of the first sequence SM1, the controller 121B commands timings at which the laser heads $102_1$ to $102_N$ start moving to welding target portions to the robot controllers $122_1$ to $122_N$.

As management of the second sequence SM2, the controller 121B commands the timing of on/off switching of the laser oscillator 103 and the timing of the switching operation of the switcher 104. Specifically, the controller 121B turns the laser oscillation command SR1 on when the first time T1 has elapsed after receiving the rising of the signal $SB_i$ from the robot controller $122_i$. Then, the controller 121B turns the laser oscillation command SR1 off when the second time $T2_{j,i}$ has elapsed since the time point at which the elapse of the first time T1 is completed. Further, after turning the laser oscillation command SR1 off, the controller 121B changes the switching signal SS to switch the optical path of the laser beam for the next irradiation of the laser beam.

The management of the two sequences SM1 and SM2 described above is performed in synchronization with the timing at which the signal $SB_i$ of the robot $101_i$ is turned on. Hereinafter, the management of the sequences SM1 and SM2 will be described in detail. When the automatic operation is started, the controller 121B turns the operation start command $SA_1$ on in accordance with the control program 321 in the sequence SM1. The timing at which the operation start command $SA_1$ is turned on is indicated as a time point $TP0_{1,1}$ in FIG. 35.

The robot controller $122_1$ monitors the operation start command $SA_1$, and the linear interpolation command including the position $55_{1,1}$ as the target position is executed after receiving the switching of the operation start command $SA_1$ from off to on. Then, trajectory data $P_{1,1}$ from the position $54_{1,1}$ to the position $55_{1,1}$ is supplied to the robot $101_1$ at a predetermined control period. That is, the robot controller $122_1$ causes the robot $101_1$ to start the operation of accelerating the laser head $102_1$ such that the movement speed of the laser head $102_1$ with respect to the processing target object W reaches the target speed $VW_{1,1}$. According to this, the laser head $102_1$, that is, the control point starts moving from the position $54_{1,1}$ to the position $55_{1,1}$ and accelerating such that the movement speed thereof reaches the constant target speed $VW_{1,1}$.

When the robot controller $122_1$ starts supplying the trajectory data $P_{1,1}$, the robot controller $122_1$ simultaneously transmits a signal $SBA_1$ obtained by switching the signal $SB_1$ from off to on to the controller 121B.

The rising occurring when switching the signal $SB_1$ from off to on serves as a synchronizing signal $SBA_1$ serving as a predetermined signal. That is, the robot controller $122_1$ transmits the synchronizing signal $SBA_1$ that is the rising of the signal $SB_1$ to the controller 121B when causing the robot $101_1$ to start the operation of accelerating the laser head $102_1$. This timing is shown as the time point $TP1_{1,1}$ in FIG. 35.

In the present exemplary embodiment, the rising of the signal $SB_1$ is used as the synchronizing signal $SBA_1$. Therefore, the signal $SB_1$ may shrink whenever before starting supplying the next trajectory data $P_{2,1}$ and after the control period of the controller 121B or more time has elapsed since the signal $SB_1$ has risen. In addition, although the rising of the signal $SB_1$ is used as the synchronizing signal $SBA_1$, the synchronizing signal $SBA_1$ is not limited to this, and the shrinkage of the signal $SB_1$ may be used as the synchronizing signal $SBA_1$. To be noted, in the present exemplary embodiment, turning the signal $SB_i$ off is used as a signal indicating that the robot $101_i$ is in a preparation complete state. The preparation complete state is a state in which the robot controller $122_i$ has completed supplying the trajectory data $P_{j-(i+1),i}$ between the trajectory data $P_j$ and the trajectory data $P_{j+1}$ and is prepared to wait for the signal $SA_i$.

The controller 121B monitors the signal $SB_1$ transmitted from the robot controller $122_1$, and starts timekeeping of the first time T1 corresponding to the laser head $102_1$ in the sequence SM2 when receiving the synchronizing signal $SBA_1$ that is the rising of the signal $SB_1$. For example, the first time T1 is a fixed value such as 200 msec.

When the first time T1 has elapsed, the laser head $102_1$ has reached a constant speed state at the target speed $VW_{1,1}$ for welding, and the control point is positioned at the commanded position $52_{1,1}$ illustrated in FIG. 32. Therefore, the controller 121B controls the laser oscillator 103 to generate the laser beam when the first time T1 has elapsed after receiving the synchronizing signal $SBA_1$ that is the rising of the signal $SB_1$, that is, when timekeeping of the first time T1 is finished. This time point is indicated as the time point $TP2_{1,1}$ in FIG. 35. Specifically, the controller 121B switches the laser oscillation command SR1 from off to on at the same time with the finish of timekeeping of the first time T1. That is, the controller 121B commands the laser oscillator 103 to generate a laser beam when the timekeeping of the first time T1 is finished. The laser oscillator 103 monitors the laser oscillation command SR1, and performs laser oscillation when receiving a signal indicating that the laser oscillation command SR1 has been switched from off to on. At the same time, the laser oscillator 103 switches the signal SR2 from off to on.

As described above, the robot controller $122_i$ causes the robot $101_i$ to start the operation of accelerating the laser head $102_i$ such that the movement speed of the laser head $102_i$ with respect to the processing target object W is constant at the target speed $Vw_{j,i}$ in accordance with the operation start command $SA_i$. Meanwhile, the controller 121B controls the laser oscillator 103 to generate the laser beam when the first time T1 has elapsed after starting the acceleration of the laser head $102_i$. The controller 121B detects the start of acceleration of the laser head $102_i$ caused by the control of the robot controller $122_i$ by receiving the synchronizing signal $SBA_i$.

The controller 121B starts timekeeping of the second time $T2_{1,1}$ when the timekeeping of the first time T1 is finished. The robot controller $122_1$ causes the robot $101_1$ to operate such that the movement speed of the laser head $102_1$ is maintained at the target speed $VW_{1,1}$ while the processing target object W is irradiated with the laser beam $L_1$ from the laser head $102_1$. The controller 121B controls the laser oscillator 103 to stop the generation of the laser beam $L_1$ when the second time $T2_{1,1}$ has further elapsed after the first time T1 has elapsed, that is, when the timekeeping of the second time $T2_{1,1}$ is finished. This time point is indicated as the time point $TP3_{1,1}$ in FIG. 35.

Specifically, the controller 121B switches the laser oscillation command SR1 from on to off at the same time with finishing the timekeeping of the second time $T2_{1,1}$. That is, the controller 121B commands the laser oscillator 103 to stop the generation of the laser beam when the timekeeping of the second time $T2_{1,1}$ is finished. The laser oscillator 103 stops the laser oscillation when receiving the switch of the laser oscillation command SR1 from on to off.

The controller 121B changes the switching signal SS at the same time with turning the laser oscillation command SR1 off, and commands the switcher 104 such that the laser head to which the laser beam is guided is switched from the first laser head $102_1$ to the second laser head $102_2$.

The switcher 104 monitors the switching signal SS, and performs the switching operation of changing the optical path by moving mirrors $114_1$ to $114_N$ in accordance with the command of the switching signal SS. This switching operation takes the third time T3, and a time point at which the switching operation is completed is indicate as a time point $TP4_{1,1}$ in FIG. 35. As a result of this switching operation, the laser beam $L_2$ can be emitted from the next laser head $102_2$.

Here, although the laser head to which the laser beam is guided is switched from the laser head $102_1$ to the laser head $102_2$ by the switcher 104, the operation rate of the laser oscillator 103 is low, that is, the production efficiency of the processed product is low, if the operation of the next robot $101_2$ is started after the switching operation.

Therefore, the control apparatus 120B causes the robot $101_2$ to start the operation of accelerating the laser head $102_2$ such that the movement speed of the laser head $102_2$ reaches the target speed $VW_{1,2}$ before the irradiation of the laser beam $L_1$ on the processing target object W by the laser head $102_1$ is finished. The period "before the irradiation of the laser beam $L_1$ on the processing target object W by the laser head $102_1$ is finished" includes a period before the start of irradiation. According to this, the operation rate of the laser oscillator 103, that is, the production efficiency of the processed product improves.

Hereinafter, management at a timing at which the controller 121B turns on the operation start command $SA_2$ to be transmitted to the robot controller $122_2$, that is, management of the sequence SM1 by the controller 121B will be described in detail.

In the present exemplary embodiment, the first time T1 counted each time the laser head $102_i$ is accelerated is the same time, that is, a fixed value such as 200 msec. The controller 121B causes the next laser head $102_2$ to radiate the laser beam after the third time T3, which is the time required for the switcher 104 to perform the switching operation, further elapses since the time point when the second time $T2_{1,1}$, which is the time in which the laser head $102_1$ radiates the laser beam, has elapsed. Therefore, it is preferable that the timing at which the operation start command $SA_2$ is transmitted to the next robot controller $122_2$ is after the total time $T2_{1,1}+T3$ that is the sum of the second time $T2_{1,1}$ and the third time T3 has elapsed since the acceleration of the laser head $102_1$ is started. To be noted, the start of the acceleration of the laser head $102_1$ is detected via the synchronizing signal $SBA_1$, by the controller 121B. The second time $T2_{1,1}$ is time for irradiating the first welding target portion with the laser beam from the laser head $102_1$.

In the present exemplary embodiment, as the sequence SM1, the controller 121B starts timekeeping of the total time $T2_{1,1}+T3$ that is the sum of the second time $T2_{1,1}$ and the third time T3 when receiving the synchronizing signal $SBA_1$, from the robot controller $122_1$. The timing at which this timekeeping is started is the same as the timing at which the timekeeping of the first time T1 for accelerating the laser head $102_1$ is started in the sequence SM2.

When the timekeeping of the total time $T2_{1,1}+T3$ is completed, the controller 121B checks whether or not the robot $101_2$ to be operated next is in the preparation complete state. In the present exemplary embodiment, the signal $SB_i$ being off indicates the preparation complete state. In the case where the signal $SB_i$ is not off, the controller 121B waits for the signal $SB_i$ to be on. In the case where the signal $SB_i$ is off, the controller 121B turns on the operation start command $SA_2$ to be transmitted to the robot controller $122_2$ that controls the robot $101_2$ to be operated next. The timing at which the operation start command $SA_2$ is turned on is indicated as the time point $TP0_{1,2}$ in FIG. 35.

The robot controller $122_2$ monitors the operation start command $SA_2$, and commands the trajectory data $P_{1,2}$ to the robot $101_2$ at a predetermined control period when the operation start command $SA_2$ is switched from off to on. That is, the robot controller $122_2$ causes the robot $101_2$ to start the operation of accelerating the laser head $102_2$ such that the movement speed of the laser head $102_2$ with respect to the processing target object W reaches the target speed $VW_{1,2}$. As a result of this, the laser head $102_2$, that is, the control point starts moving and accelerating such that the movement speed becomes constant at the target speed $VW_{1,2}$.

When the robot controller 122 starts supplying the trajectory data $P_{1,2}$, the robot controller $122_2$ simultaneously transmits a signal $SBA_2$ obtained by switching the signal $SB_2$ from off to on. That is, the robot controller $122_2$ transmits the synchronizing signal $SBA_2$ that is the rising of the signal $SB_2$ to the controller 121B when causing the robot $101_2$ to start the operation of accelerating the laser head $102_2$. This timing is shown as the time point $TP1_{1,2}$ in FIG. 35.

The controller 121B monitors the signal $SB_2$ transmitted from the robot controller $122_2$, and starts timekeeping of the first time T1 for accelerating the laser head $102_2$ when receiving the synchronizing signal $SBA_2$ that is the rising of the signal $SB_2$. At the same time, the controller 121B starts timekeeping of the total time $T2_{1,2}+T3$ that is the sum of the second time $T2_{1,2}$ and the third time T3. When the timekeeping of the total time $T2_{1,2}+T3$ is completed, the controller 121B checks whether the robot $101_3$ is in the preparation complete state. In the case where the robot $101_3$ is in the preparation complete state, further the next operation start command $SA_3$ is turned on. Similar processing is repeated for the robot $101_1$, . . . the robot $101_N$, the robot $101_1$, . . . . As described above, the controller 121B manages the timing of operation of the robot $101_i$ via the synchronizing signal $SBA_i$ in the sequence SM1.

Meanwhile, when the controller 121B receives the synchronizing signal $SBA_2$ that is the rising of the signal $SB_2$, timekeeping of the first time T1 or the second time $T2_{1,1}$ for the laser head $102_1$ is being performed. In the example of FIG. 35, the controller 121B is performing the timekeeping of the first time T1. When receiving the synchronizing signal $SBA_2$, the controller 121B starts timekeeping of the first time T1 for the laser head $102_2$ in the sequence SM2 in parallel with the timekeeping of the first time T1 for the laser head $102_1$. The controller 121B turns the laser oscillation command SR1 on when the first time T1 for the laser head $102_2$ has elapsed, that is, when the timekeeping of the first time T1 for the laser head $102_2$ is completed. This time point is indicated as the time point $TP2_{1,2}$ in FIG. 35. The controller 121B starts timekeeping of the second time $T2_{1,2}$ when the timekeeping of the first time T1 is finished. The controller 121B turns the laser oscillation command SR1 off when the timekeeping of the second time $T2_{1,2}$ is finished. This time point is indicated as the time point $TP3_{1,2}$ in FIG. 35.

The controller 121B changes the switching signal SS at the same timing as turning the laser oscillation command SR1 off, and commands the switcher 104 such that the laser head to which the laser beam is guided is switched from the second laser head $102_2$ to the third laser head $102_3$. The switcher 104 performs the switching operation in accordance with the switching signal SS. This switching operation takes the third time T3, and a time point at which the switching operation is completed is indicated as the time point $TP4_{1,2}$ in FIG. 35. Similar processing is repeated until laser welding by the N-th laser head $102_N$ is finished.

In each of the laser heads $102_1$ to $102_N$, after the laser welding on the first welding target portion is finished, the same sequences SM1 and SM2 are performed on the second welding target portion and subsequent welding target portions.

As described above, the controller 121B performs the sequences SM1 and SM2 independently from each other. The operation of the sequence SM1 and the operation of the sequence SM2 are synchronized by using the synchronizing signal $SBA_i$, and are not synchronized by any other means. That is, the controller 121B performs the sequences SM1 and SM2 on the basis of time elapsed since the time point at which the synchronizing signal $SBA_i$ is received. As described above, by managing the sequences SM1 and SM2 by using the synchronizing signal $SBA_i$, the management does not become complicated, and the sequences SM1 and SM2 can be stably performed.

According to the present exemplary embodiment, the robots $101_i$ are sequentially operated by the sequence SM1 and SM2 without waiting for the welding to be completed. Therefore, time loss can be reduced, and the operation rate of the laser oscillator 103, that is, the production efficiency of the processed product can be improved.

In the present exemplary embodiment, since the same first time T1 is counted each time the controller 121B receives the synchronizing signal $SBA_i$, the processing is simplified. That is, in the operation in which the controller 121B commands the timing of starting the operation of the robot $101_i$ to move the laser head $102_i$ to a welding target portion, the timing can be commanded by using only the second time $T2_{j,i}$ and the third time T3 without using the first time T1.

In FIG. 35, description is given by using a timing chart of a case where processing performed by the robot $101_i$ is short and standing by is not required. However, when the controller 121B completes the timekeeping of the total time $T2_{j,i}+T3$ and turns the operation start signal $SA_i$ on sequentially for the robots $101_1, \ldots 101_N, 101_1 \ldots$, some of the robots may not complete the movement. An example of this is illustrated in FIG. 36.

Figure 36:
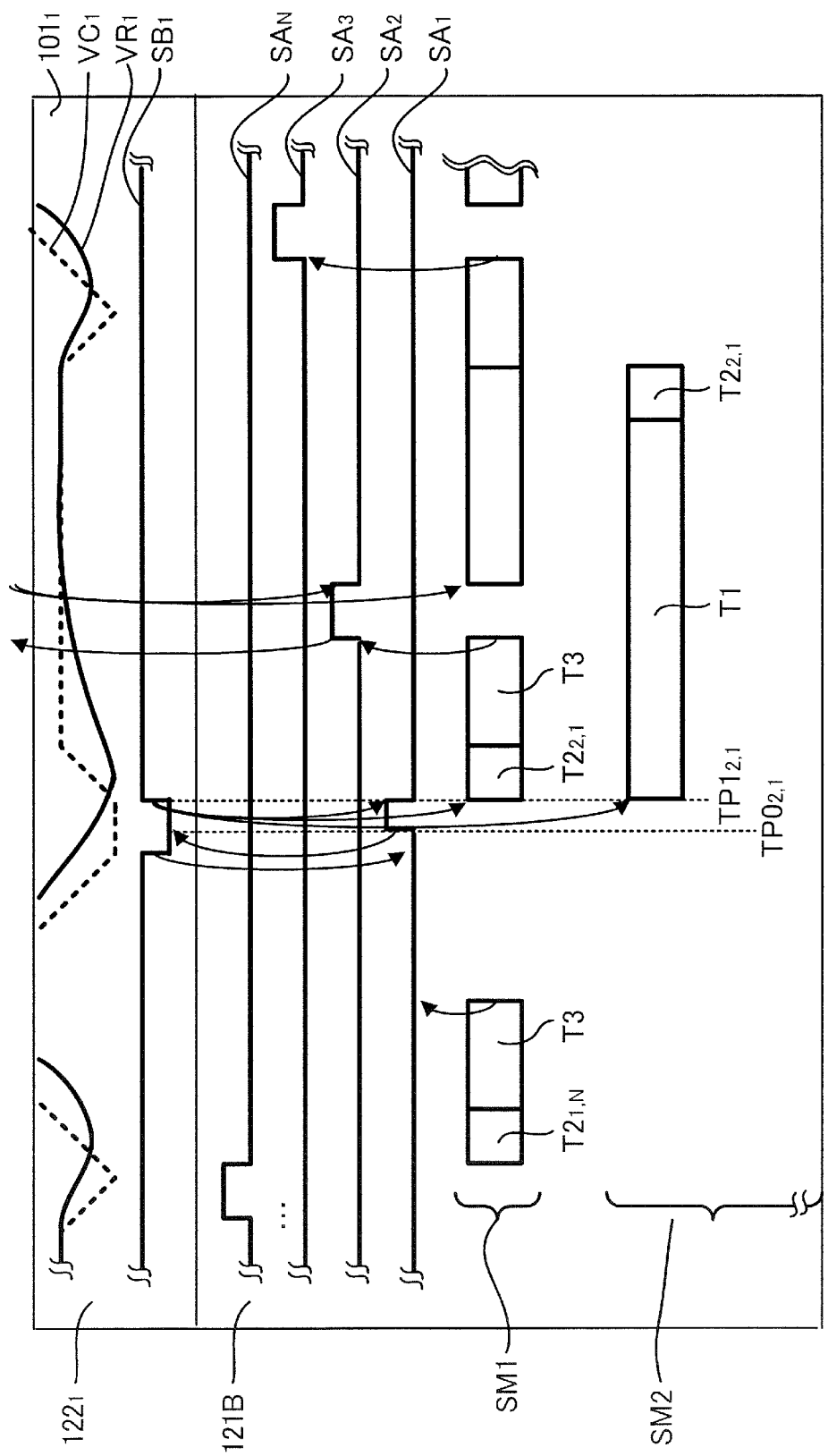
FIG. 36 is a timing chart illustrating each step of a laser processing method of performing laser processing by the laser welding apparatus in the tenth exemplary embodiment.

FIG. 36 is a timing chart illustrating each step of a laser processing method of performing laser processing by the laser welding apparatus in the tenth exemplary embodiment. The same constituents as in FIG. 6 are denoted by the same reference signs. In FIG. 36, the timing at which the robot $101_1$ takes the preparation complete state is earlier than the timing at which the timekeeping of the total time $T2_{1,N}+T3$ by the controller 121B is completed. In FIG. 36, the controller 121B has completed the timekeeping of the total time $T2_{1,N}+T3$, and the robot controller $122_1$ is supplying the trajectory data $P_{1\text{-}2,1}$ when this timekeeping is completed.

The robot controller $122_1$ takes the preparation complete state after completing the supply of the trajectory data $P_{1\text{-}2,1}$, and turns the signal $SB_1$ off to notify the controller 121B that the preparation is completed. Meanwhile, when the controller 121B completes the timekeeping of the total time $T2_{1,N}+T3$, the controller 121B checks whether or not the signal $SB_1$ is off. In the case where the signal $SB_1$ is not off, the controller 121B stands by until the signal $SB_1$ is turned off. When the signal $SB_1$ is turned off, the controller 121B turns the operation start command $SA_1$ on. To be noted, the timing at which the operation start command $SA_1$ is turned on is indicated as a time point $TP0_{2,1}$. Processing following this is the same as in FIG. 35.

To be noted, in the case of waiting for the preparation of the robot $101_i$ to be completed, that is, waiting for the signal $SB_i$ to be turned off, although the operation rate of the laser oscillator 103 decreases, the sequence does not fail. If the controller 121B waits for the preparation of the robot $101_i$ to be completed, activation of the sequence SM2 is delayed. In this case, the next laser oscillation in accordance with the sequence SM2 performed after the switcher 104 switches the optical path to guide the laser beam to the laser head $102_i$ is delayed, and therefore the timing of the laser oscillation becomes late. Therefore, the opportunity for the laser oscillation is missed in correspondence with the delay in the activation of the sequence SM2. In the case where the controller 121B waits for the preparation of the robot $101_i$ to be completed and actually waiting time occurs, the laser oscillator 103 and the switcher 104 cannot operate during the waiting time. Still, this processing is necessary for realizing the sequences. To be noted, even if the time from the time point $TP0_{2,1}$ to the time point $TP1_{2,1}$ in the FIGS. 35 and 36 is elongated, just the operation rate of the laser oscillator 103 decreases and the sequences do not fail. Although there is a case where the time from the time point $TP0_{2,1}$ to the time point $TP1_{2,1}$ becomes longer when a processing load is put on the robot controller $122_i$, just the activation of the sequence SM2 is delayed also in this case. Therefore, as described above, just the opportunity of laser oscillation is missed in correspondence with the delay of the activation of the sequence SM2.

The waiting time of the laser oscillator 103 and the switcher 104 will be described. The robot controller $122_i$ that controls the robot $101_i$ starts supplying the trajectory data $P_j$ when receiving the operation start command $SA_i$ from the controller 121B. Although the robot controller $122_i$ does not perform timekeeping, the robot controller $122_i$ completes the supply of the trajectory data $P_j$ when the controller 121B completes the timekeeping of the first time T1 and the second time $T2_{j,i}$. Next, the robot controller $122_i$ starts supplying the trajectory data $P_{j\text{-}(j+1)}$. This time in which the trajectory data $P_{j\text{-}(j+1)}$ is supplied is defined as a rough movement time $T4_{j,i}$. In addition, the waiting time of the laser oscillator 103 and the switcher 104 is defined as a time $T5_{j,i}$. The waiting time $T5_{j,i}$ is time for the laser oscillator 103 and the switcher 104 to wait for the operation of a robot to complete. Time in which the robot $101_i$ moves from the position $53_{j,i}$, at which irradiation of the laser beam on the welding target portion is finished, to the position $52_{j,i}$, at which irradiation of the laser beam on the next welding target portion, will be described. This time is time between completion of timekeeping of the second time $T2_{j,i}$ to the start of timekeeping of the second time $T2_{j+1,i}$. This time is defined as a non-welding time $T6_{j,i}$ of the robot $101_i$.

Figure 37A:
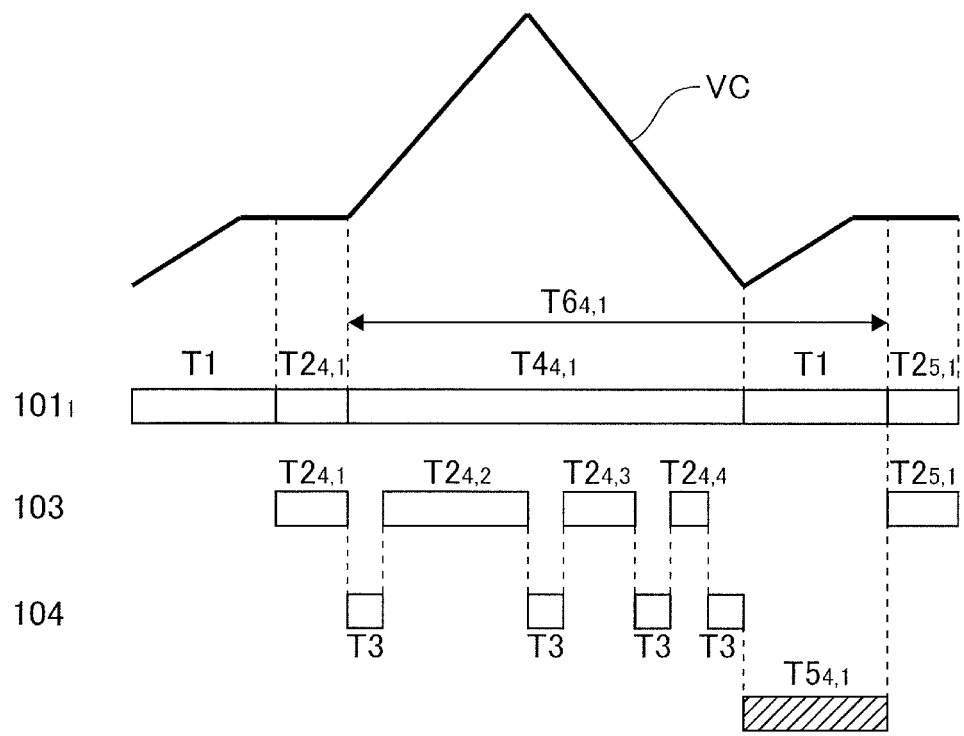
FIGS. 37A and 37B are timing charts illustrating examples of operation time of robots, a laser oscillator, and a switcher in the tenth exemplary embodiment.
Figure 37B:
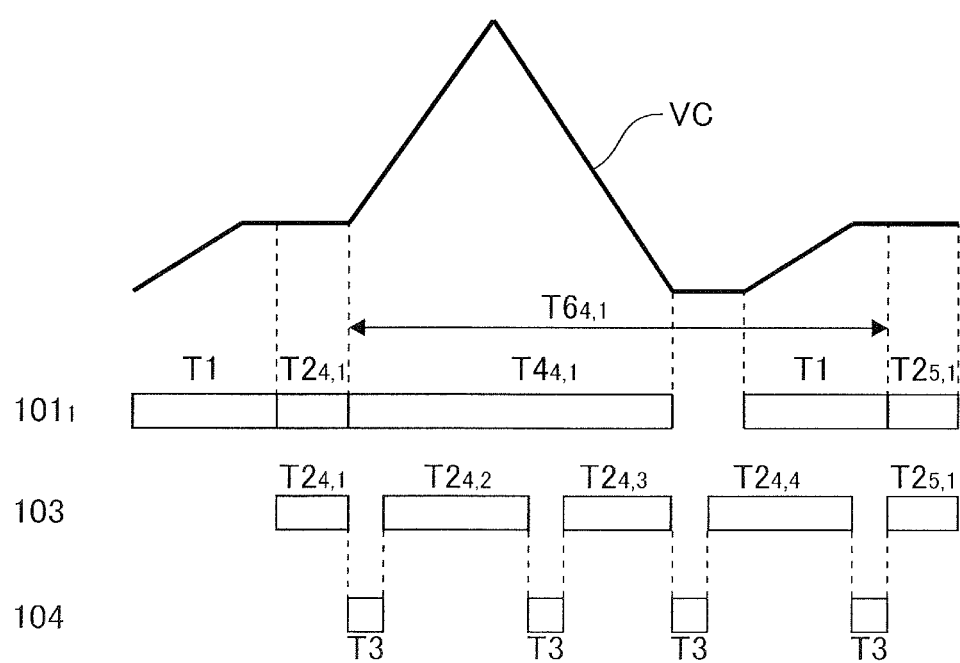

FIGS. 37A and 37B are diagrams each illustrating an example of operation time of the robot $101_i$, the laser oscillator 103, and the switcher 104 in the tenth exemplary embodiment. FIG. 37A illustrates an example in which the waiting time $T5_{j,i}$ occurs, and FIG. 37B illustrates an example in which the waiting time $T5_{j,i}$ does not occur.

FIGS. 37A and 37B each illustrate, as an example, a case where the robot $101_2$, the robot $101_3$, and the robot $101_4$ respectively perform welding on fourth welding target portions while the control point is moving from the fourth welding target portion thereof to the fifth welding target portion thereof. Time in which the laser oscillator 103 operates during non-welding time $T6_{4,1}$ is the sum of times in which the robot $101_2$, the robot $101_3$, and the robot $101_4$ respectively perform welding on the fourth welding target portions, that is, a total time $T2_{4,2}+T2_{4,3}+T2_{4,4}$. Time in which the switcher 104 operates during the non-welding time $T6_{4,1}$ is time 4×T3 for performing switching four times because switching is performed from the robot $101_1$ to the robot $101_2$, from the robot $101_2$ to the robot $101_3$, from the robot $101_3$ to the robot $101_4$, and then from the robot $101_4$ to the robot $101_1$ again. As illustrated in FIG. 37A, the waiting time $T5_{4,1}$ until welding is performed on the fifth welding target portion is $\{(T4_{4,1}+T1)-\{(4×T3)+(T2_{4,2}+T2_{4,3}+T2_{4,4})\}$. As illustrated in FIG. 37A, when the waiting time $T5_{j,i}$ occurs, the laser oscillator 103 and the switcher 104 cannot operate.

Similarly to FIG. 37A, FIG. 37B illustrates, as an example, a case where the robot $101_2$, the robot $101_3$, and the robot $101_4$ respectively perform welding on the fourth welding target portions while the robot $101_1$ is moving from the fourth welding target portion thereof to the fifth welding target portion thereof. However, the time $T2_{4,2}+T2_{4,3}+T2_{4,4}$ in which the laser oscillator 103 operates during the rough movement time $T4_{4,1}$ and the non-welding time $T6_{4,1}$ of the robot $101_1$ is different from the case of FIG. 37A. In FIG. 37B, during the non-welding time $T6_{4,1}$, the processing concerning the second time $T2_{j,i}$ and the third time T3 is performed without any interval during the non-welding time $T6_{4,1}$. Therefore, no spare time occurs and thus the waiting time $T5_{j,i}$ does not occur. However, when the supply of trajectory data $P_{4-5}$ is completed, the signal $SB_1$ is turned off, and the robot $101_1$ is kept standing by until receiving the operation start command $SA_1$. Since the laser oscillator 103 is expensive, it is preferable that adjustment is made such that the operation rate of the laser oscillator 103 is high.

This can be expressed by the following formula (20) in a generalized form. A set A is defined as an arithmetic sign for the formula (20). The set A is a set of numbers of the robots $101_i$ that operate during the non-welding time $T6_{j,i}$. For example, in the case of FIGS. 37A and 37B, the set A includes 2, 3, and 4. In the formula (20), count(A) is a function of counting the number of elements in a set. In the case of FIGS. 37A and 37B, since the set A is composed of 2, 3, and 4, the number of elements thereof is 3, and therefore count(A)=3 holds. $\Sigma T2_{j,k}$ is an expression for summing up elements of the number corresponding to the set A, and is $T2_{4,2}+T2_{4,3}+T2_{4,4}$ in the case of FIGS. 37A and 37B.

$$Ttemp_{j,i} = (T4_{j,i} + T1) - \left\{(\text{count}(A) + 1) \cdot T3 + \sum_{k \in A} T2_{j,k}\right\} \quad (20)$$

$$\begin{cases} T5_{j,i} = Ttemp_{j,i} & (Ttemp_{j,i} > 0) \\ T5_{j,i} = 0 & (Ttemp_{j,i} <= 0) \end{cases}$$

In the formula (20), $T4_{j,i}+T1$ is time required for the control point of the robot $101_i$ to move from the j-th welding target portion to the (j+1)-th welding target portion.

In the case where the value of $Ttemp_{j,i}$ in the formula (20) is a positive value, the waiting time $T5_{j,i}$ of the calculated value of $Ttemp_{j,i}$ occurs. In the case where the value of $Ttemp_{j,i}$ in the formula (20) is a negative value or 0, the waiting time $T5_{j,i}$ does not occur. That is, by reducing the rough movement time $T4_{j,i}$ or increasing the total time of the second time $T2_{j,i}$ or the total time of the third time T3 during the non-welding time $T6_{j,i}$, the waiting time $T5_{j,i}$ can be reduced.

To reduce the waiting time $T5_{j,i}$, the welding target portions which each robot $101_i$ takes charge of can be devised. The robots $101_i$ can be disposed at such positions that part of the welding target portions of the processing target object W can be welded by a plurality of robots $101_i$. Then, which welding target portions the robots $101_i$ each perform welding on is determined such that the waiting time $T5_{j,i}$ becomes shorter. A specific example of determining the welding target portions of the plurality of robots $101_i$ to reduce the waiting time $T5_{j,i}$ in this manner will be described.

As illustrated in FIG. 37A, it is assumed that the robot $101_1$ is moved from the fourth welding target portion to the fifth welding target portion. At this time, the robot $101_2$, the robot $101_3$, and the robot $101_4$ respectively perform welding on the fourth welding target portions. In this case, the waiting time $T5_{4,1}$ is $\{(T4_{4,1}+T1)-\{(4×T3)+(T2_{4,2}+T2_{4,3}+T2_{4,4})\}$.

In addition, it is assumed that the robot $101_1$ is moved from the fourth welding target portion to the fifth welding target portion and that the robot $101_2$ and the robot $101_3$ respectively perform welding on the fourth welding target portions and the robot $101_4$ does not perform welding. In this case, the waiting time $T5_{5,1}$ is $\{(T4_{4,1}+T1)-\{(3×T3)+(T2_{4,2}+T2_{4,3})\}$.

The waiting time $T5_{5,1}$ is compared between the example in which the other three robots $101_i$ perform welding while the robot $101_1$ is moved from the fourth welding target portion to the fifth welding target portion and the example in which the other two robots $101_i$ perform welding while the robot $101_1$ is moved from the fourth welding target portion. The waiting time $T5_{5,1}$ is longer by $T3+T2_{4,4}$ in the case where the other two robots $101_i$ perform welding. That is, the waiting time $T5_{j,i}$ can be reduced more in the case where the number of other robots $101_i$ that perform welding during the non-welding time $T6_{j,i}$ of a robot $101_i$ is larger.

To be noted, in both of these examples, the waiting time $T5_{4,1}$ is a positive value. When the waiting time $T5_{4,1}$ is 0, the waiting time $T5_{4,1}$ remains 0 even in the case where the number of robots is increased.

Figure 38:
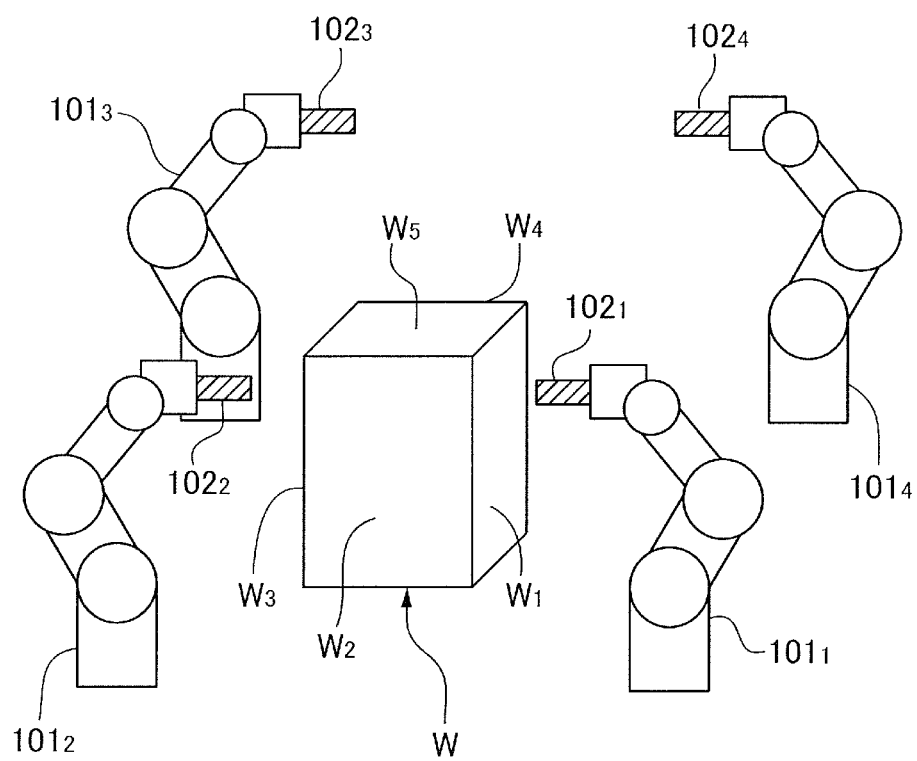
FIG. 38 is an explanatory diagram illustrating an example of arrangement of a processing target object and the robots in the tenth exemplary embodiment.

Next, it is assumed that the processing target object W illustrated in FIG. 30 has a rectangular parallelepiped shape, a welding target portion is provided in each of four side surfaces and a top surface of the processing target object W, and four robots $101_i$ are disposed around the processing target object W. FIG. 38 is a schematic diagram illustrating a case where the number of robots is set to 4 in the tenth exemplary embodiment. In FIG. 38, the processing target object W includes side surfaces $W_1$, $W_2$, $W_3$, and $W_4$, and a top surface $W_5$. Four robots $101_1$, $101_2$, $101_3$, and $101_4$ are diagonally disposed from one another as viewed downward from above the processing target object W, and respectively support laser heads $102_1$, $102_2$, $102_3$, and $102_4$. The laser head $102_1$ supported by the robot $101_1$ is capable of performing welding on welding target portions on the side surfaces $W_1$ and $W_2$ and the top surface $W_5$ by operating the robot $101_1$. The laser head $102_2$ supported by the robot $101_2$ is capable of performing welding on welding target portions on the side surfaces $W_2$ and $W_3$ and the top surface $W_5$ by operating the robot $101_2$. The laser head $102_3$ supported by the robot $101_3$ is capable of performing welding on welding target portions on the side surfaces $W_3$ and $W_4$ and the top surface $W_5$ by operating the robot $101_3$. The laser head $102_4$ supported by the robot $101_4$ is capable of performing welding on welding target portions on the side surfaces $W_4$ and $W_1$ and the top surface $W_5$ by operating the robot $101_4$. It is assumed that 51 welding target portions are provided on the side surface $W_1$, 50 welding target portions are provided on the side surface $W_2$, 51 welding target portions are provided on the side surface $W_3$, 47 welding target portions are provided on the side surface $W_4$, and 4 welding target portions are provided on the top surface $W_5$.

In the case where difference between the numbers of welding target portions on which the four robots $101_1$, $101_2$, $101_3$, and $101_4$ respectively perform welding is larger, the number of other robots $101_i$ that perform welding during the non-welding time $T6_{j,i}$ becomes smaller, and the waiting time $T5_{j,i}$ becomes longer. Therefore, the welding target portions on the processing target object W are distributed among the four robots $101_1$, $101_2$, $101_3$, and $101_4$ such that the difference between the numbers of welding target portions on which the four robots $101_1$, $101_2$, $101_3$, and $101_4$ respectively perform welding is smallest. In the example of FIG. 38, which robot $101_i$ takes charge of welding on which of the side surfaces $W_1$ to $W_4$ and the top surface $W_5$ is determined such that operation areas of the four robots $101_1$, $101_2$, $101_3$, and $101_4$ do not overlap with one another. For example, the robot $101_1$ takes charge of the side surface $W_1$, and performs welding on the 51 welding target portions on the side surface $W_1$. The robot $101_2$ takes charge of the side surface $W_2$, and performs welding on the 50 welding target portions on the side surface $W_2$. The robot $101_3$ takes charge of the side surface $W_3$, and performs welding on the 51 welding target portions on the side surface $W_3$. The robot $101_4$ takes charge of the side surface $W_4$ and the top surface $W_5$, and performs welding on the 47 welding target portions on the side surface $W_4$ and the 4 welding target portions on the top surface $W_5$. As a result of this, the difference between the numbers of welding target portions on which the four robots $101_1$, $101_2$, $101_3$, and $101_4$ respectively perform welding becomes smallest, and thus the waiting time $T5_1$, can be reduced.

As described above, by disposing the robots $101_i$ such that part of the plurality of welding target portions on the processing target object W can be subjected to welding by two or more of the robots $101_i$, the difference between the numbers of welding target portions on which the robots $101_i$ respectively take charge of can be reduced. Therefore, the number of other robots $101_i$ that perform welding during the non-welding time $T6_{j,i}$ can be increased, and thus the waiting time $T5_{j,i}$ can be reduced.

In addition, in the case where the processing target object W is a polyhedron such as a rectangular parallelepiped as in the example described above, interference between the robots $101_i$ can be easily prevented by a simple measure like assigning each robot $101_i$ to operation on different surface among side surfaces and a top surface.

Here, although a case where which surface, that is, which welding target portion of the processing target object W each robot $101_i$ takes charge of is determined such that operation areas of the four robots $101_i$ do not overlap with one another has been described in the example of FIG. 38, the configuration is not limited to this. The plurality of welding target portions may be distributed among the plurality of robots $101_i$ such that the robots $101_i$ do not interfere with one another even in the case where the operation areas of the robots $101_i$ overlap with one another.

Figure 39:
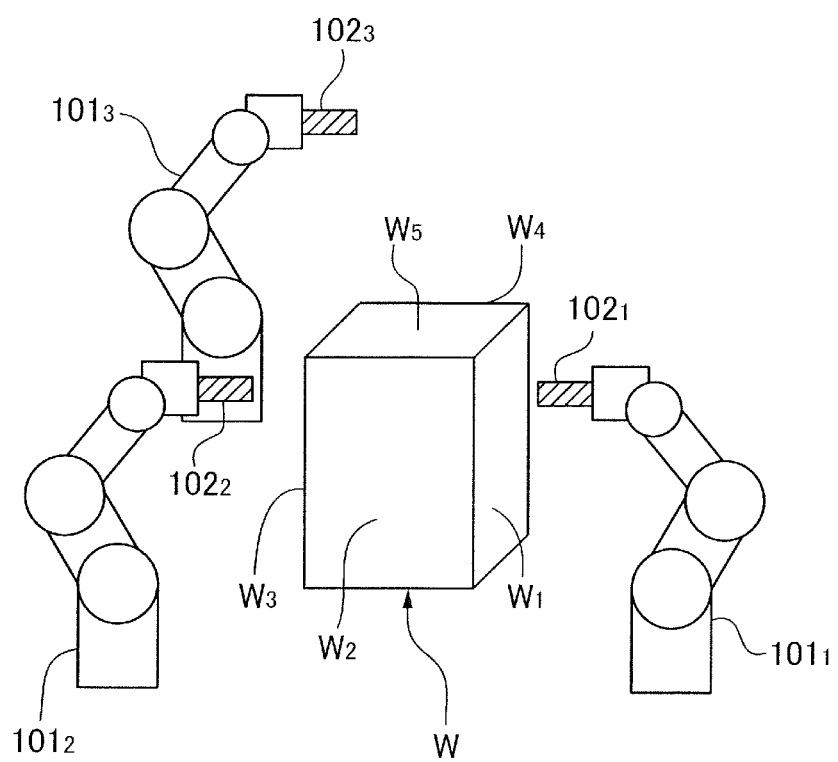
FIG. 39 is an explanatory diagram illustrating an example of arrangement of the processing target object and the robots in the tenth exemplary embodiment.

FIG. 39 is a schematic diagram illustrating a case where the number of robots is set to 3 in the tenth exemplary embodiment. The processing target object W of FIG. 39 is the same as that of FIG. 38. Three robots $101_1$, $101_2$, and $101_3$ are disposed in the same manner as in FIG. 38. In FIG. 39, the robot $101_4$ illustrated in FIG. 38 is omitted. As described above, on the processing target object W, there are 51 welding target portions on the side surface $W_1$, 50 welding target portions on the side surface $W_2$, 51 welding target portions on the side surface $W_3$, 47 welding target portions on the side surface $W_4$, and 4 welding target portions on the top surface $W_5$. Which welding target portion each of the robots $101_1$, $101_2$, and $101_3$ takes charge of is determined such that the robots $101_1$, $101_2$, and $101_3$ do not interfere with one another and that operation areas of the robots $101_1$, $101_2$, and $101_3$ overlap with one another.

The robot $101_1$ takes charge of 68 welding target portions in total including all 51 welding target portions on the side surface $W_1$ and 17 welding target portions on the side surface $W_2$. The robot $101_2$ takes charge of 68 welding target portions in total including 33 welding target portions on the side surface $W_2$ and 35 welding target portions on the side surface $W_3$. The robot $101_3$ takes charge of 67 welding target portions in total including 16 welding target portions on the side surface $W_3$, all 47 welding target portions on the side surface $W_4$, and all 4 welding target portions on the top surface $W_5$. That is, two robots $101_1$ and $101_2$ take charge of the side surface $W_2$, and two robots $101_2$ and $101_3$ take charge of the side surface $W_3$.

The order of welding is determined so as to avoid interference between two robots $101_i$, that is, such that the two robots $101_i$ do not perform welding on the same side surface $W_2$ or $W_3$. For example, the robot $101_1$ is configured to start welding from the side surface $W_1$ and perform welding on the side surface $W_2$ after finishing the welding on the side surface $W_1$. The robot $101_2$ is configured to start welding from the side surface $W_2$ and perform welding on the side surface $W_3$ after finishing the welding on the 33 welding target portions on the side surface $W_2$ that the robot $101_2$ takes charge of. The robot $101_3$ is configured to start welding from the side surface $W_3$, perform welding on the side surface $W_4$ after finishing the welding on the 16 welding target portions on the side surface $W_3$ that the robot $101_3$ takes charge of, and finally perform welding on the top surface $W_5$. The number of welding target portions on the surface that each of the robots $101_1$, $101_2$, and $101_3$ performs welding first among the side surfaces $W_1$, $W_2$, and $W_3$ is configured to be different therebetween. That is, the robot $101_1$ performs welding on 51 welding target portions on the side surface $W_1$, the robot $101_2$ performs welding on 33 welding target portions on the side surface $W_2$, which are part of the welding target portions on the side surface $W_2$, and the robot $101_3$ performs welding on 16 welding target portions on the side surface $W_3$, which are part of the welding target portions on the side surface $W_3$. Therefore, the robot $101_3$ can complete welding on the 16 welding target portions on the side surface $W_3$, which are part of the welding target portions on the side surface $W_3$, and move to the side surface $W_4$ before the robot $101_2$ completes welding on the 33 welding target portions on the side surface $W_2$, which are part of the welding target portions on the side surface $W_2$, and moves to the side surface $W_3$. In addition, the robot $101_2$ can complete welding on the 33 welding target portions on the side surface $W_2$, which are part of the welding target portions on the side surface $W_2$, and move to the side surface $W_3$ before the robot $101_1$ completes welding on all the 51 welding target portions on the side surface $W_1$ and moves to the side surface $W_2$. As described above, interference between the robots $101_i$ can be avoided by considering the order of welding of the robots $101_i$ even in the case where the operation areas of the robots $101_i$ overlap with one another.

As described above, in the case where the number N of the robots $101_i$ is larger, the total time of the second time $T2_{j,i}$ and the total time of the third time T3 during the non-welding time $T6_{j,i}$ can be increased, and the waiting time $T5_{j,i}$ can be reduced. In the N robots $101_i$, at most the other (N−1) robots $101_i$ can perform welding during the non-welding time $T6_{j,i}$ of a robot $101_i$. Therefore, the waiting time $T5_{j,i}$ can be shortened by determining the number N such that the total time of the second times $T2_{j,i}$ of (N−1) robots and the third times T3 of N robots is longer than the time $T4_{j,i}$+T1.

The more the number N of the robots $101_i$ increases, the more the operation rate of the laser oscillator 103 increases and the production efficiency of the processed product is improved. In contrast, the size and cost of the apparatus can be reduced more in the case where the number N of the robots $101_i$ is smaller. Therefore, the number N of robots can be determined in consideration of these. To increase the operation rate of the laser oscillator 103, the order of welding on welding target portions that the robots $101_i$ take charge of can be devised, and the order of operation of the plurality of robots can be devised. If the waiting time $T5_{j,i}$ is shortened by devising these orders, the operation rate of the laser oscillator 103 is increased, and thus the production efficiency of the processed product can be improved.

To be noted, since the timing of the laser oscillation is managed by using the synchronizing signal $SBA_i$, the variation of length of the welding bead does not change even in the case where the time between the time points $TP0_{2,1}$ and $TP1_{2,1}$ changes, and welding strength does not change either. Therefore, welding can be performed stably.

Each time the controller 121B receives the synchronizing signal $SBA_i$ transmitted from the robot controller $122_i$, the controller 121B controls the laser oscillator 103 to generate a laser beam when the same time of the first time T1 has elapsed. That is, the same time is used as the first time T1 instead of setting a different time for each welding target portion. Therefore, each time the controller 121B receives the synchronizing signal $SBA_i$, the controller 121B counts the same time as the first time T1 without recognizing which trajectory data $P_{j,i}$ the robot controller $122_i$ has started commanding, and thus the processing is simplified.

The movement speed of the laser head $102_i$ has reached the target speed $Vw_{j,i}$ when the first time T1 has elapsed, and the processing target object W is irradiated with the laser beam in the state of the constant speed at this target speed $Vw_{j,i}$. That is, by moving the laser head $102_i$ at a constant speed with respect to the processing target object W, the focal point of the laser beam $L_i$ can be moved at a constant speed along the surface of the processing target object W. Therefore, the amount of input heat on the processing target object W is uniformized in the movement direction of the focal point of the laser beam $L_i$, and thus a uniform welding bead can be formed on the processing target object W in the movement direction of the focal point of the laser beam $L_i$. As a result of this, highly precise laser seam welding can be realized.

Here, the control period of the robot controller $122_i$ is set to a value suitable for controlling the operation of the robot $101_i$, for example, several milliseconds. In the present exemplary embodiment, the controller 121B controls on/off switching of laser oscillation of the laser oscillator 103 and the switching operation of the switcher 104 at a shorter control period than the control period of the robot controller $122_i$. That is, in the present exemplary embodiment, the control period of the controller 121B to control the laser oscillator 103 and the switcher 104 is shorter than the control period of the robot controller $122_i$ to control the robot $101_i$. Therefore, the controller 121B can more accurately manage the first time T1, the second time $T2_{j,i}$, and the third time T3 than the robot controller $122_i$. That is, since the controller 121B can control the laser oscillator 103 and the switcher 104 with a shorter control period, the controller 121B can more accurately manage the timing for causing the laser oscillator 103 to start and stop generation of the laser beam and the timing of the switching of the switcher 104. As a result, variation of the length of the welding bead can be reduced, and thus variation of the welding strength can be reduced.

According to the present exemplary embodiment, the timing at which the robot controller $122_i$ commands the start point of the trajectory data $P_{j,i}$ and the timing at which the controller 121B starts the timekeeping of the first time T1 are configured to be synchronized on the basis of the synchronizing signal $SBA_i$. The timing at which the robot controller $122_i$ commands the start point of the trajectory data $P_{j,i}$ is the timing at which the robot controller $122_i$ starts supplying the trajectory data $P_{j,i}$. That is, the robot controller $122_i$ generates the synchronizing signal $SBA_i$ synchronized with the operation of the robot $101_i$, and the on/off switching of the irradiation of the laser beam is managed by the elapsed time from the time point at which the controller 121B is synchronized with the synchronizing signal $SBA_i$. Therefore, the controller 121B and the robot controller $122_i$ synchronize the operation of the robot $101_i$ with the on/off switching of the laser oscillation of the laser oscillator 103 without performing complicated arithmetic processing. Therefore, the deviation between the timing of the operation of the robot $101_i$ and the timing of the laser oscillation can be reduced. As a result of this, the difference between the actual position and the target position for starting the irradiation of the laser beam can be reduced. In addition, since the laser oscillation does not have to be controlled by performing complicated arithmetic processing while the robot $101_i$ is operating, the operation of the robot $101_i$ can be accelerated while securing the precision of laser processing, and thus the production efficiency of the processed product can be improved.

The control period of the robot controller $122_i$ is longer than the control period of the controller 121B. Therefore, the timing at which the robot controller $122_i$ recognizes the operation start command $SA_i$ varies. In the present exemplary embodiment, the controller 121B starts timekeeping of the first time T1 in which the laser oscillation is performed, not at a timing at which the operation start command $SA_i$ is transmitted but at a timing at which the synchronizing signal $SBA_i$ is received. Therefore, the difference in the timing of operation of the robot $101_i$ and the timing of laser oscillation of the laser oscillator 103 can be reduced.

To be noted, the robot controller 122, may be configured to turn on an unillustrated preparation completion signal indicating that the preparation is completed. In this case, the controller 121B may turn on the operation start command $SA_i$ after confirming that the preparation completion signal has been turned on. In this case, time points after the time point $TP0_{2,1}$ are delayed.

The first time T1 may be a count value that varies depending on the corresponding robot $101_i$, although the arithmetic processing for obtaining the timing at which the operation start command $SA_i$ is turned on becomes more complex. For example, variation of the first time T1 may be added to or subtracted from a value obtained by adding up the second time $T2_{j,i}$ and the third time T3. This calculation can be performed backward by determining timings starting from the timing of laser irradiation on the last welding target portion to the timing of laser irradiation on the first welding target portion. In the case where the controller 121B performs this calculation, the controller 121B needs to obtain information about the order of all the welding target portions and the robots.

In the present exemplary embodiment, the order in which the operation start command $SA_i$ is transmitted to the robots $101_1$ to $101_N$ is determined in advance. However, a configuration in which the robot controller $122_i$ transmits the second time $T2_{j,i}$ to the controller 121B together with the synchronizing signal $SBA_i$ such that the operation start command $SA_i$ is transmitted to a robot $101_i$ that is in the preparation complete state may be also employed. The times used for timekeeping in the sequences SM1 and SM2 managed by the controller 121B are the first time T1, the second time $T2_{j,i}$, and the third time T3. Among these, the first time T1 and the third time T3 can be stored in the controller 121B in advance because these times are fixed values. Since the second time $T2_{j,i}$ varies depending on the welding target portion, the robot controller $122_i$ may transmit the second time $T2_{j,i}$ to the controller 121B together with the synchronizing signal $SBA_i$. The second time $T2_{j,i}$ that is transmitted is used in the sequences SM1 and SM2 activated in accordance with the synchronizing signal $SBA_i$. By using this method, the order in which the operation start command $SA_i$ is transmitted to robots does not have to be determined in advance, and thus the independence of the robot apparatus 110 can be enhanced.

To be noted, in the tenth exemplary embodiment described above, abnormality can occur while the robot $101_i$ is operating in accordance with the linear interpolation command. The robot controller $122_i$ may periodically transmit a signal indicating the state of the robot $101_i$ to the controller 121B. The controller 121B may control the laser oscillator 103 not to oscillate a laser beam in the case where a signal indicating that the robot $101_i$ is in an abnormal state is received.

In the tenth exemplary embodiment, the robot controller $122_i$ may transmit a permission signal permitting laser oscillation to the controller 121B. For example, the permission signal is turned on while the robot controller $122_i$ is supplying the trajectory data $P_j$ in accordance with the linear interpolation command. The controller 121B may perform AND calculation of the permission signal and the laser oscillation command and transmit the calculation result thereof to the laser oscillator 103. As a result of this, the laser beam is not oscillated unless the robot controller $122_i$ turns on the permission signal. Although this AND calculation is performed by the controller 121B, this AND calculation may be performed by another electronic circuit.

In the tenth exemplary embodiment described above, it is preferable that the robot $101_i$ is installed in an unillustrated light-shielding booth such that any person is not exposed to the laser beam. The laser oscillator 103 is configured to stop the laser oscillation when a person opens a door to enter the booth. In addition, in the case where the optical fiber cable $151_i$ is not correctly connected to the laser head $102_i$ and the switcher 104, wiring in the optical fiber cable $151_i$ is not connected, and the laser oscillation of the laser oscillator 103 is stopped. In addition, in the case where the optical fiber cable 152 is not correctly connected to the laser oscillator 103 and the switcher 104, wiring in the optical fiber cable 152 is not connected, and the laser oscillation of the laser oscillator 103 is stopped. In addition, in the case where the optical fiber cables $151_i$ and 152 are bent to a certain degree or more, the wiring therein is broken and the laser oscillation of the laser oscillator 103 is stopped. It is also possible to configure the laser oscillator 103 to stop the laser oscillation when a person is detected by a safety laser scanner, a safety light curtain, or the like. It is also possible to stop the laser oscillation by monitoring the booth by external hardware in case the robot controller $122_i$ or the controller 121B stops responding for some reason. For example, a signal that is turned on and off at regular intervals may be output from the robot controller $122_i$ and the controller 121B, and the laser oscillation may be stopped when the output signal does not change for a certain period.

Although a case where the control apparatus 120B is constituted by the controller 121B and the robot controllers $122_1$ to $122_N$ has been described in the tenth exemplary embodiment described above, the configuration of the control apparatus 120B is not limited to this. The control apparatus may be realized by one computer as long as the control apparatus has functions of the controller 121B and the robot controllers $122_1$ to $122_N$. For example, the control apparatus can be realized by one computer if parallel processing can be performed by a plurality of processors or a plurality of cores included in a processor.

Although a case where the robots $101_1$ to $101_N$ are each a vertically articulated robot has been described in the tenth exemplary embodiment described above, the configuration of the robots $101_1$ to $101_N$ is not limited to this. For example, the robots $101_1$ to $101_N$ may be each a horizontally articulated robot, a parallel link robot, or a cartesian coordinate robot. Further, the robots $101_1$ to $101_N$ may each have a different configuration.

Although a case where a laser processing apparatus performs laser welding has been described in the tenth exemplary embodiment described above, the configuration is not limited to this. For example, the laser processing apparatus may perform laser grooving processing or laser cutting processing.

Eleventh Exemplary Embodiment

Figure 40:
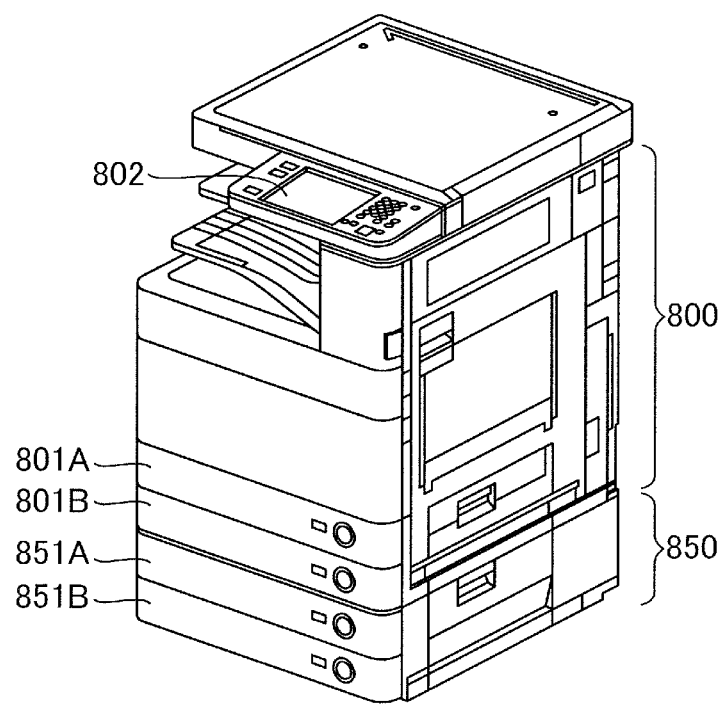
FIG. 40 is a perspective view of an image forming apparatus according to an eleventh exemplary embodiment.

Next, a method of producing an image forming apparatus by a laser processing method using the laser processing apparatus according to any one of the first to tenth exemplary embodiments described above will be described. FIG. 40 is a perspective view of an image forming apparatus according to an eleventh exemplary embodiment. In the eleventh exemplary embodiment, welding is performed on a frame body that is one of constituents of an image forming apparatus 800 by using the laser processing apparatus according to any one of the first to tenth exemplary embodiments, and thus the image forming apparatus 800 is produced.

The image forming apparatus 800 illustrated in FIG. 40 is, for example, a full-color printer employing an electrophotographic system. The image forming apparatus 800 can be placed on a top surface of an optional sheet feeding module 850 serving as a placing surface. The image forming apparatus 800 includes two-tier sheet feeding cassettes 801A and 801B. The sheet feeding module 850 includes two-tier sheet feeding cassettes 851A and 851B. Each sheet feeding cassette is capable of accommodating a recording material different in size or grammage. Examples of the recording material include sheet materials such as paper sheets and sheets for overhead projectors. The recording material on which image formation is to be performed can be selected via an operation portion 802 of the image forming apparatus 800 or an external terminal such as a personal computer connected to the image forming apparatus 800. To be noted, in the description below, the side on which a user operates the image forming apparatus 800 is referred to as the front side, the back side of the image forming apparatus 800 is referred to as the rear side, and left and right are defined on the premise that the image forming apparatus 800 is viewed from the front side.

In the image forming apparatus 800, a recording material is conveyed, and an image is formed on the recording material. Therefore, image defects or malfunction can occur in the case where the frame body of the image forming apparatus 800 is distorted. Therefore, suppressing the distortion of the frame body of the image forming apparatus 800 is important for suppressing image defects and malfunction.

Figure 41:
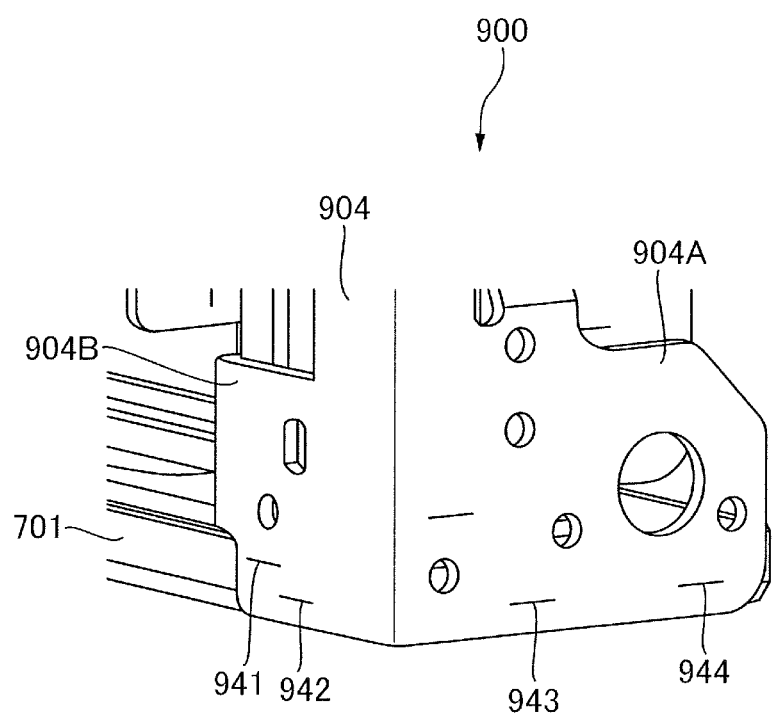
FIG. 41 is a perspective view illustrating a part of a frame body serving as a processing target object in the eleventh exemplary embodiment.

FIG. 41 is a perspective view of a part of a frame body 900 serving as a processing target object in the eleventh exemplary embodiment. In the eleventh exemplary embodiment, a case where members constituting the frame body 900 are joined together by welding will be described.

First, a prop 904 and a stay 701 that constitute the frame body 900 are prepared. The prop 904 has a first side wall 904A and a second side wall 904B that are parallel in the vertical direction and cross each other at a right angle. The stay 701 is disposed such that an end portion thereof comes into contact with the first side wall 904A and the second side wall 904B. The first side wall 904A is disposed to extend parallel to the front-rear direction, and the second side wall 904B is disposed to extend parallel to the right-left direction. Therefore, the stay 701 is disposed to be vertically movable in a state in which the position thereof in the front-rear direction and the right-left direction is defined by the first side wall 904A and the second side wall 904B.

After adjusting the position of the stay 701 in the vertical direction, welding target portions 941, 942, 943, and 944 are subjected to laser seam welding. The stay 701 and the prop 904 are fixed to each other by laser welding to produce the frame body 900.

As described above, the frame body 900 of the image forming apparatus 800 includes many welding target portions. According to the laser processing method using the laser processing apparatus according to any one of the first to tenth exemplary embodiments, welding can be performed efficiently, in a short time, and with a high precision. As a result of this, distortion of the frame body 900 can be suppressed, and thus defects of images formed on a sheet and malfunction of the image forming apparatus 800 can be suppressed.

The present invention is not limited to the exemplary embodiments described above, and can be modified in many ways within the technical concept of the present invention. In addition, the effects described in the exemplary embodiments are merely most preferable effects that can be achieved by the present invention, and the effect of the present invention is not limited to the effects described in the exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-162865, filed Aug. 25, 2017, Japanese Patent Application No. 2017-162864, filed Aug. 25, 2017, and Japanese Patent Application No. 2018-134972, filed Jul. 18, 2018, which are hereby incorporated by reference herein their entirety.

What is claimed is:

1. A laser processing apparatus comprising:
a light source configured to generate a laser beam;
a laser head configured to emit the laser beam generated in the light source;
a robot configured to move the laser head; and
a programmed control apparatus comprising a computer including a processor,
wherein the control apparatus is programed to control start and stop of generation of the laser beam in the light source and to control operation of the robot,
wherein the control apparatus is programed to perform timekeeping to count time elapsed from a first time point,
wherein the control apparatus is programed to control the light source such that the light source starts to generate the laser beam at a second time point, the second time point being a time point when a first time as a predetermined time counted by the timekeeping has elapsed from the first time point, and
wherein at or after the first time point, the control apparatus is programed to cause the robot to start an operation of accelerating the laser head such that a movement speed of the laser head with respect to a processing target object reaches a target speed at or before the second time point.

2. The laser processing apparatus according to claim 1, wherein the control apparatus is programed to cause the robot to operate such that the movement speed of the laser head is kept at the target speed while the processing target object is irradiated with the laser beam from the laser head.

3. The laser processing apparatus according to claim 1, wherein the control apparatus is programed to control the light source to stop generation of the laser beam at a third time point, the third time point being a time point when a second time as a predetermined time counted by the timekeeping has elapsed from the second time point.

4. The laser processing apparatus according to claim 3, wherein the second time is a value obtained by dividing, by the target speed, a distance between a taught position at which irradiation of the laser beam is started and a taught position at which the irradiation of the laser beam is stopped.

5. The laser processing apparatus according to claim 1, wherein the control apparatus comprises:
 a first controller configured to control start and stop of generation of the laser beam in the light source; and
 a second controller configured to control operation of the robot,
 wherein the second controller transmits a predetermined signal to the first controller when the robot starts the operation of accelerating the laser head, and
 wherein the first controller controls the light source to generate the laser beam when the first time has elapsed after receiving the predetermined signal.

6. The laser processing apparatus according to claim 5, wherein a control period of the first controller is shorter than a control period of the second controller.

7. The laser processing apparatus according to claim 5, wherein the second controller controls operation of the robot in accordance with trajectory data of a predetermined section comprising a taught position at which irradiation of the laser beam is started and a taught position at which the irradiation of the laser beam is stopped.

8. The laser processing apparatus according to claim 7, wherein the second controller transmits the predetermined signal to the first controller when supply of the trajectory data is started to control the robot.

9. The laser processing apparatus according to claim 7, wherein the trajectory data comprises a plurality of pieces of trajectory data different from one another,
 wherein the second controller sequentially controls operation of the robot in accordance with the plurality of pieces of trajectory data, and
 wherein, each time the first controller receives the predetermined signal, the first controller controls the light source to generate the laser beam when the first time has elapsed.

10. The laser processing apparatus according to claim 5, wherein the first controller transmits a command to the second controller, and
 wherein the second controller causes the robot to start the operation of accelerating the laser head in a case where the second controller has received the command.

11. The laser processing apparatus according to claim 1, wherein the control apparatus is programed to obtain, by using a distance in which a commanded position of the robot moves in elapse of the first time and a distance derived from response delay of the robot at a time point at which the elapse of the first time is completed, an acceleration distance in which the robot moves in the elapse of the first time, and the control apparatus is programed to cause the robot to start the operation of accelerating the laser head after moving the robot to a position deviated by the acceleration distance from a taught position at which irradiation of the laser beam is started.

12. The laser processing apparatus according to claim 11, wherein the control apparatus is programed to calculate the distance derived from response delay of the robot at the time point at which the elapse of the first time is completed, by using the target speed and a predetermined constant.

13. The laser processing apparatus according to claim 11, wherein the control apparatus is programed to calculate the distance derived from response delay of the robot at the time point at which the elapse of the first time is completed, for each processing target portion.

14. The laser processing apparatus according to claim 11, wherein, in a case where an error of the position of the robot at the time point at which the elapse of the first time is completed with respect to the taught position at which the irradiation of the laser beam is started is equal to or greater than a threshold value, the control apparatus is programed to set the acceleration distance such that the error is smaller than the threshold value.

15. The laser processing apparatus according to claim 1, wherein the control apparatus is programed to cause the robot to perform a test operation before an actual operation of performing laser processing on the processing target object, and is further programmed to adjust, for each processing target portion and on a basis of vibration of the robot that has occurred in the test operation, an acceleration rate of movement of the robot to a position at which the operation of accelerating the laser head is started in the actual operation.

16. The laser processing apparatus according to claim 15, wherein the test operation comprises the control apparatus programed to cause the robot to move to the position at which the operation of accelerating the laser head is started and then to cause the robot to operate in accordance with trajectory data of a predetermined section comprising a taught position at which irradiation of the laser beam is started and a taught position at which the irradiation of the laser beam is stopped.

17. The laser processing apparatus according to claim 16, wherein the control apparatus is programed to adjust the acceleration rate on a basis of a control point obtained from an angle of a joint of the robot in a case where the robot is operating.

18. The laser processing apparatus according to claim 15, wherein the control apparatus is programed to adjust the acceleration rate on a basis of time required for a control point obtained from an angle of a joint of the robot to settle to a position where an operation of accelerating the laser head is started since a time point at which a commanded position of the robot is moved to the position at which the operation of accelerating the laser head is started in the test operation.

19. The laser processing apparatus according to claim 1, wherein the light source comprises a laser oscillator, and the laser head comprises no galvano mirror.

20. A control apparatus comprising a computer including a processor,
 wherein the control apparatus is programed to control start and stop of generation of a laser beam in a light source and to control operation of a robot supporting a laser head that emits the laser beam generated in the light source, wherein the control apparatus is programed to switch a signal at a first time point and to perform timekeeping to count time elapsed from the first time point, wherein the control apparatus is programed to control the light source such that the light source starts to generate the laser beam at a second time point, the second time point being a time point when a first time as a predetermined time counted by the timekeeping has elapsed from the first time point, and wherein the control apparatus is programed to cause, at or after the first time point, the robot to start an operation of accelerating the laser head such that a movement speed of the laser head with respect to a processing target object reaches a target speed at or before the second time point.

21. A laser processing method of processing a processing target object by emitting a laser beam generated in a light source from a laser head while moving the laser head by a robot supporting the laser head, wherein the laser processing method is performed by a control apparatus programed to control start and stop of generation of the laser beam in the light source and to control operation of the robot, the method comprising:

timekeeping by the control apparatus so as to count time elapsed from a first time point, controlling the light source by the control apparatus such that the light source starts to generate the laser beam at a second time point, the second time point being a time point when a first time as a predetermined time counted by the timekeeping has elapsed from the first time point, and wherein at or after the first time point, the control apparatus causes the robot to start an operation of accelerating the laser head such that a movement speed of the laser head with respect to the processing target object reaches a target speed at or before the second time point.

22. The laser processing apparatus according to claim 1, further comprising:

a plurality of laser heads configured to emit the laser beam;

a robot apparatus configured to respectively move the plurality of laser heads, the robot apparatus including the robot;

a switcher configured to switch an optical path to guide the laser beam generated in the light source to one of the plurality of laser heads; and wherein the control apparatus is programed to control a switching operation of the switcher and operation of the robot apparatus, wherein the plurality of laser heads comprise a first laser head as the laser head and a second laser head, and wherein, the control apparatus is programed to cause, before finishing irradiation of the laser beam on the processing target object by the first laser head, the robot apparatus to start an operation of accelerating the second laser head, to which the laser beam is to be guided next, such that a movement speed of the second laser head with respect to the processing target object reaches a target speed.

23. A producing method of producing an image forming apparatus in which welding of a frame body is performed by using the laser processing method according to claim 21, wherein the frame body includes the processing target object.

24. The laser processing apparatus according to claim 1, wherein the control apparatus is programed to monitor a signal, to switch the signal, and to start the timekeeping in synchronization with a switch of the signal.

25. The laser processing apparatus according to claim 22, the irradiation of the laser beam on the processing target object by the first laser head is finished at a third time point, wherein the control apparatus is programed to perform timekeeping to count time elapsed from a fourth time point, wherein the control apparatus is programed to control the light source such that the light source starts to generate the laser beam at a fifth time point, the fifth time point being a time point when a time as same length as the first time counted by the timekeeping has elapsed from the fourth time point, and wherein at or after the fourth time point, the control apparatus is programed to cause the robot to start an operation of accelerating the second laser head such that a movement speed of the laser head with respect to a processing target object reaches a target speed at or before the fifth time point.

26. The laser processing apparatus according to claim 25, wherein the fourth time point is between the first time point and the second time point, and the switcher switches the optical path between the third time point and the fifth time point.

27. The laser processing apparatus according to claim 26, wherein a time from the first time point to the fourth time point is not shorter than a time from the third time point to the fifth time point.

28. The laser processing apparatus according to claim 22, wherein the plurality of laser heads comprise no galvano mirror, and the switcher comprise a plurality of mirrors.

29. A producing method of producing a frame body comprising:

preparing a first member of the frame body, wherein the first member includes a first processing target object;

preparing a second member of the frame body, wherein the second member includes a second processing target object; and fixing the first member and the second member to each other by laser welding using the laser processing method according to claim 21;

wherein the processing target object includes the first processing target object and the second processing target object.

30. A producing method of producing an apparatus which comprises an operation portion and a frame body which includes the processing target object, wherein laser welding to produce the frame body is performed by using the laser processing apparatus according to claim 22.

* * * * *